US008766925B2

(12) United States Patent
Perlin et al.

(10) Patent No.: US 8,766,925 B2
(45) Date of Patent: Jul. 1, 2014

(54) METHOD AND APPARATUS FOR PROVIDING INPUT TO A PROCESSOR, AND A SENSOR PAD

(75) Inventors: Kenneth Perlin, New York, NY (US); Ilya Rosenberg, Wayne, NJ (US)

(73) Assignee: New York University, New York, NY (US)

( * ) Notice: Subject to any disclaimer, the term of this patent is extended or adjusted under 35 U.S.C. 154(b) by 448 days.

(21) Appl. No.: 12/380,350

(22) Filed: Feb. 26, 2009

(65) Prior Publication Data
US 2009/0256817 A1    Oct. 15, 2009

Related U.S. Application Data

(60) Provisional application No. 61/067,405, filed on Feb. 28, 2008, provisional application No. 61/196,508, filed on Oct. 17, 2008.

(51) Int. Cl.
*G06F 3/041* (2006.01)
*G09G 5/00* (2006.01)
*G06F 3/023* (2006.01)
*G06F 3/0488* (2013.01)

(52) U.S. Cl.
CPC ............ *G06F 3/0414* (2013.01); *G06F 3/0237* (2013.01); *G06F 3/0233* (2013.01); *G06F 3/04883* (2013.01); *G06F 2203/04808* (2013.01)
USPC .......................................... 345/173; 345/156

(58) Field of Classification Search
USPC ..................... 345/156–183; 178/18.01–20.04
See application file for complete search history.

(56) References Cited

U.S. PATENT DOCUMENTS

| 4,526,043 A | 7/1985 | Boie et al. |
| 4,797,514 A | 1/1989 | Talmage, Jr. et al. |

(Continued)

FOREIGN PATENT DOCUMENTS

| DE | 3814017 | 9/1989 |
| JP | 05224818 | 9/1993 |

(Continued)

OTHER PUBLICATIONS

Extended European Search Report mailed Jul. 18, 2012 for European patent application No. 09713771.5, 10 pages.

(Continued)

*Primary Examiner* — Alexander Eisen
*Assistant Examiner* — Patrick F Marinelli
(74) *Attorney, Agent, or Firm* — Lee & Hayes, PLLC

(57) ABSTRACT

An apparatus for providing input to a processor includes a sensor pad having a surface and a sensor array for sensing pressure at the surface and producing signals corresponding to the pressure at the surface. The sensor array having columns and rows of electrodes that are covered with resistive material which fills in the spaces between the electrodes and acts as a linear resistor between the electrodes and measures pressure on the pad surface between the electrodes. The apparatus includes an interface in contact with the sensor pad and in communication with the sensor array which couples to the processor to communicate the signals to the processor. A method for providing input to a processor includes the steps of sensing pressure with a sensor pad having a surface and a sensor array for sensing the pressure at the surface. There is the step of producing signals corresponding to the pressure at the surface with the sensor array. The sensor array having columns and rows of electrodes that are covered with resistive material which fills in the spaces between the electrodes and acts as a linear resistor between the electrodes and measures pressure on the pad surface between the electrodes. There is the step of communicating the signals to the processor with an interface in contact with the sensor pad and in communication with the sensor array which couples to the processor.

26 Claims, 42 Drawing Sheets

(56) References Cited

U.S. PATENT DOCUMENTS

| | | | |
|---|---|---|---|
| 4,983,786 A * | 1/1991 | Stevens et al. | 178/18.01 |
| 5,565,657 A | 10/1996 | Merz | |
| 5,624,611 A * | 4/1997 | Lippert | 264/1.36 |
| 6,077,560 A * | 6/2000 | Moshrefzadeh et al. | 427/108 |
| 6,118,435 A | 9/2000 | Fujita et al. | |
| 7,023,427 B2 | 4/2006 | Kraus et al. | |
| 2003/0052867 A1* | 3/2003 | Shigetaka et al. | 345/173 |
| 2003/0079920 A1* | 5/2003 | Rantet | 178/18.05 |
| 2003/0098858 A1 | 5/2003 | Perski et al. | |
| 2003/0137498 A1* | 7/2003 | Huang et al. | 345/173 |
| 2003/0197688 A1* | 10/2003 | Aufderheide et al. | 345/173 |
| 2004/0001048 A1 | 1/2004 | Kraus et al. | |
| 2004/0100452 A1 | 5/2004 | Oh et al. | |
| 2005/0040391 A1* | 2/2005 | Jacobs | 257/40 |
| 2005/0275634 A1 | 12/2005 | Chi et al. | |
| 2006/0017701 A1* | 1/2006 | Marten et al. | 345/173 |
| 2006/0209050 A1* | 9/2006 | Serban | 345/174 |
| 2007/0078316 A1 | 4/2007 | Hoarau et al. | |
| 2007/0126707 A1* | 6/2007 | Jones | 345/173 |
| 2007/0235231 A1* | 10/2007 | Loomis et al. | 178/18.06 |
| 2008/0006453 A1 | 1/2008 | Hotelling | |
| 2008/0007539 A1 | 1/2008 | Hotelling | |
| 2010/0045612 A1* | 2/2010 | Molne | 345/173 |

FOREIGN PATENT DOCUMENTS

| | | |
|---|---|---|
| JP | 05257594 | 10/1993 |
| JP | 08286830 | 11/1996 |
| WO | WO2005114369 | 12/2005 |

OTHER PUBLICATIONS

Translated Japanese Office Action mailed Jun. 28, 2013 for Japanese patent application No. 2010-548721, a counterpart foreign application of U.S. Appl. No. 12/380,350, 4 pages.

Translated Chinese Office Action mailed Aug. 22, 2012 for Chinese patent application No. 200980112564.1, a counterpart foreign application of U.S. Appl. No. 12/380,350, 12 pages.

Translated Chinese Office Action mailed Aug. 16, 2013 for Chinese patent application No. 200980112564.1, a counterpart foreign application of U.S. Appl. No. 12/380,350, 12 pages.

* cited by examiner

| | | Continuous Resistive iMPAD (NYU) | Capacitive Array (Apple iPhone) | Compressible Capacitive Array (PPS TactArray) | Optical (Microsoft Surface) | Resistive Surface (ELO Touchsystem) | Resistive Array (TekScan, JazzMutant Lemur) |
|---|---|---|---|---|---|---|---|
| FORM FACTOR | FLAT | Y | Y | Y | N | Y | Y |
| | CAN BE FLEXIBLE | Y | N | Y | N | Y | Y |
| | CAN BE TRANSPARENT | Y | Y | Y | Y | Y | Y |
| | PORTABLE FORM FACTOR (<6" DIAGONAL) | Y | Y | Y | N | Y | Y |
| | MEDIUM FORM FACTOR (6"-30" DIAGONAL) | Y | Y 1 | Y 1 | Y 2 | Y 3 | Y 1 |
| | LARGE FORM FACTOR (>30" DIAGONAL) | Y | N | N | Y | N | N |
| CAPABILITIES | MULTITOUCH | Y | Y | Y | Y | N | Y |
| | FORCE SENSING | Y | N 4 | Y | Y 5 | N 6 | Y |
| | DOESN'T NEED CALIBRATION | Y | Y 7 | Y 7 | N 8 | N | Y |
| | INTERPOLATION | Y | Y 8 | Y 9 | Y | Y | N 9 |
| POWER | LOW POWER | Y | Y | Y | N | Y | Y |
| POWER/COST | INHERENT COST | LOW | MED | MED | HIGH | LOW | MED |

FIG. 9

SCREEN CAPTURE
5 FINGERS PRESSING
AGAINST PAD SIMULTANEOUSLY

SCREEN CAPTURE
5 FINGERS PRESSING
AGAINST PAD SIMULTANEOUSLY

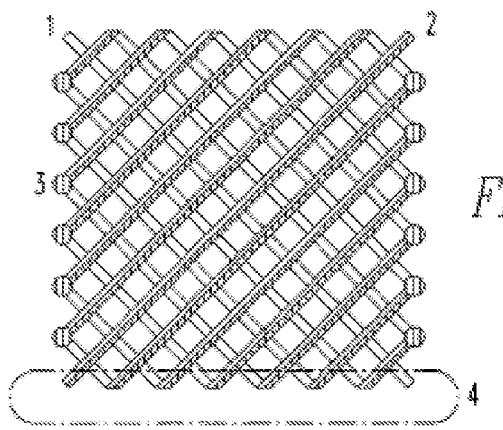
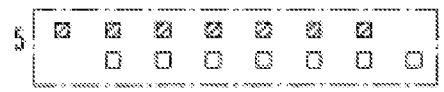
FIG.38
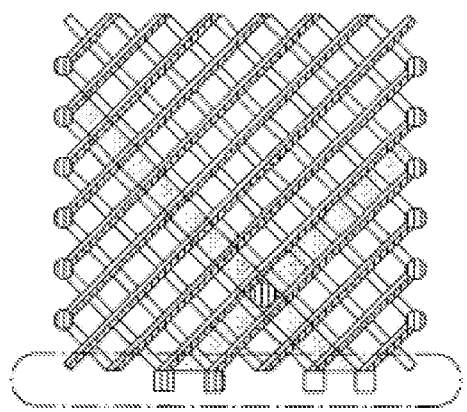
FIG.39
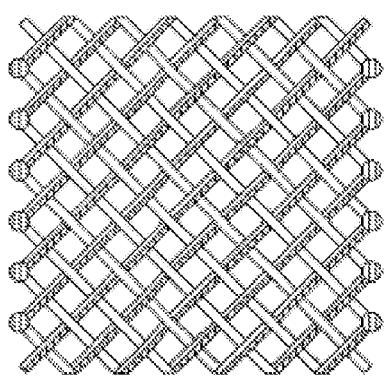
FIG.40

METHOD AND APPARATUS FOR PROVIDING INPUT TO A PROCESSOR, AND A SENSOR PAD

CROSS-REFERENCE TO RELATED APPLICATIONS

This application claims priority from U.S. provisional application 61/067,405 filed Feb. 28, 2008 and U.S. provisional application 61/196,508 filed Oct. 17, 2008.

FIELD OF THE INVENTION

The present invention is related to providing input to a processor comprising a sensor pad having a surface and a sensor array for sensing pressure at the surface and producing signals corresponding to the pressure at the surface. (As used herein, references to the "present invention" or "invention" relate to exemplary embodiments and not necessarily to every embodiment encompassed by the appended claims.) More specifically, the present invention is related to providing input to a processor comprising a sensor pad having a surface and a sensor array for sensing pressure at the surface and producing signals corresponding to the pressure at the surface where the sensor array has columns and rows of electrodes that are spaced apart a distance greater than a width of a single electrode that are covered with resistive material which is disposed in the spaces between the electrodes.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Multi-touch interfaces are gaining increasing interest. Among the recent developments has been Perceptive Pixel's FTIR device, as well as Microsoft's recently introduced Microsoft Surface and Apple's iPhone with multi-touch screen. What these devices lack is very low cost in a compact form factor that could be used with ordinary computing devices such as the desktop PC or laptop. The present invention is a multi-touch method and apparatus that may be used instead of a mouse with any of a variety of computing devices. It can also replace a tablet drawing device (such as a Wacom tablet). It is preferably a low cost device that may rival the cost of current mouse devices (e.g. $30 to $50). The apparatus consists of a sensor which preferably contains an array or grid of sensors. Preferably this would be made using FSR technology (force sensitive resistance) or other relatively low cost sensing technology. An FSR sensor array may cost in the range of $10 per square foot and can readily provide, for example, an array of 32×32 sensing elements. Multiplexers and A/D converters may be employed to translate multiple touches on the FSR or other sensor array into a stream of position and pressure data. A relatively low cost processor may be employed in processing the raw data. The entire cost of manufacturing may ultimately be in the range of $20. Methods have been developed to translate or map a time-sampled stream of relatively low-resolution position data plus associated pressure data into sub-pixel resolution positional data using information that can be derived from the raw data and the fact that the data being processed represents one or more fingers that are in contact with the apparatus.

This section provides a more thorough comparison with some of best know existing technologies for sensing pressure over an area (FIG. 9). This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Capacitive Array—Capacitive array sensors [14] have recently become popularized by devices such as the iPhone [1]. These sensors detect changes in capacitance due to the proximity of a conductor such as metal or a part of the human body (body capacitance). However, they are insensitive to dielectric materials. These types of sensors do not sense pressure directly, but, rather, through changes of surface area as a conformant capacitive object presses against them. Because these types of sensors need to maintain a consistent capacitance to avoid false activation, they are typically mounted on a rigid surface such as glass. These types of sensors also require complex and expensive read-out electronics which must compensate for stray capacitances. For this reason, they generally do not scale very well to large devices.

Compressible Capacitive Array—Another form of capacitive array sensor is the flexible sensor produced by Pressure Profile Systems [10]. In this sensor, a compressible material is placed between column and row electrodes. As pressure is applied, the material compresses increasing the capacitive coupling of an AC signal between row and column electrodes. One drawback of these sensors is that complex and expensive electronics are required to read out pressure from the array because an oscillatory signal must be fed into the column electrode and picked up at the row electrode. Secondly these sensors can be affected by stray capacitance in the environment. Finally, unlike IMPADs, these sensors do not have the inherent ability to bilinearly interpolate the forces that are applied. Thus, either an extremely high resolution of electrodes or a thick force-spreading material must be employed to get the kind of positional accuracy that is possible with IMPAD.

Optical—Another class of approaches for measuring force applied over a surface are the optical approaches as employed by Perceptive Pixel's FTIR display [4] and Microsoft Surface [7]. In the FTIR approaches a special material is placed over a rigid transparent surface. In Microsoft's approach, the material diffuses light (typically IR) traveling through it while in Perceptive Pixel's approach or the material diffuses light traveling in the plane of the transparent surface when pressure is applied. In both approaches, this diffused light is then picked up by a camera located behind the surface. Although these approaches scale very well for large input devices, they are very limited because they require mounting the material on a rigid glass, and require a large volume of space for an unobstructed camera view. Finally, these approaches are susceptible to stray light and can only be used in controlled environments without sudden lighting changes.

Resistive Surface—Resistive surface sensors are the sensors most traditionally used in POS (Point of Sale) and touch screen devices produced by companies such as Elo Touchsystems. Like IMPAD, these devices have two continuous sheets of FSR material in contact with each other. However, rather than having rows and columns of electrodes, the sheets of FSR material are only connected at the edges. Thus, these sensors can only sense the centroid and total amount of applied pressure and cannot distinguish multiple points of pressure from a single point of pressure.

Resistive Array—Resistive array sensors are basically an array of FSR cells arranged in a grid pattern. Some examples of these are the array sensors produced by TekScan and the transparent sensors used by the JazzMutant Lemur [5]. Similar to IMPAD, these sensors are read out by a grid of column and row electrodes. However, the sensors employ discrete FSR elements rather than a sheet of continuous FSR material, because they cannot accurately be used to determine the position of pressure applied between adjacent rows or columns. Thus, either an extremely high resolution of electrodes or a thick force-spreading material must be employed to get the kind of positional accuracy that is possible with IMPAD.

Load Cells—In industrial applications, load cells, usually employing strain gages are used to convert pressure to an electrical signal. However, due to their relatively high cost, it is impractical to build large arrays of load cells to measure pressure distributions over large areas.

FIG. 9:

1: Not cost effective at large sizes.

2: Not cost effective at small sizes.

3: Calibration accuracy degrades at large sizes.

4: Capacitive devices can't measure force but can measure contact area.

5: Optical devices require a special rubbery surface coating to measure pressure.

6: Some versions of these devices can measure the sum of pressure over entire surface.

7: Special hardware is required to continuously calibrate for stray capacitance.

8: Touch can interpolate due to stray capacitance.

9: Continuous positioning requires either big object or rubber force-spreading pad.

BRIEF SUMMARY OF THE INVENTION

The present invention pertains to an apparatus for providing input to a processor. The apparatus comprises a sensor pad having a surface and a sensor array for sensing pressure at the surface and producing signals corresponding to the pressure at the surface. The sensor array having columns and rows of electrodes that are covered with resistive material which fills in the spaces between the electrodes and acts as a linear resistor between the electrodes and measures pressure on the pad surface between the electrodes. The apparatus comprises an interface in contact with the sensor pad and in communication with the sensor array which couples to the processor to communicate the signals to the processor.

The present invention pertains to a method for providing input to a processor. The method comprises the steps of sensing pressure with a sensor pad having a surface and a sensor array for sensing the pressure at the surface. There is the step of producing signals corresponding to the pressure at the surface with the sensor array, the sensor array having columns and rows of electrodes that are covered with resistive material which fills in the spaces between the electrodes and acts as a linear resistor between the electrodes and measures pressure on the pad surface between the electrodes. There is the step of communicating the signals to the processor with an interface in contact with the sensor pad and in communication with the sensor array which couples to the processor.

The present invention pertains to an apparatus for providing input to a processor. The apparatus comprises a sensor pad having a surface and a sensor array for sensing pressure at the surface and producing signals corresponding to the pressure at the surface. The sensor array has columns and rows of electrodes that are covered with resistive material which is disposed in the spaces between the electrodes. The apparatus comprises an interface in contact with the sensor pad and in communication with the sensor array which couples to the processor to communicate the signals to the processor.

The present invention pertains to a method for providing input to a processor. The method comprises the steps of sensing pressure with a sensor pad having a surface and a sensor array for sensing the pressure at the surface. There is the step of producing signals corresponding to the pressure at the surface with the sensor array. The sensor array having columns and rows of electrodes that are covered with resistive material which is disposed in the spaces between the electrodes and measures pressure on the pad surface between the electrodes. There is the step of communicating the signals to the processor with an interface in contact with the sensor pad and in communication with the sensor array which couples to the processor.

The present invention pertains to a sensor pad. The pad comprises a surface. The pad comprises a sensor array for sensing pressure at the surface and producing signals corresponding to the pressure at the surface. The sensor array having columns and rows of electrodes that are covered with resistive material which is disposed in the spaces between the electrodes.

The present invention pertains to an apparatus for providing input to a processor. The apparatus comprises a sensor pad having a surface and means for sensing pressure at the surface and producing signals corresponding to the pressure at the surface. The sensing means having columns and rows of electrodes that are covered with resistive material which is disposed in the spaces between the electrodes. The apparatus comprises an interface in contact with the sensor pad and in communication with the sensor array which couples to the processor to communicate the signals to the processor.

BRIEF DESCRIPTION OF THE SEVERAL VIEWS OF THE DRAWING

In the accompanying drawings, the preferred embodiment of the invention and preferred methods of practicing the invention are illustrated in which:

FIG. 9 describes prior art.

FIG. 17b shows the resulting pressure image of FIG. 16a.

FIG. 17c shows the pressure image when a user pushes down on the upper left side of the block of FIG. 17a.

FIG. 24b is a representative circuit diagram regarding FIG. 24a.

FIG. 38 shows an N×N sensor with diagonal conducting lines.

FIG. 39 shows the embodiment of FIG. 38 where only tile is active.

FIG. 40 shows another embodiment of the present invention.

DETAILED DESCRIPTION OF THE INVENTION

Figure 1:
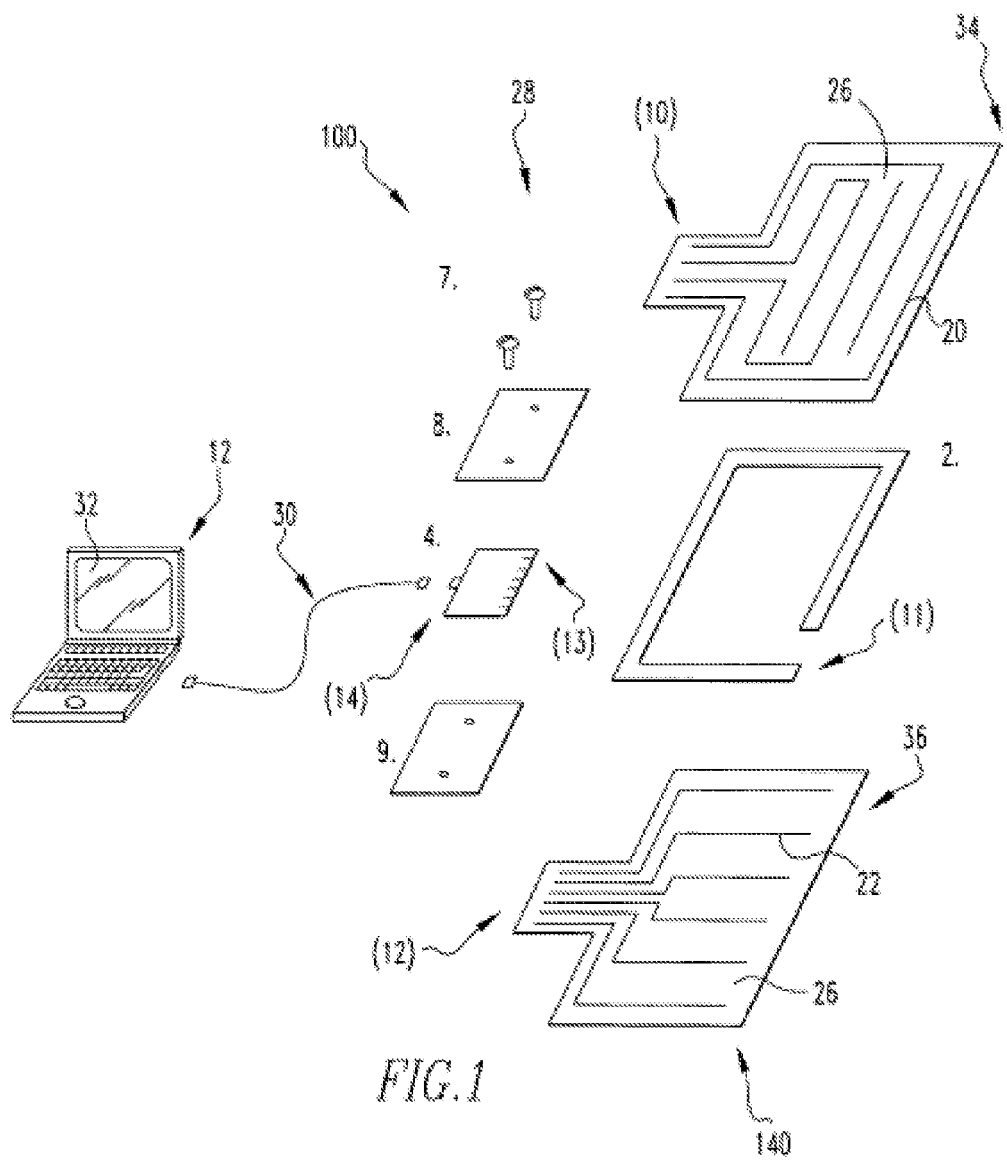
FIG. 1 is an assembly diagram of a sensor pad of the present invention.

Referring now to the drawings wherein like reference numerals refer to similar or identical parts throughout the several views, and more specifically to FIGS. 1-4, 11 and 12 thereof, there is shown an apparatus 100 for providing input to a processor 120. The apparatus 100 comprises a sensor pad 140 having a surface 16 and a sensor array 18 for sensing pressure at the surface 16 and producing signals corresponding to the pressure at the surface 16. The sensor array 18 having columns 20 and rows 22 of electrodes 24 that are preferably spaced apart a distance greater than a width of a single electrode 24 that are covered with resistive material which fills in the spaces 26 between the electrodes 24 and acts as a linear resistor between the electrodes 24 and measures pressure on the pad 140 surface 16 between the electrodes 24. The apparatus 100 comprises an interface 28 in contact with the sensor pad 140 and in communication with the sensor array 18 which couples to the processor 120 to communicate the signals to the processor 120.

Preferably, the pad 140 is portable. The interface 28 is preferably configured to couple with a USB cable 30. Preferably, the array detects multiple simultaneous contact points on the surface 16. The apparatus 100 preferably includes a display 32 in communication with the processor 120 that displays the signals on the screen. Preferably, the electrodes 24 are spaced at least ⅛ inches apart. The resistive material preferably has a conductivity which varies with pressure.

The sensor pad 140 preferably has a first sensor layer 34 with column 20 electrodes 24, and a second sensor layer 36 with row 22 electrodes 24. Preferably, the pad 140 has a spacer with a gap disposed between the first layer and the second layer. The pad 140 preferably senses pressure at the surface 16 by detecting voltages at row 22 and column 20 intersections that are near areas where the first and second layers are touching. Preferably, each time a scan of the pad 140 occurs by the processor 120, pressure at all points on the surface 16 is measured by applying a positive voltage on each row 22 one at a time, and then reading out voltage values on each column 20 one at a time.

The pad 140 can operate like a track pad. The pad 140 can operate as a tablet. The pad 140 can detect a corresponding shape to the pressure applied to the surface 16.

The present invention pertains to a method for providing input to a processor 120. The method comprises the steps of sensing pressure with a sensor pad 140 having a surface 16 and a sensor array 18 for sensing the pressure at the surface 16. There is the step of producing signals corresponding to the pressure at the surface 16 with the sensor array 18, the sensor array 18 having columns 20 and rows 22 of electrodes 24 that are preferably spaced apart a distance greater than a width of a single electrode 24 that are covered with resistive material which fills in the spaces 26 between the electrodes 24 and acts as a linear resistor between the electrodes 24 and measures pressure on the pad 140 surface 16 between the electrodes 24. There is the step of communicating the signals to the processor 120 with an interface 28 in contact with the sensor pad 140 and in communication with the sensor array 18 which couples to the processor 120.

Preferably, the producing step includes the step of measuring each time a scan of the pad 140 occurs by the processor 120, pressure at all points on the surface 16 by applying a positive voltage on each row 22 one at a time, and then reading out voltage values on each column 20 one at a time.

The present invention pertains to an apparatus 100 for providing input to a processor 120. The apparatus 100 comprises a sensor pad 140 having a surface 16 and a sensor array 18 for sensing pressure at the surface 16 and producing signals corresponding to the pressure at the surface 16. The sensor array 18 having columns 20 and rows 22 of electrodes 24 that are preferably spaced apart a distance greater than a width of a single electrode 24 that are covered with resistive material which is disposed in the spaces 26 between the electrodes 24. The apparatus 100 comprises an interface 28 in contact with the sensor pad 140 and in communication with the sensor array 18 which couples to the processor 120 to communicate the signals to the processor 120.

Figure 36:
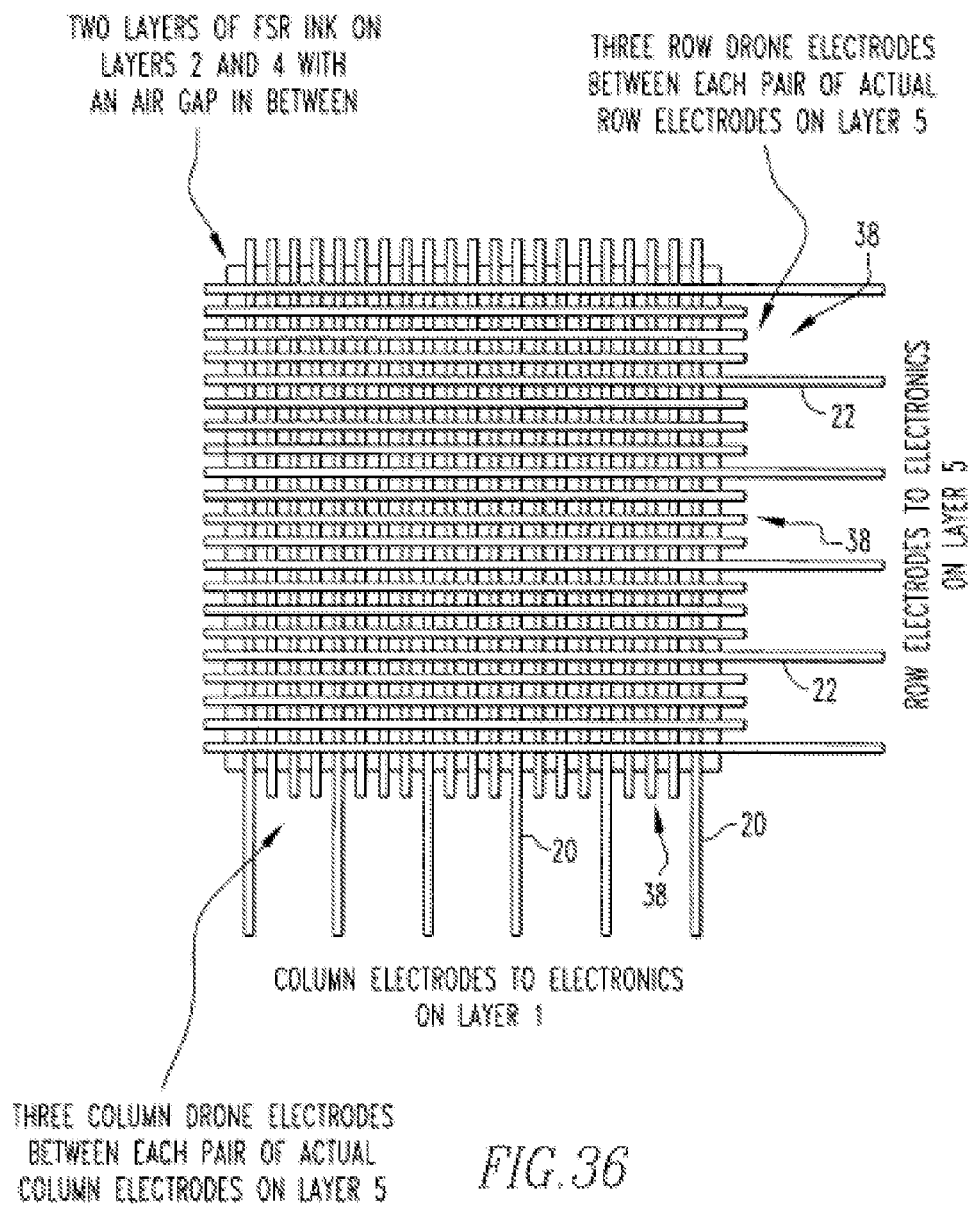
FIG. 36 shows a representation of the sensor pad with drone electrodes.

Preferably, the sensor pad 140 measures a proportional location of any touched point upon the surface 16, between two electrode columns 20 that adjoin the touch point and two electrode rows 22 that adjoin the touch point. The sensor pad 140 can include at least one drone electrode 38, as shown in FIG. 36, disposed between at least two electrode rows 22 and two electrode columns 20. The sensor pad 140 can include transparent conductors. The skin can be transparent.

The present invention pertains to a method for providing input to a processor 120. The method comprises the steps of sensing pressure with a sensor pad 140 having a surface 16 and a sensor array 18 for sensing the pressure at the surface 16. There is the step of producing signals corresponding to the pressure at the surface 16 with the sensor array 18. The sensor array 18 having columns 20 and rows 22 of electrodes 24 that are preferably spaced apart a distance greater than a width of a single electrode 24 that are covered with resistive material which is disposed in the spaces 26 between the electrodes 24 and measures pressure on the pad 140 surface 16 between the electrodes 24. There is the step of communicating the signals to the processor 120 with an interface 28 in contact with the sensor pad 140 and in communication with the sensor array 18 which couples to the processor 120.

Preferably, there is the step of measuring a proportional location of any touched point upon the surface 16, between two electrode columns 20 that adjoin the touch point and two electrode rows 22 that adjoin the touch point.

The present invention pertains to a sensor pad 140. The pad 140 comprises a surface 16. The pad 140 comprises a sensor array 18 for sensing pressure at the surface 16 and producing signals corresponding to the pressure at the surface 16. The sensor array 18 having columns 20 and rows 22 of electrodes 24 that are preferably spaced apart a distance greater than a width of a single electrode 24 that are covered with resistive material which is disposed in the spaces 26 between the electrodes 24.

The present invention pertains to an apparatus 100 for providing input to a processor 120. The apparatus 100 comprises a sensor pad 140 having a surface 16 and means for sensing pressure at the surface 16 and producing signals corresponding to the pressure at the surface 16. The sensing means having columns 20 and rows 22 of electrodes 24 that are preferably spaced apart a distance greater than a width of a single electrode 24 that are covered with resistive material which is disposed in the spaces 26 between the electrodes 24. The apparatus 100 comprises an interface 28 in contact with the sensor pad 140 and in communication with the sensor array 18 which couples to the processor 120 to communicate the signals to the processor 120.

The sensing means can be the sensor array 18.

In the operation of the invention, the UnMousePad is a thin, flexible, low cost multi-touch input device. An UnMousePad (otherwise called the "pad" or "sensor" herein) was built that is approximately 3.5"×3.5" in size, approximately 20 thousandths of an inch thick, and has 9 rows and 9 columns. The sensor consists of two sides. Each side consists of a series of silver traces printed on a polyester backing and overprinted with FSR (Force Sensing Resistor) ink. The two sides are placed perpendicular to each other creating a sensing matrix. Readout of values is performed by powering on one row 22 electrode 24 at a time to a voltage of +5V while connecting the other row 22 electrodes 24 to ground. Then, the voltage is sampled on each of the columns 20 one column at a time by using the analog pins on a microcontroller, while grounding all of the other column 20 lines. The design of the FSR pad naturally creates a voltage gradient on the input side of the sensor between the powered row 22 and the grounded rows 22, and likewise, a gradient in how much current flows to the currently sensed column 20 and the grounded column 20. The continuous FSR also acts as the resistor going to ground which creates an output voltage, so that it is not necessary to provide additional resistors to read the output. No other approach exists for doing multi-touch input which does not require any circuitry for reading the pressure from the multi-touch pad besides the printed sensor and a microcontroller. The only minor and inexpensive bit of circuitry that is needed is a voltage regulator to power the microcontroller and circuitry to provide USB connectivity. The control of sampling, analog to digital conversion, and data processing is performed by the microcontroller which communicates with a computer using a USB cable 30.

It is important to point out that prior art XY FSR sensors (produced by companies such as Tekscan) use strips of FSR over silver traces (instead of the flood coat which the sensors here use). Because of this, prior art XY sensors require circuitry for readout such as amplifiers and resistor banks, and cannot sense the position of pressure applied between strips without a force-spreader such as a layer of rubber above the sensor. In contrast, the sensor here does not require any extra circuitry and can accurately detect small points of pressure such as those that would be applied by a pen tip directly on the sensor.

One microcontroller that can be used for sensor readout is the Microchip PIC24HJ256GP210 which has 256 KB of flash program memory, 16 KB of RAM, 32 analog inputs, and 53 digital inputs and costs approx $4.56 in volume. Using this microcontroller, a sensor can be made with a resolution of 32×53. With quarter inch spacing between rows 22 and columns 20, this allows construction of a sensor as large as 8"×13" in area.

1. Fast scanning can allow for interesting applications such as musical instruments. The described invention may be used to simultaneously sample alternate columns 20 (while grounding the other columns 20) so that scanning can be effect much faster. This way, the entire sensor pad can be scanned in two passes. This approach creates a minimum amount of extra power draw in the system.

2. Simultaneous scanning can also be effected as follows: power on multiple columns 20 and multiple rows 22 thereby sampling a larger portion of the sensor simultaneously. This allows multi-scale sampling; starting at a coarser resolution and doing finer grained scanning, if necessary, in areas in which a touch has been detected.

3. As sensor resolution and size increases, it is necessary to use increasingly higher resistance for the FSR material. Otherwise, the sensor would draw too much current. This is problematic because circuitry (such as the microcontrollers used in one embodiment of the invention) has limits to how much current they can source or sink. For instance, with the PIC24HJ256GP210, each pin is limited to 4 mA of current. Current flow can be decreased to a limited extent by making the FSR more resistive. One solution is to use multiple smaller microcontrollers which can source/sink more current, such as the PIC16/18 series which can sink/source 25 mA or the ATmega48/ATmega88_/ATmega168_ which can source/sink 40 mA.

Applications of the UnMousePad, and Related Concepts

1) An un-mousepad can be used to simulate a large multi-touch floor pad. This would allow one to prototype a multi-touch floor pad at one's desk without requiring the floor pad to be physically present.

2) An un-mousepad can be used to develop and experiment with multi-touch applications. Because it does not need to replace the user's computer screen, keyboard, or mouse, the un-mousepad can be complimentary to computer systems that computer users already have. Also, because it is not attached to a screen, the un-mousepad can be comfortably placed and used on a desk. In long-term use situations this is much less tiring than requiring the user to hold up an arm to touch a multi-touch sensor installed on a computer screen.

3) An un-mousepad can be used as a very expressive musical instrument or animation input device.

4) An un-mousepad widget kit/API. Just as one can build widgets for java with Swing or AWT, a software toolkit could be built atop the un-mousepad hardware platform that would allow a software developer to implement a custom interface consisting of touch sensitive widgets. Developers could be provided with pre-made widgets such as a linear slider, a circular slider, a knob, a push-button, a force-sensitive push button, a toggle-button, and an XY input pad. An Abstract Programming Interface 28 (API) handles all of the work of translating the raw data from the sensor into simple floating point outputs/events for each widget that the application could read without the developer being required to know low level details about the operation of the sensor. In addition, the kit would allow developers to print out the custom user interface 28 overlays from their home printer. If the un-mousepad is 8.5"×11" in extent, the same size as a standard laser-printer output, then developers do not need to cut the paper overlay, but rather can put the overlay right on the sensor, thereby creating a custom printed controller visualization. The API can also make accessible special controls that only respond to a subset of gestures, such as quick taps, or only to fingers and not pens and not palms, or only to palms and not fingers or pens, or only to ball bounces or long term events. Controls can be provided that when calibrated can measure weight or shape. In this way, controllers using the API can be used to create musical instruments, puppeteering interfaces, and interfaces for a wide variety of games and design applications.

5) The UnMousePad can be used as a way to virtually draw or write on the screen. The user can even put paper under the pad to get both a hard copy and a virtual copy. Another application is in the enhancement of coloring books, or grammar books, where a child can get feedback on their progress as they color in or write on the pages.

6) The pads can be designed in such that they can be trimmed down to smaller sizes without damaging the electronics. This feature is useful for making all sorts of custom interfaces of different dimensions, and as a tool for prototyping sensors in industrial products. In small manufacturing runs of products, it may be cheaper to use an off-the-shelf UnMousePad than to design a custom membrane switch or FSR input device.

7) Small physical overlays can be placed over individual virtual widgets. For example, for the appearance of a button, small silicone button pads can be layered over the UnMousePad surface 16 that have the tactile feel of a button, and that pops in and out when pressed. A thin layer of adhesive can be used to adhere the button in place.

8) Flexible displays can be placed over the UnMousePad sensor. For instance, e-ink is developing a flexible display technology whereby color-changing capsules are sandwiched between two layers of polyester. Because the UnMousePad is made of polyester, one half of it could be printed right on the underside of an e-ink display. As long as the display 32 is flexible enough for force to be sensed through it, and is not damaged by pressure, it can be placed over an UnMousePad sensor. Alternatively, the UnMousePad can be manufactured with transparent inks so that it can be placed over a traditional computer display 32.

9) An UnMousePad can be used as a replacement for computer drawing tablets, and unlike most tablets (such as the Wacom tablet), our device is thin, flexible, inexpensive, and can be used with any pen or pencil (it does not require a specialized, easy to lose digitizer).

In regard to FIG. 1:

34. Top sensor layer with column electrodes and connector tail (10).
2. Spacer with air gap (11).
36. Bottom sensor layer with row electrodes and connector tail (12).
4. Readout circuit board with sensor connector (13) and interface cable connector (14).
30. Interface cable.
12. Computer with multi-touch enabled software.
7. Screws for cover (8, 9).
8. Top circuit board cover and tail (10) holder.
9. Bottom circuit board cover and tail (12) holder.

Figure 2:
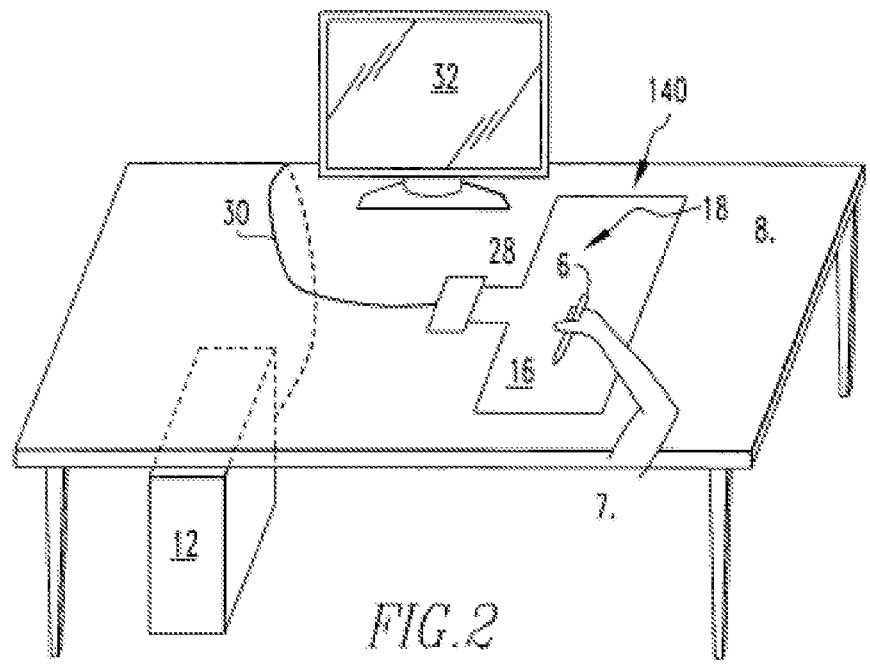
FIG. 2 is a diagram regarding use of the sensor pad.

In regard to FIG. 2:
UnMousePad Used in Writing Mode:
18. UnMousePad Sensor/writing surface 16.
28. UnMousePad electronics.
30. Interface cable (such as a USB cable) to computer.
12. Computer.
32. Display.
6. Writing utensil such as pen/pencil/stylus.
7. Hand.
8. Table.

Figure 3:
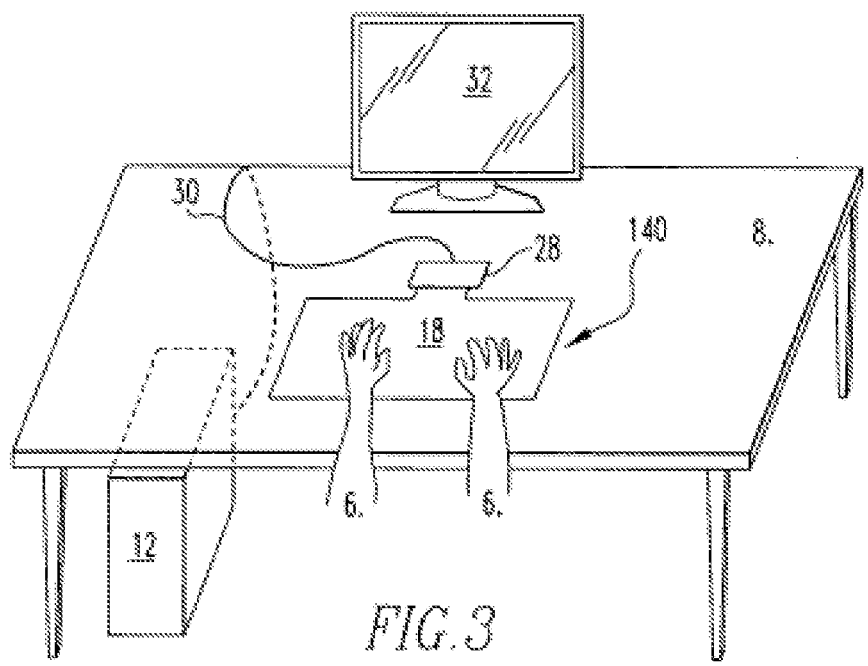
FIG. 3 is a use diagram of the sensor pad.
Figure 4:
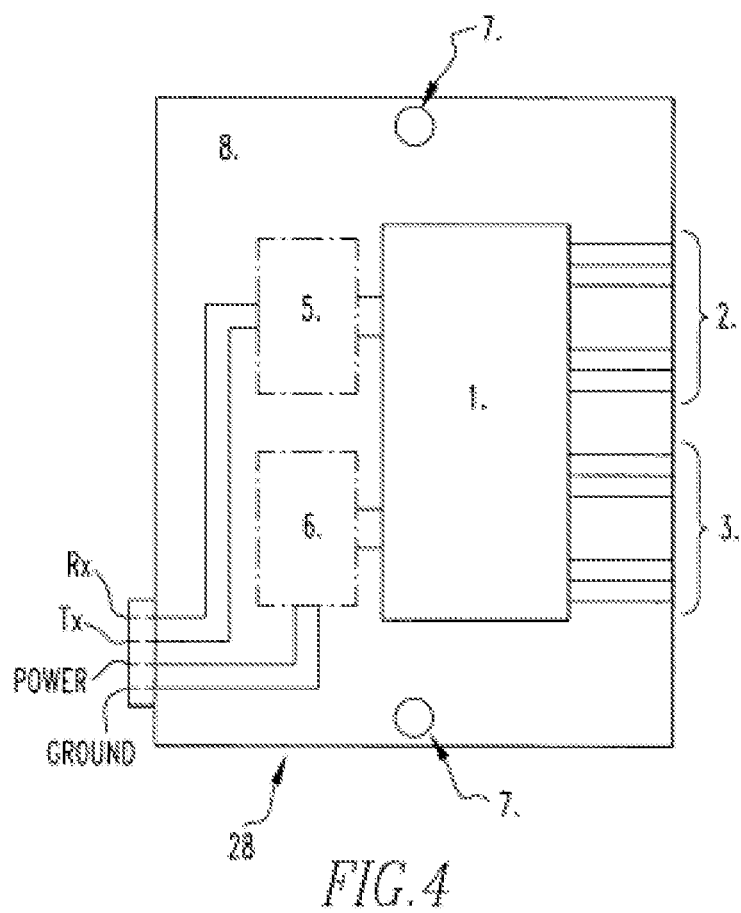
FIG. 4 is a circuit diagram of the sensor pad.

In regard to FIG. 3:
UnMousePad Used in Multi-Touch Mode:
18. UnMousePad sensor/writing surface 16.
28. UnMousePad electronics.
30. Interface cable (such as a USB cable) to computer.

12. Computer.
32. Display.
6. Hands using device.
In regard to FIG. 4:
1. Microcontroller.
2. Set of connections for column electrodes.
3. Set of connections for row electrodes.
4. Interface connector (e.g. USB connector) carrying power, ground, transmit and receive signals.
5. Transceiver circuitry.
6. Voltage regulator circuit.
7. Screw holes.
8. Circuit board.

Figure 5:
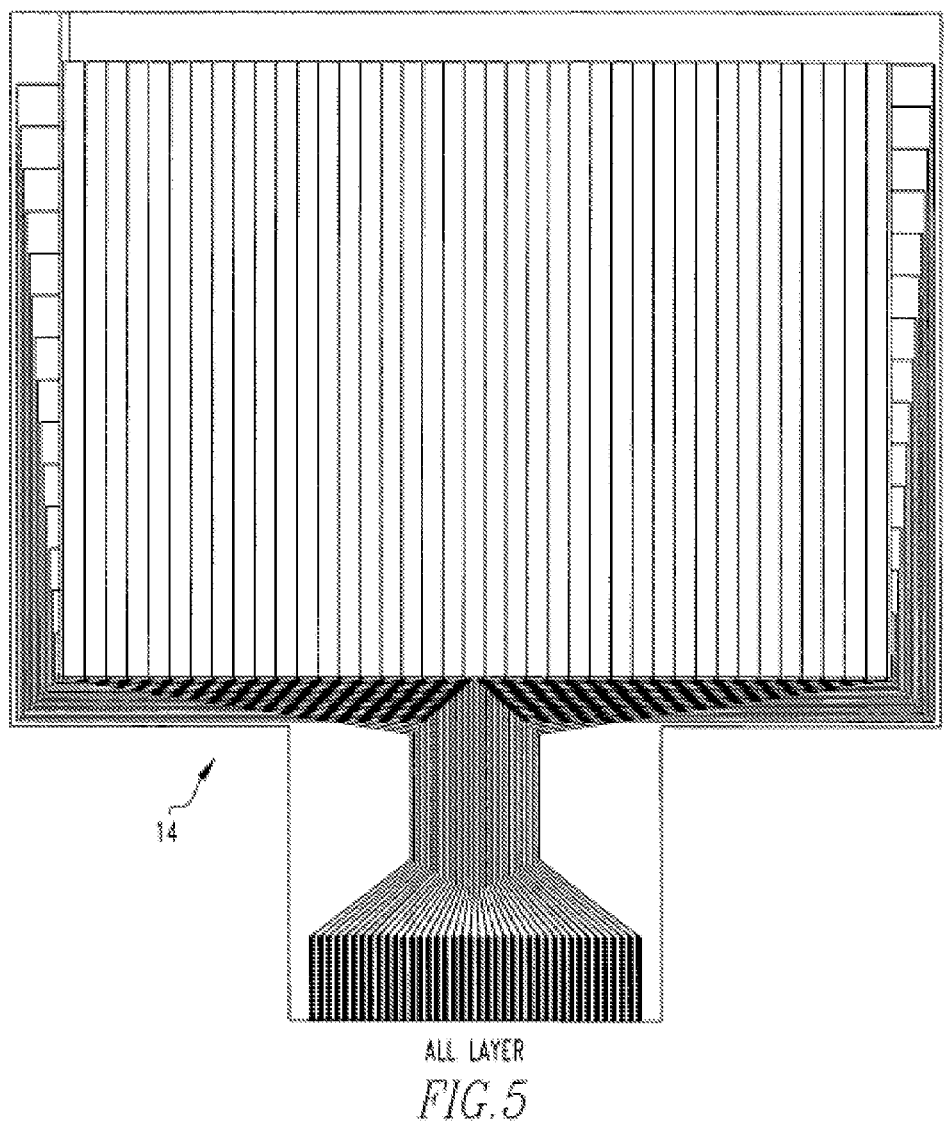
FIG. 5 is an overhead view of the sensor pad showing all layers.

In regard to FIG. 5, there is shown both the second or bottom layer and the first or top layer. VHB around edges should go right up to the start of the FSR material, but should not go over the FSR material. All the traces around the edges should be covered with VHB. The traces in the tail region should be left exposed. There should be at least one small air gap in the VHB on the left side of the sensor to keep a vacuum from forming inside the sensor. The traces on the tail should be exposed so that a ZIF or zebra connector can be put on in the future. For testing, the traces can be isolated with a piece of paper. 0.1 inch spaced connectors will be cramped to the rightmost part of the tail.

Figure 6:
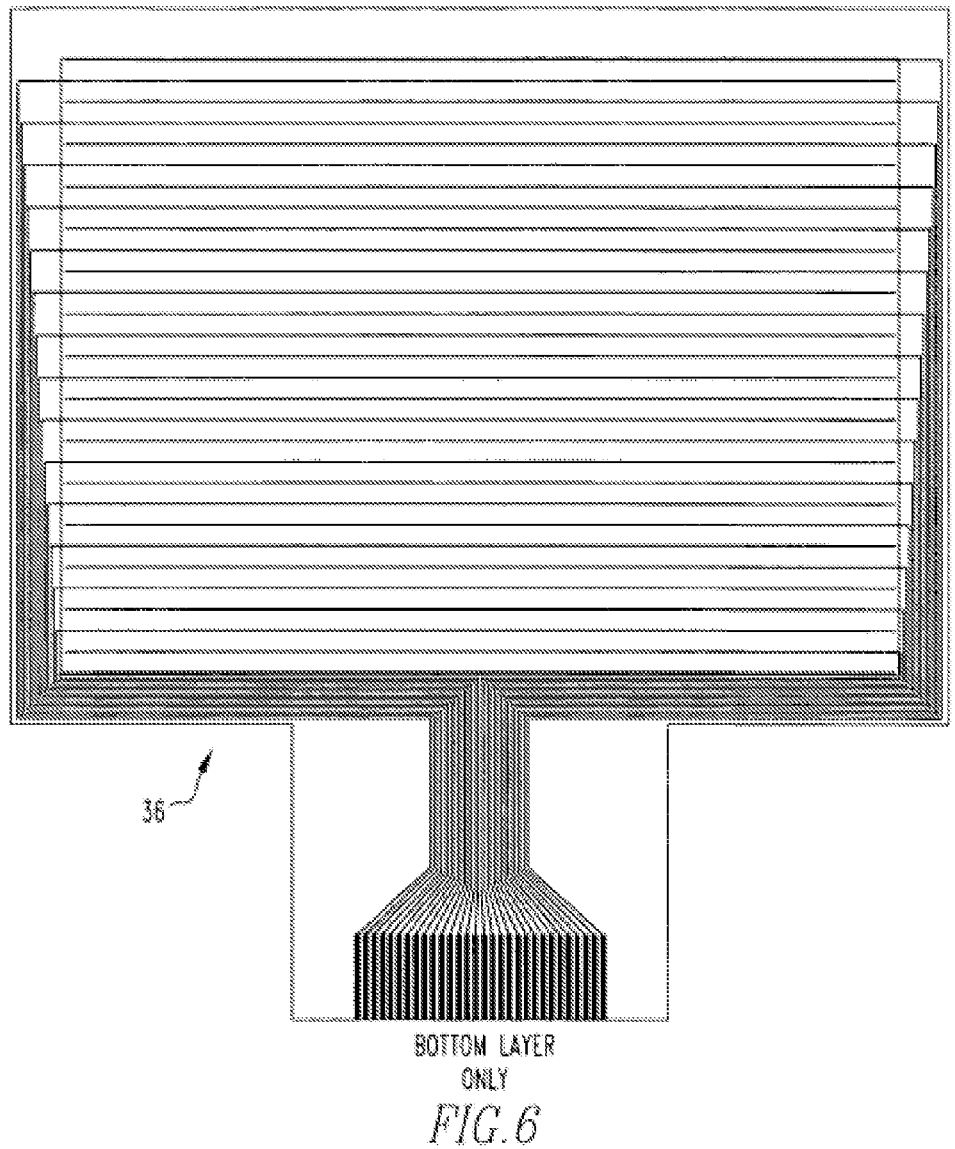
FIG. 6 is an overhead view of the bottom layer of the sensor said.

In regard to FIG. 6, there is shown the bottom layer only. VHB around edges should go right up to the start of the FSR material, but should not go over the FSR material. All the traces around the edges should be covered with VHB. The traces in the tail region should be left exposed. There should be at least one small air gap in the VHB on the left side of the sensor to keep a vacuum from forming inside the sensor. The traces on the tail should be exposed so that a ZIF or zebra connector can be put on in the future. For testing, the traces can be isolated with a piece of paper. 0.1 inch spaced connectors will be cramped to the rightmost part of the tail.

Figure 7:
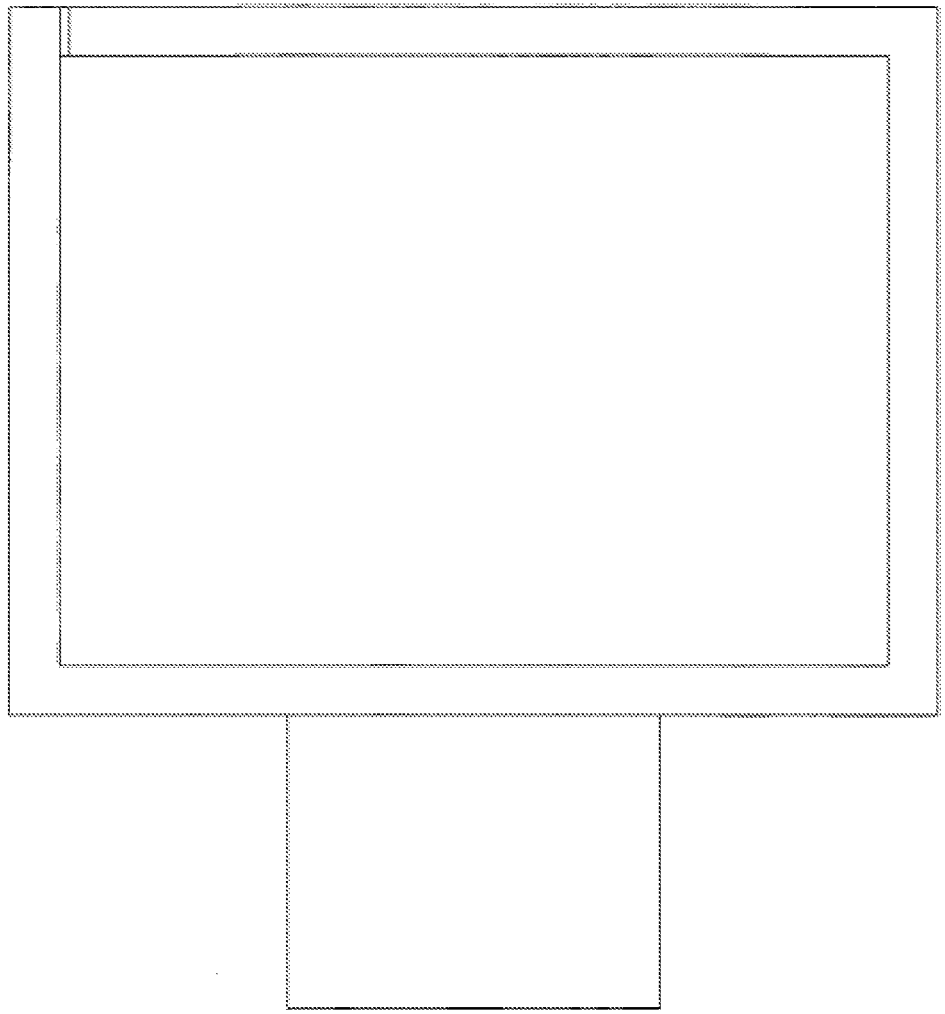
FIG. 7 shows the VHB seal layer only of the sensor pad.

In regard to FIG. 7, there is shown the VHB seal layer only. VHB around edges should go right up to the start of the FSR material, but should not go over the FSR material. All the traces around the edges should be covered with VHB. The traces in the tail region should be left exposed. There should be at least one small air gap in the VHB on the left side of the sensor to keep a vacuum from forming inside the sensor. The traces on the tail should be exposed so that a ZIF or zebra connector can be put on in the future. For testing, the traces can be isolated with a piece of paper. 0.1 inch spaced connectors will be cramped to the rightmost part of the tail.

Figure 8:
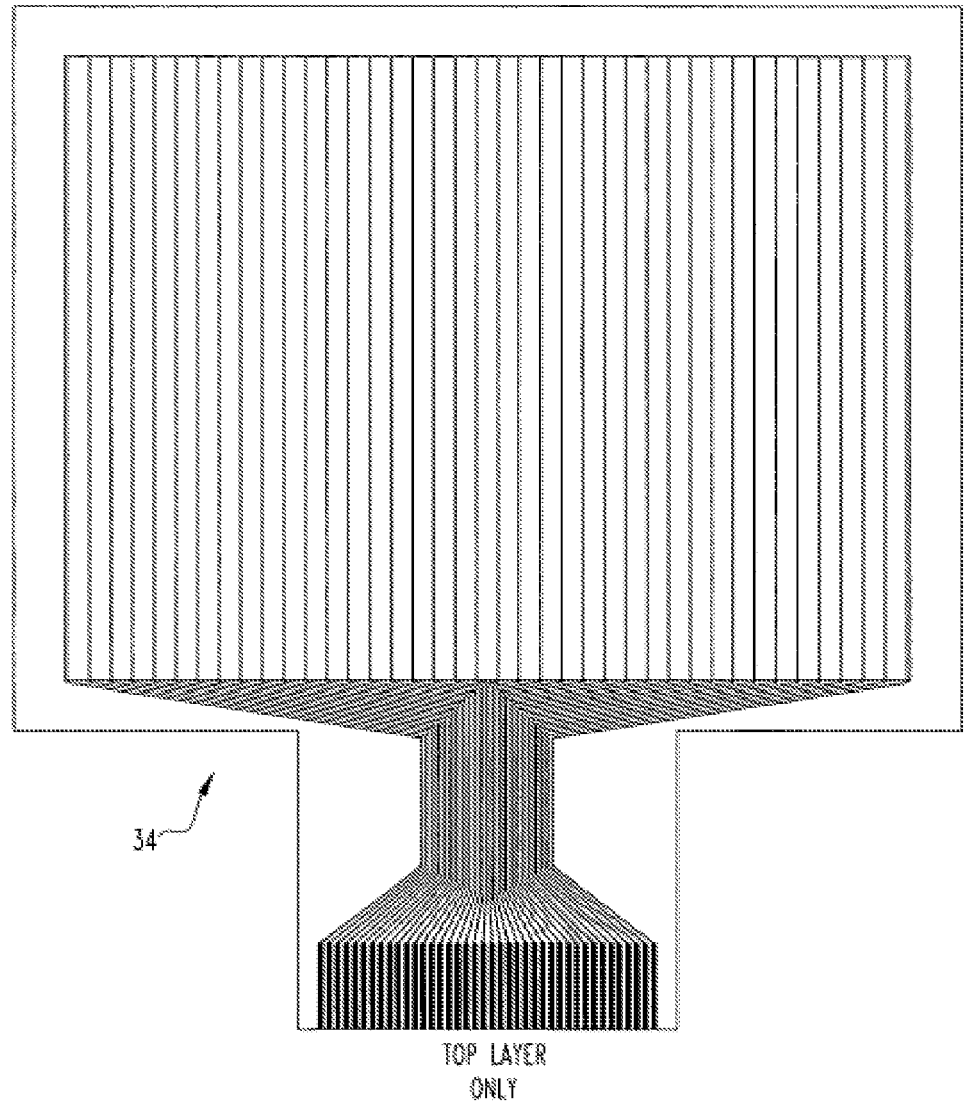
FIG. 8 shows the top layer only of the sensor pad.
Figure 10:
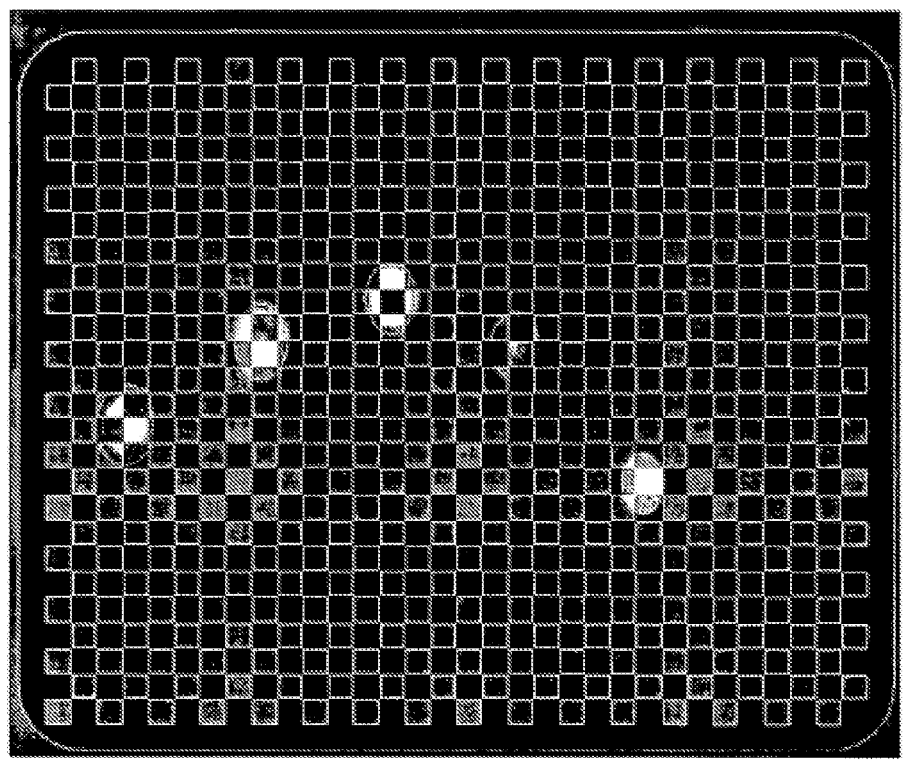
FIG. 10 is a screen capture of five fingers pressing against the sensor pad simultaneously.
Figure 11:
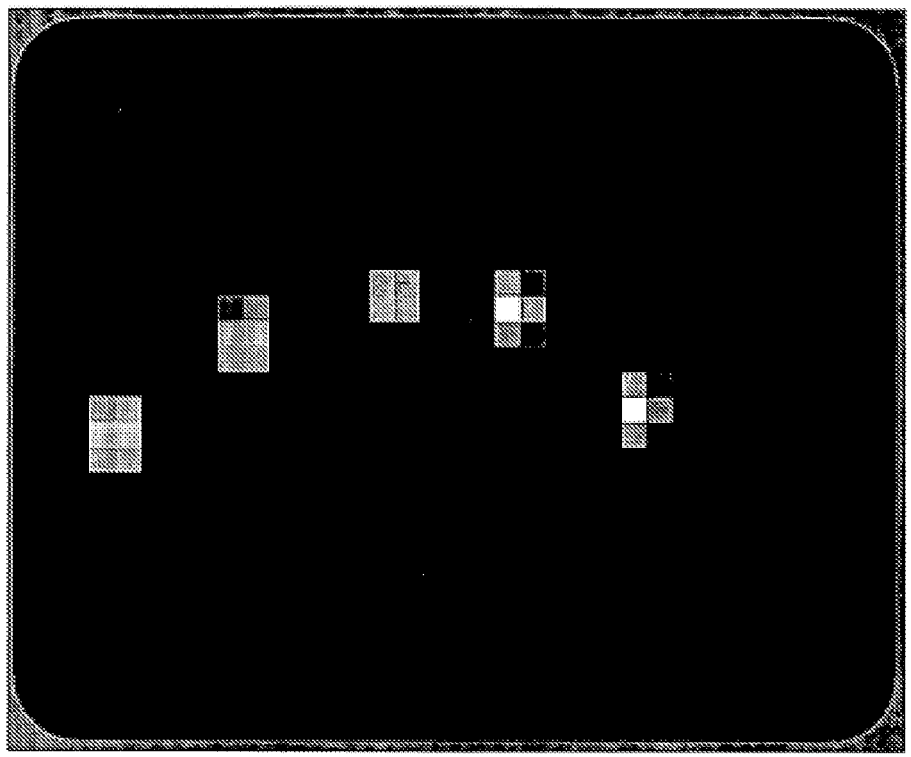
FIG. 11 is a screen capture of five fingers pressing against the sensor pad simultaneously.

In regard to FIG. 8, there is shown the top layer only. VHB around edges should go right up to the start of the FSR material, but should not go over the FSR material. All the traces around the edges should be covered with VHB. The traces in the tail region should be left exposed. There should be at least one small air gap in the VHB on the left side of the sensor to keep a vacuum from forming inside the sensor. The traces on the tail should be exposed so that a ZIF or zebra connector can be put on in the future. For testing, the traces can be isolated with a piece of paper. 0.1 inch spaced connectors will be cramped to the rightmost part of the tail.

Algorithms for Processing Input Data:

1) Calibration of steady state values: In order to know when and where there is contact on the UnMousePad and when there is no contact, it is important to be able to calculate the steady state value of a sensor pad. For this the invention employs a technique originally developed for SmartLines sensors, but which has not been previously described anywhere. The following is a description of the algorithm: For each input sensor, maintain a variable that represents the value that the sensor produces when it is not activated. The correct value for that variable may fluctuate with temperature and other external factors. If over time the input sensor reports a value that is higher than the calibrated value, increase the calibrated value, and vice versa. There is no need to force the user to invoke a calibration step; calibration is done automatically. To effect automatic calibration, gradually decrease the calibrated value when the input is smaller and gradually increase the calibrated value when the input is larger. In order to avoid causing the value to increase when pressure is applied to the sensor thereby causing an insensitivity in that area of the sensor, make the rate at which the calibrated value increases with pressure very, very small, such that it only increases significantly over a much longer period than the time that a user would hold down the sensor in one spot. An example of such a sufficiently long time is 20 minutes. Additionally, make the rate at which the calibrated value decreases much higher than the rate at which it increases. This way, when a user repeatedly activates the sensor, the calibrated value will not slowly increase over time, because the calibrated value will drop relatively quickly between activations.

UnMousePads have been built that are 8.5"×11" in size and have a resolution of ¼" with 29 rows and 19 columns.

Scanning algorithm description: (This is the algorithm that runs on the microprocessor to scan inputs.)

```
INITIALIZATION:
    Initialize USB interface (or other interface) to computer.
    FOR R = 1 to NUM_ROWS
        Set pin for row R to be an output
        Set output of pin for row R to 0 (so that it is grounded)
    END FOR
    FOR C = 1 to NUM_COLUMNS
        Set pin for column C to be an output
        Set output of pin for column C to 0 (so that it is grounded)
    End For
    Allocate a 2D array of dimension NUM_ROWS x NUM_COLUMNS called
SCAN_DATA
    START INFINITE LOOP: (this is for scanning the data)
        FOR R = 1 to NUM_ROWS
            Set output of pin for row R to 1 (+5V or +3.3V depending on chip)
            FOR C = 1 to NUM_COLUMNS
                Set pin for column C to be an input
                Wait a small amount of time (this is not required, but may be necessary
    in some cases to allow voltage to settle)
```

```
             Measure voltage of pin for column C with A2D (analog to digital
converter) and store value in SCAN_DATA[C,R]
             Set pin for column C back to being an output
          END FOR
          Set output of pin for row R back to 0 (so that it is grounded)
       END FOR
       IF user wants raw data THEN
          Send entire SCAN_DATA array over USB interface (or other interface) to
computer.
          Optionally, we can send just the SCAN_DATA items that changed to
minimize amount of data transferred.
       ELSE IF user wants processed data THEN
          (This assumes that the microprocessor is fast enough to process the data. On
slower microprocessors, this processing can be done on a computer.)
          Allocate a SCAN_BUFFER that will be used to temporarily store processed
data before being sent to computer.
          Calculate the THRESHOLD at which we count a sensor element is
considered as being activated:
             Calculate histogram of SCAN_DATA items.
             Use histogram to find the value of the majority of sensor elements and
store in MAJORITY_VALUE.
             Set THRESHOLD_VALUE to MAJORITY_VALUE +
OFFSET_VALUE, where OFFSET_VALUE is a small experimentally determined value which
eliminates false sensor activations.
          Create ACTIVATED_ITEMS - a list of all SCAN_DATA items (sensor
locations) that have a value above THRESHOLD.
          Create CONNECTED_ITEMS - a list of connected sets of activated sensor
locations by using a flood-filling algorithm over ACTIVATED_ITEMS.
          FOR EACH ITEM in CONNECTED_ITEMS
             Calculate WEIGHTED_AVERAGE_POSITION - the average position
of the connected items weighted by force at each location.
             Calculate TOTAL_FORCE - the sum of all the connected items.
             Calculate SHAPE - which consists of the length, height and rotation of
an oval which best describes the shape of the applied force.
             Add these three calculated items into the SCAN_BUFFER
          END FOR
          Send the SCAN_BUFFER over USB (or other interface) to computer.
       END IF
   END INFINITE LOOP
```

During operation, the Pad measures the pressure at all points along its surface 16, interprets that data, and sends the data to a computer over an interface 28 such as USB. Thus, it can detect when it is not being touched, when it is being touched with a single finger, a stylus, or any other object, or when it is being touched at multiple points by fingers, styluses or other objects. To begin using the Pad, the user would start by plugging it into a USB port on a computer (assuming we're using a USB interface). The computer would then give power to the Pad, which will cause the Pad to initialize. After the initialization, the computer will detect the Pad, initialize the driver for it (or ask the user to install a driver if it is not already available) and begin reading input data from it.

At this point the user will begin using the Pad. Whether the user uses a single finger, multiple fingers, a stylus, or any other objects to press on the Pad, the same exact operation will happen, so for purposes of simplicity, we will assume the user is using a single finger. As soon as the Pad is powered on, it begins scanning the surface 16 of the Pad to detect any pressure that is exerted. Each time it performs a scan, it will measure the pressures at all points on the surface 16. It performs the scanning by applying a positive voltage on each row 22 one at a time, and then reading out the voltage values on each column 20 one at a time. In this way, it measures a voltage for each row 22 and column 20 combination which corresponds to the pressure applied in the vicinity of the intersection of the row 22 and column 20. All of the rows 22 and columns 20 except for the ones being scanned should be connected to ground by the microprocessor. This has a twofold effect. First, it limits the crosstalk between far away columns 20 and rows 22 (localizing the output given pressure applied at a single point). Secondly, it creates voltage gradients between rows 22 and between columns 20. These voltage gradients allow us to detect pressure applied between row 22 and column 20 electrodes 24, and produce a measurable voltage at the column 20 electrodes 24. The Pad cycles through this scanning algorithm at a rate which should be high enough to detect quick taps on the surface 16 (for example, 100 Hz). After each scan, the Pad sends information about the applied pressure to the computer over the USB connection (or other interface). A detailed description of the information may be found below.

When a user applies pressure to the Pad with a single finger, he will cause the FSR ink of the top layer and the FSR ink of the bottom layer to press together in a localized area with the shape of the user's fingertip. As the row 22 and column 20 scanning progresses, it will detect increased voltages at the row 22 and column 20 intersections that are near areas where the top and bottom layer of FSR ink are touching. Thus, these row 22/column 20 intersections with increased voltages are going to be clustered around locations with pressure. These increases in voltage are due to current flowing from the powered on row 22 through the FSR layer covering the row 22 electrodes 24, then through the portion where contact is made, then to the FSR layer covering the column 20 electrodes 24, then through that FSR layer, and finally to the column 20 electrode 24 near that FSR layer. The greater the pressure applied at a given point, the more current will flow, and the higher the output voltage will be. Similarly, the greater the surface 16 area where the pressure is applied, the higher the voltage will be. However, because we ground all of the columns 20 and rows 22 except for the ones where the scan is happening at a particular point in time, there cannot be a positive voltage anywhere except for the area between the rows 22 directly adjacent to the row 22 being scanned and the area between the columns 20 directly adjacent to the column 20 being scanned. Thus, during scanning, increased voltages will only be detected on the row 22/column 20 intersections which are directly under the area where pressure is applied or directly adjacent to the square of FSR material where pressure is being applied. Furthermore, this property implies that even if a small point such as the tip of a stylus exerts pressure in a square between two rows 22 and two electrodes 24, its pressure can be detected, and its position can be calculated from the relative strengths of the signals at the four row 22/column 20 intersections that are at the corners of the square.

In the case that multiple fingers or other objects are touching the Pad, multiple clusters row 22/columns 20 with increased voltages will be detected. When all forces are removed from the Pad, it will cease to detect any row 22/column 20 intersections with increased voltages.

There are five usage scenarios for the Pad. In the first scenario, the user will be using the Pad like a track-pad (in lieu of a regular mouse). In this scenario, the Pad driver or the firmware on the device will emulate a mouse in a similar way as a track-pad on many laptops; thus, in this scenario, the Pad will be able to operate like a regular track-pad. The emulation can work in the following way: the position of the mouse will come from the force weighted average position of all the pressure applied on the pad. However, the user may rest their palm on the pad. The driver/firmware should have an algorithm to detect palms (as large areas of pressure) and exclude them. Clicks can be detected when there is a light tap on the surface 16 (or a quick increase in pressure), right clicks can be detected as a tap by two fingers, and scrolling can be represented by dragging two fingers together. In this mode, the Pad may also interpret more complex gestures such as using two fingers to scale and rotate, and send scale/rotate signals to applications that support scale and rotate commands. In the second scenario, the user will be using the Pad as a tablet. In this scenario, the software will look for a small point of pressure and feed the position and pressure of that point to the computer while exclude all larger points of pressure (effectively filtering out fingers and palms). Mouse down events can be sent when the pressure exceeds a small threshold and mouse up when pressure is released. With this simple rule, moving the pen while exerting a light pressure will just cause the mouse to move/hover without clicking or dragging, a click can be activated by a tap on the surface 16, and a drag can be activated by applying pressure, moving the pen and then releasing. Right clicks can be represented as a tap followed by a long holding period. For the third scenario, it may be interesting to experiment with a mode which combines multi-touch input of the left hand with stylus input with the right hand. This is akin to the way an artist would hold a piece of paper in one hand while drawing with the other. This would essentially be a combination of the first and second usage scenarios and would have to be supported by software. In the fourth scenario, the Pad will be being used as a "raw" multi-touch input device along with application software that understands "raw" multi-touch input. In this scenario, the Pad will find all contiguous points of contact on its surface 16 and send a bundle of data to the application for each full scan which will carry a few pieces of information for each point of contact. This information will include the center point of the contact, the total force, and the shape of the contact which will be represented by an ellipse (with the ellipse's width, height and orientation angle being sent over). The application will be charged with interpreting the data it receives and doing with it what it wants. For instance, an application which simulates a touch pond will simply set off a wave any time it detects contact at any point on the pad in the corresponding location in the simulation. Finally, in the fifth operation scenario, the Pad will send the raw values that it reads as it is scanning to the computer in the form of a 2D grayscale image where the brightness of each pixel corresponds to the pressure exerted at the matching row 22/column 20 intersection. In this case, the application will have to do all the processing and interpreting of the data that it receives. This mode may be helpful for applications where users are trying to detect the shape or pressure of objects other than fingers, and get an "image" of the pressure applied. For instance, this mode may be useful by scientists or students who want to record the pressure patterns of a tire rolling over the sensor, the weight distribution of an athlete as he steps on a sensor, or the shape of a soccer ball during impact when it bounces on a sensor.

Needless to say, for operation of the Pad in all of the modes besides the mouse mode, the user might need software that has been written to support that type of interaction. For instance, a finger painting program that allows children to paint with multiple fingers will have to be able to interpret the multi-touch data from the sensor in order to operate properly. Otherwise, if it can only interpret the mouse input data, it will only allow painting with a single finger. Switching between the four different usage scenarios can happen via a hardware switch on the device or via a control in some configuration software for the device. An API can be provided which will allow the software that is using the device to request what kind of input data it requires. This will free the user from having to manually select the operating mode for the device. Finally, the device can provide several forms of input data simultaneously, allowing applications to select the preferred form of input data that they want.

Other multi-touch FSR sensors for measuring XY position and force such as the ones made by Tekscan and by Jazz Mutant have very closely spaced electrodes 24 for columns 20 and rows 22 that are overprinted with FSR material, but the FSR material is not a flood coat. In other words, it only covers the electrodes 24. Because of this, the prior art sensors have a very coarse resolution (they picks up forces at the intersections of row 22 and column 20 well, but cannot accurately estimate the position of a finger as it moves between two rows 22 and columns 20). The problem is even worse if a stylus is used because it will appear to jump between locations instead of moving smoothly across the screen. To compensate, those sensors can be made with a very large number of columns 20 and rows 22 to get a good positional resolution, but this makes the electronics for reading the columns 20 and rows 22 very slow and expensive. Another way that those sensors can compensate is by putting a soft rubbery pad over the sensor. However, this increases the thickness of the sensor and makes it impossible to write on it with a stylus.

One of the major improvement of the present invention compared to the prior art is that thin column 20 and row 22 electrodes 24 are used that are spaced appreciably far apart, and are covered with a flood coat of FSR or resistive material which fills in the space between the columns 20 and rows 22. Because the material acts as a linear resistor between the columns 20 and rows 22, the position of a stylus or of a finger that falls in between two columns 20 or two rows 22 can be accurately measured without having an unnecessarily high number of columns 20 and rows 22 and without having to put a rubber pad over the sensor.

In an 8.5"×11" sensor, there are only have 30 columns and 40 rows which are spaced ¼" apart. Despite the small number of columns 20 and rows 22, the position of a finger or of a stylus can still be accurately measured, and have it move smoothly over the screen as a user smoothly moves their finger over the sensor.

As a side benefit, because there are so few columns 20 and rows 22, a single $7 microchip can be used to acquire reading from the entire device. Similar devices made by companies such as Tekscan and Jazz Mutant cost over $1,000 dollars because they have a very large number of columns 20 and rows 22 and contain a huge amount of electronics to acquire the large number of signals. Despite this, they still can't track a finger or stylus as accurately as the technique here. Another benefit is that resistors on each of the columns 20 do not have to be used for the purposes of converting current flow to voltage as with other devices because the FSR/resistive material printed over the traces performs this function on its own.

Another advantage of the present invention is that it is not necessarily being made to be a multi-touch device that goes over a screen. The pad can just as easily be used on a table while looking at a screen which displays the user input.

Drawing an L or any other shape is now described.

First is described what the user is seeing on the screen. When the pad is used on a desktop, the user has to be shown where their hand is with relation to things on the screen akin to the way a mouse pointer shows users where their mouse is in relation to things on the screen. To do this, an overlay is rendered on the screen such that finger tips appear as transparent ovals on the screen. The size and shape of the ovals should correspond to the size and shape of the contact point where the user is touching. As the user applies more pressure, the size of the contact point grows, and a visual indication shows that the pressure is increasing. The same goes for use with a stylus. When the user moves a stylus over the pad, a point is displayed on the screen so that they know where their stylus is in relationship to the screen. A way is also provided to indicate when pressure is applied. This can be done by growing the size of the contact point or changing its color (from red to blue for example). This all is handled by the operating system so that it works for every application, but it could be handled by individual applications as well.

An important difference between the pad and something like a Wacom tablet is that the pad cannot track a stylus point when it hovers over the pad. The user will have to lightly scan their stylus over the paper so that they can see on the screen where it is with relation to the applications they are using. However, because the pad can measure pressure accurately, added pressure can be used to activate a "click" or a drag.

A tap can also be used to indicate a click, or a double tap to indicate a double click. In the case of a drawing application, the stylus can be made to start drawing when a certain level of pressure is reached. The level of pressure can also be applied to vary the thickness of strokes.

Returning back to drawing an L. If the user is drawing with a stylus, they would lightly touch the pad to see their cursor on the screen. What happens here is that, the driver/hardware would detect a point of pressure and create a unique identifier for it so that it can later reference that point. It would then send the operating system a notification that it should create a cursor for that stylus point along with the unique ID, the location of the cursor and the current pressure. Let's say the ID for the stylus is 0. As the point is moved, the driver/hardware should track that point and send events to the operating system that the point is moving using the unique ID to refer to that point. It should also send the current position and pressure of the stylus point. The operating system will then update the position of the cursor and appearance of the cursor on the screen. The appearance may change with varying levels of pressure as described above. The user would then use this feedback to move their stylus to the point where they want to start drawing. As this is happening, the operating system may also send "cursor hover" messages along with cursor position and force to various applications that the cursor is moving over so that the applications can have an idea of where the cursor is. The application can use this information to, for example, highlight buttons or hyperlinks when the user moves the cursor over them. In the case of a paint application the application can display the shape of the paint brush in the place where the cursor point is so that the user will have an idea of where they will raw if they push down on the stylus. Then, when the user is ready to start drawing, they would apply extra pressure. The hardware/driver will register this extra pressure and determine that extra pressure was added to cursor point 0 and notify the operating system. At some point, the hardware/driver will decide that the pressure is high enough to be counted as a "cursor down" event. The operating system and/or driver software can have a dialog that allows the user to adjust the threshold pressure at which they want to trigger a "cursor down" event in the same way that users now can adjust mouse sensitivity in the control panels of operating system. When the hardware/driver detects a "cursor down", it will notify the operating system with the pressure and position of the cursor down event. The operating system will then give the user some feedback that they've generated a "cursor down" using an audible click and/or a visual change in the appearance of the cursor. The operating system will also notify the application that a cursor has touched down at a specific point, sending both the "cursor down" coordinate, the unique ID for the cursor and the current pressure. As the user continues to move their cursor in order to draw an L and applies varying amounts of pressure, the hardware/driver will notify the operating system of changes in position and pressure by sending "cursor moved" notifications to the operating system using the unique ID to refer to the stylus point and sending down new position and force values. The operating system will then send these notifications to the application in which the user is drawing. The operating system will also continue to draw the "cursor point" on the screen. The application will begin to fill in pixels with black color in the areas where the user has drawn a line and to store an internal representation of where the user has drawn (this may vary with the implementation of the application). When the user is done drawing the L, he will release pressure from the stylus. As soon as the pressure drops below the threshold set for "cursor down" events, a "cursor up" event will be generated by the hardware/driver for unique ID 0 and sent to the operating system along with the position and force of the event. The operating system will then give the user notification that they have triggered a "cursor up" event. It can do this by playing an audible un-click sound and/or via a visual change to the appearance of the cursor. The operating system will then send the "cursor up" event and all the associated information to the application. The application will then stop the drawing of the line on screen. The hardware/driver will then go back to the state of notifying the operating system of the movements of cursor ID 0 so that it can update its cursor on the screen. The operating system will then go back to the state of sending "cursor hover" messages to the applications that the cursor moves over. When the stylus is lifted, the hardware/driver will detect the stylus being lifted and notify the operating system that they cursor with Unique ID 0 has been lifted along with the position and last recorded force. The operating system will then cease to draw the cursor on the screen.

In the case that this is being done with a finger rather than a stylus, the same exact things would happen except the shape of the cursor on screen may correspond more to a finger. Also, we may want to send the shape of the oval that is being detected by the hardware/driver over to the application rather than just the position and force. This will allow the application to give a richer user experience. For instance it can paint lines in the shape of the user's finger and increase the thickness as extra pressure is applied.

If multiple fingers are being used to draw simultaneously, the hardware/driver will send the exact same information. However, for each additional finger that makes contact besides the first finger, the new fingers will receive different unique IDs that will distinguish messages sent for the additional fingers versus the messages sent for the first finger. Whenever a finger is released, its unique ID will be returned to a common pool so that it will be possible to reuse it in the future for later finger-touches.

As for how multiple finger tips are interpreted for detecting various gestures, and for what the applications do with the input for multiple fingers, that is mostly up to the operating system and the given application.

Both the electrodes 24 and the flood coat are made via a screen printing process, the process of which is well known. The screens are produced with a photographic process, the process of which is well known. The inks are printed in a printing press, as is well known, and then the sensors are put into an oven to dry the inks.

The electrodes 24 are made of a silver ink which is highly conductive. Silver is also preferable because it doesn't corrode.

The FSR coat is printed with a screen pattern which has a large square opening at the center.

In order to have consistency and a smooth finish, and to make sure none of the silver sticks through the FSR, more than one FSR layer is printed over each other. Typically, between 1 and 4 layers are printed. The FSR inks can also have different additives added in to adjust their resistivity and response to pressure. For instance, a carbon ink can be added in to make the FSR ink more resistive. See also WO/2006/138618, incorporated by reference herein.

FSR stands for force sensitive resistor. FSR ink is an ink that is resistive and rubbery and has a rough upper surface 16. When it is pressed against a conductive surface 16, it begins to conduct, but the roughness creates air gaps between itself and the surface 16. As more pressure is applied, it conforms to the shape of the surface 16, increasing the surface 16 area that is in contact and conducts more. In fact, the conductivity has an approximately linear relationship with respect to pressure. The resistivity is 1/conductivity, so the resistivity actually varies proportionally to the inverse of the pressure.

The following is how signals from the sensor are processed:

1. Scan Sensor and Generate a 2D Array of Voltage Values

When the hardware scans the analog values from the sensor using the scanning algorithm that described herein, it is going to essentially get back a 2D array of values of size NUM_ROWS×NUM_COLUMNS, where each value corresponds to the voltage read out for a given row/column intersection. The values are probably going to be 8 bit, 10 bit, 12 bit or 16 bit integers read out from the A2D converter. So, this is the input that we use to do the rest of the processing. Note that it is beneficial to do this processing on the microcontroller that reads out the data so that all of that data doesn't have to be streamed over the USB/other connection to the computer. Once we have done the processing, we will be left with a small amount of information for each frame. This information will essentially be a list of the contact points (or connected segments). Each contact point will have an ID, a pressure, a center, and dimensions of an oval which can be used to describe the shape of the contact point.

The following is the algorithm for detecting points on the surface 16:

2. Convert Voltages into Pressures

First, we have to take all the analog voltage values and convert them into pressures. For the embodiment described here, we have just been using the voltage directly as pressures assuming that it is proportional to the pressure and the result has been good.

3. Determine which Points are being Touched

Once we have pressures, we need a way to determine at which points there is contact on the sensor. To do this, we have an algorithm which is constantly calibrating the value that each row 22/column 20 intersection on the sensor gives when it is not being touched. The algorithm works by ignoring any contact that occurs over a very long period of time. This is similar to how our skin adapts to pressures . . . if someone touches us unexpectedly, we notice it immediately, yet when we are carrying a heavy bag on our shoulder, we completely forget about it. This way, if you put the sensor on top of a penny (as an example), it might detect the penny for several seconds, but it will forget about it quickly. The way we do this is we store an extra 2D array of size NUM_ROWS× NUM_COLUMNS for the calibrated values. Every frame we run a calibration routine. The way it works is that if the current value is larger than the calibrated value, we increase the calibrated value by a tiny amount which is fixed. If the current value is lower than the calibrated value, we decrease the calibrated value by a tiny amount which is fixed. The "tiny amounts" should be selected so that it takes a longer time for the sensor to adapt to a pressure than a person would spend pushing on a single point. For instance, if the users never press on a point for more than 10 seconds, it would be safe to adapt to a pressure that is constant for 2 minutes. Another improvement on this scheme is to decrease by a larger amount than the amount by which the calibrated value is increased. By doing this, the calibration routine will "prefer" to return to a smaller value. This is useful in the case when a user might tap the sensor repeatedly. During the times that the finger is down, the calibrated value will increase a tiny amount, but when they lift the finger up, the value will quickly return to the correct calibration value.

Once the calibration data is obtained, the calibration value is simply subtracted from each pressure value obtained in the 2D array from step 2. This is now used as the new array of pressure values, since there is no concern about the steady-state pressures. Next, pressures in the array are looked at, and if any of the pressures is larger than a small constant threshold. The threshold should be an experimentally determined pressure which is greater than 0 but smaller than the pressure a person applies when lightly touching something. Anywhere where we see a pressure that is greater than the threshold pressure we deem a contact point.

4. Find the Seed Points for Connected Segments

Whenever a fingertip or a stylus applies pressure, there should be a central point where the pressure is the greatest. In this step, for all contact points, we try to find the points that are a local maximum. In other words, we are looking for points that have higher pressures than their neighboring points above, below, to the left, right and in the diagonal directions. This is as straightforward as a loop over all the pressure values and a comparison for each iteration of the loop with the 9 neighbors. After doing this, we should have a list of all the SEED POINTS (the centers of all of the points where a finger or stylus is touching).

5. Find the Connected Segments

Now we want to find all the connected areas around each seed points. In other words, we have already found the center of where each finger/stylus is touching and we now want to find the entire area for a finger/stylus that is touching. First, we create a list of segments (one for each seed point) with each segment being a list of points. Each seed point is added into one segment. Now, for each segment, we look at all the points that neighbor the points already in the segment. If we find a point that is a contact point and is not already a member of another segment, we add that point to be a member of the current segment. After completing this algorithm, we will have a list of segments with each segment containing all of the connected points belonging to a single contact point.

6. Find the Centers and Pressures of Connected Segments

Now, for each segment, the center is desired to be found. This is done by taking a weighted average of the positions of the points that comprise a segment. The values are weighted by the pressure at each of the points. The total pressure exerted on a segment is also found by summing all the pressures.

7. Find the Variance (Major and Minor Radius and Skew) of Each Connected Segment Now, we want to find an oval to describe the shape of each contact point. We do this by calculating the variance in the X and Y direction of the distribution of the segment's pressures around the center of the segment. We calculate the skew by calculating the variance in a diagonal direction. These can then be used to describe an oval that closely matches the shape of the connected segment. Note that the oval describing a stylus point will have a diameter about the same size as the spacing between rows 22 and columns 20. Although this in not accurate, as long as the spacing is smaller than the size of a finger, it will be easy to tell the difference between a stylus and a finger by looking at the shape of the oval. Furthermore, this doesn't matter too much for the tracking of a stylus because the center position and pressure readings of a stylus point and pressure should be very accurate.

8. Track Connected Segments

Previously, we mentioned that contact points receive unique IDs such that when a finger/stylus moves, they retain the same unique IDs. This can be done by remembering all of the information about connected segments from the previous frame of data. Then, after we've calculated the positions, forces, and ovals that describe all of the connected segments found in the current frame, we try to match them up with segments from the previous frame. We do this by finding the segment in the previous frame that is closest to the given segment in the current frame. Next, we look at the distance between the two, calculate the speed which the finger/stylus would have had to be going to travel that distance in one frame and decide if that can possibly be the same finger/stylus. Next, we compare their pressures, sizes and oval shapes. These too should be fairly similar between frames. If all of these checks pass, then we assign the ID from the segment in the previous frame to the segment in the current frame. Any segment in the current frame that does not find a match in the previous frame is deemed to be a new contact point and is assigned a new unique ID. Any segment which was present in the previous frame but could not be found in the current frame is deemed to be a segment from which the user lifted their finger. Note that this tracking can be easily done in driver or operating software because it doesn't require any of the data in the 2D array . . . it just requires the list of contact points found in the previous frame. The advantage of doing this in the driver or OS is that it is usually much easier to improve or upgrade driver/OS software than it is to update firmware that is on an external device.

9. Filter

Filtering on the data may be desired. For instance, it might be desired to filter out palms since we don't want people to accidentally click on things with their palms. This can be done with heuristics such as ignoring a contact point that has a very large surface 16 area, but a low pressure given the surface 16 area. Another filtering technique is to try to match palms with fingers. It is known that a palm will usually be found below a finger, so if a large contact point is found below a small contact point, it can be assumed this is a palm. Just like the tracking of connected segments, this filtering step can be performed in a driver or in the operating system, and it is advantageous to do this in the driver/OS for the same reason as it is advantageous to do the tracking in the driver/OS.

The same technology described above for a pad, or more specifically a hand pad if it is wished to be called that, can be used for a footpad, simply scaled up to a larger size. In particular, the foot pad is the identical technology to the hand pad, other than being scaled up to a larger size. The number and arrangement of sensing elements and the grid wiring pattern and the electronics and the application software are all the same. In the embodiment described herein, the size ratio between the hand pad and foot pad happens to be on the order of the difference between a human finger length and a corresponding human foot length, which is about a factor of twelve. But in fact the scaling can be any factor.

The present invention pertains to a novel sensor modality that enables an inexpensive multi-touch, pressure acquisition device (IMPAD), or pad, as referred to here. IMPAD technology can detect multiple points of pressure with continuous bilinear interpolation, permitting both high-frame-rate and high quality imaging of spatially variant pressure upon a surface 16.

Though the use of force variable resistors as multiple points of contact input devices is not new, previous work in this area has focused on arrays of discrete and independent sensors. The key difference between IMPAD and previous technologies is that IMPAD more closely mimics the multi-resolution properties of human skin, in which the position of a touch can be detected at finer scale than the discrimination of multiple touches.

Because IMPAD sensors are inherently unobtrusive, inexpensive, and very durable, they have many potential uses. They can be placed on massive objects such as the hull of a ship to continuously track water pressure, or along the load bearing structures of buildings in fault zones to track the results of seismic activity. IMPAD sensors can be placed inside the soles of shoes with a resolution fine enough to detect the subtlest of movement to study stance and posture.

The development of IMPAD sensors and an improved understanding of their electrical properties enhance the type and quality of information that may be obtained in situations where entire images of pressure need to be constantly and continuously tracked.

IMPAD has a very wide range of potential applications in many sectors of society, primarily because it enables multi-touch pressure imaging at a low cost in a wide variety of form factors. Applications for which this technology will have a direct and potentially transformative impact include floor mats and entry sensors, bio pressure sensors, musical instruments, baby monitoring, drafting tables, reconfigurable control panels, writing pads, grocery and warehouse shelves, hospital beds, construction materials, wheelchairs and other assistive devices, sports equipment, sports clothing, portable electronic devices and tire pressure sensing.

IMPAD (Inexpensive Multi-Touch Pressure Acquisition Device) is a new category of device for acquiring a real-time image of pressure over a surface 16. An IMPAD sensor consists of five layers: the first and fifth (outer) layers consist of parallel wires. The direction of the parallel wires on layer 1 is substantially orthogonal to the direction of the parallel wires on layer 5. The second and fourth layers consist of electrically conductive material possessing substantial electrical resistance. The third (middle) layer consists of a force sensitive resistive (FSR) material—a material whose electrical resistance decreases when compressed by an outside force. This middle layer can be any material whose resistance changes in response to pressure. It is even possible to use a material whose resistance increases as pressure is applied. As for materials where resistance decreases with pressure, there is FSR ink, FTR (force transducting rubber), and anti-static foam (which conducts more as it is compressed).

Figure 12:
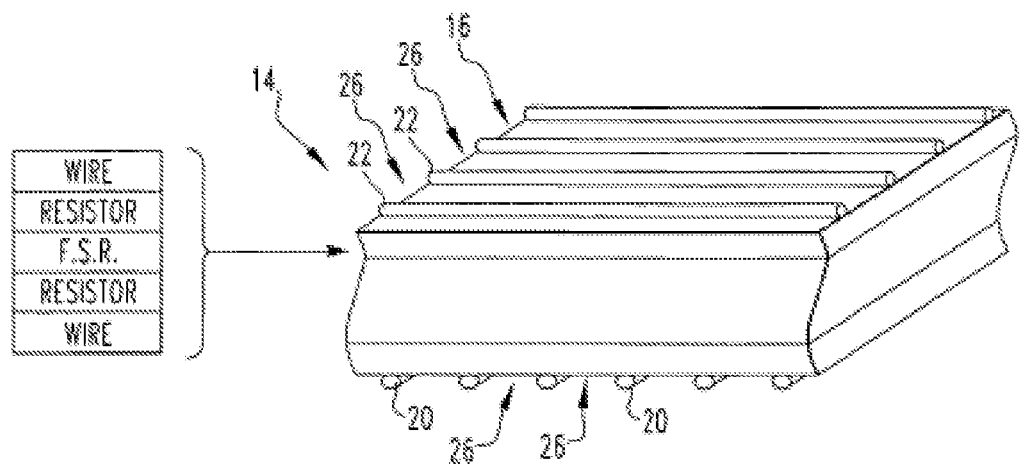
FIG. 12 shows a cross-section of the sensor pad.
Figure 13:
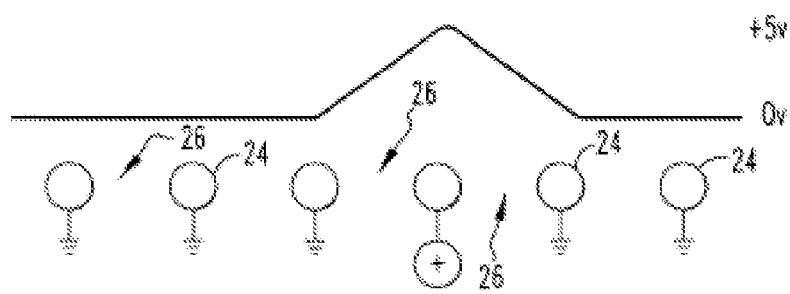
FIG. 13 shows a linear drop-off in voltage between a source wire and its two neighbors in regard to a force on the sensor pad.

The mechanism of operation is as follows (FIG. 12): One of the wires along layer 1 is sourced to a positive voltage, while all other wires in layer 1 are set to ground. Positive charge flows across the surface 16 from the source wire to its two neighboring wires, via the resistive material in layer 2, creating a linear drop off in voltage between the source wire and its two neighbors (FIG. 13).

Every two clock cycles, the positive voltage is shifted to the next wire over. If there are N wires across layer 1, the pattern repeats every 2N clock cycles. Meanwhile, at every even clock cycle all over the even numbered wires in layer 5 are metered to output while all of the odd-numbered wires layer 5 are connected to ground. At every odd clock cycle the even-numbered wires are set to ground while the odd-numbered wires are metered to output.

Alternately, the voltages at locations between pairs of column 20 and row 22 wires can be scanned serially one by one by powering the desired electrode 24 on layer 1 and reading a voltage from the desired electrode 24 on layer 5 while all other electrodes 24 on layers 1 and 5 are grounded. This generally limits the scanning rate, but may be sufficient for some applications such as those where simpler electronics are used which can only read a single voltage at a time.

When external pressure is provided at a point on the surface 16 that adjoins the source wire on layer 1, electricity flows transversely from layer 2 through layer 3 to layer 4. The relative proximity of this touch to the positively charged source wire on layer 1 influences the voltage of this transverse flow. Some of the flow makes its way, via the resistive material in layer 4, to one of the adjoining wires in layer 5, whereas the remainder of the flow makes its way to the other adjoining wire in layer 5. One of these wires is metered whereas the other is set to ground. The relative proximity of the touch to the metered wire also influences the voltage that will be measured at that wire.

Because of the time-varying pattern of sourcing and metering, a point touch will produce a non-zero output voltage at each of four clock cycles during the 2N steps of the repeating pattern. These four voltages can be used together to determine not only the magnitude of the pressure at that point, but also the relative location of the point within the square that is bounded by the four nearest wires—two on layer 1 and two on layer 5.

The above is an idealized description to illustrate the principles. In practice the IMPAD mechanism can be implemented in many different ways. For example, the wire layers 1 and 5 can be embedded within the resistive layers 2 and 4. Or layers 2 and 4 can themselves be FSR material, with layer 3 implemented as an air gap. In this implementation, external pressure creates greater contact surface 16 area between layers 2 and 4, thereby reducing electrical resistance between them. The layers don't even need to have a consistent ordering. For example IMPAD can be implemented as a woven material, in which the wires of layers 1 and 5 form the warp and weft of the cloth, respectively, and each wire is coated with a thin layer of resistive material—external pressure causes greater contact area between these interwoven coated wires.

Also, the resistive material that comprises layers 2 and 4 do not need to be spread out over the entire surface 16. They can each, for example, run along one edge of the surface 16, or in thin strips along the surface 16, in a direction perpendicular to the direction of the corresponding conductors. For example, one or more resistive strips constituting layer 2 can each run perpendicular to the conductors of layer 1, and one or more resistive strips constituting layer 4 can each run perpendicular to the conductors of layer 5.

Several IMPAD devices have been built using existing techniques for the manufacture of FSR sensors. An implementation of IMPAD consists of two paper-thin 8.5"×11" sheets of PET plastic attached together at the edges. On the inner side of each sheet is a circuit pattern consisting of parallel electrodes 24 spaced at ¼" intervals. A connector area is provided on one side for attaching electronics, which interface 28 to a computer.

To provide force sensitivity, the electrodes 24 on both sides are over-printed with a solid layer of FSR (Force Sensitive Resistor) ink. The IMPADs that have been manufactured use an FSR ink, which is semi-conductive and rough at a microscopic scale, so as it compresses, the conductivity between the top and the bottom layers increase in a fashion that is approximately linear with the force applied. The FSR ink also allows current to flow along the surface 16 of each sheet between adjacent electrodes 24. This flow allows the IMPAD to simultaneously sense the position and pressure of points that are anywhere between two electrodes 24, making it possible to detect and continuously track all pressure points, even ones smaller than the ¼" spacing between electrodes 24.

Figure 14:
FIG. 14 shows a user pressing his hands down on the IMPAD.

FIG. 14: This image shows a user pressing his hand down on the IMPAD. The attached computer displays a contour-line representation of the space-variant pressure exerted on the IMPAD.

The output lines of the sensor are connected to a circuit board which consists of some shift registers and a micro-controller which acquires readings and relays them to a computer. The micro-controller uses the shift registers to power one column 20 electrode 24 at a time, then reads analog voltage values from each even row 22, followed by each odd row 22. It then switches to the next column 20 and repeats for the remaining columns 20. The micro-controller converts those analog voltage values to a digital value with an onboard A/D converter. Finally, the micro-controller sends the complete frame of data to the computer. Some IMPADs currently capture pressure images at about 50 cycles per second on a grid of 29×39 electrodes 24, and can go up to a frame rate of 500 cycles per second.

Figure 15:
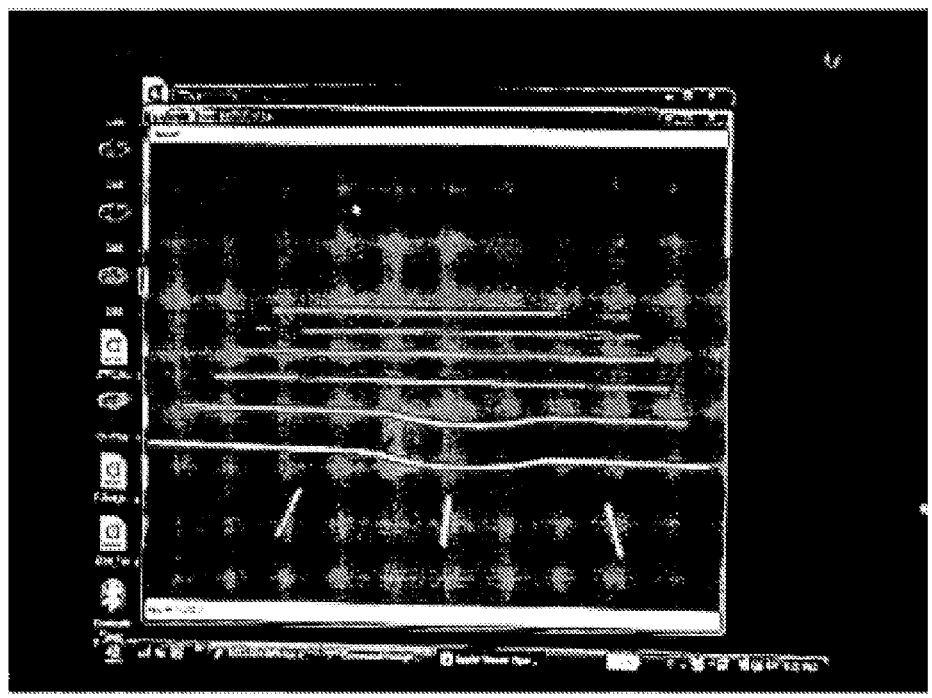
FIG. 15 is an illustration of the IMPAD principle in operation.

FIG. 15: An illustration of the IMPAD principle in operation. The darker line represents a powered row 22 electrode 24 on the top layer. The lighter lines represent bottom layer column 20 electrodes 24 that are being read by the microprocessor. All other electrodes 24 are grounded. The indentation visualizes the effect of exerting a force, which increases contact area between tom and bottom layers.

Figure 16A:
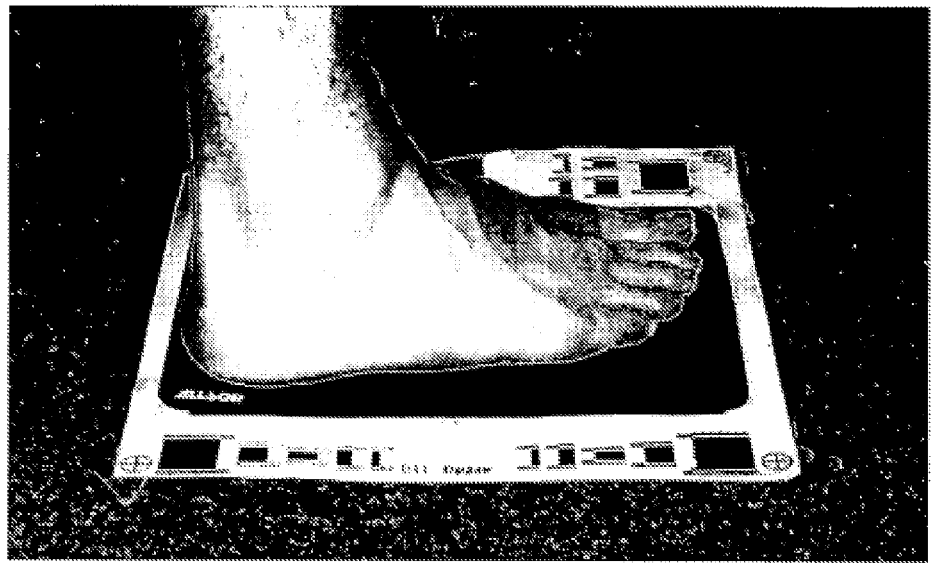
FIG. 16a shows a foot on the IMPAD.
Figure 16B:
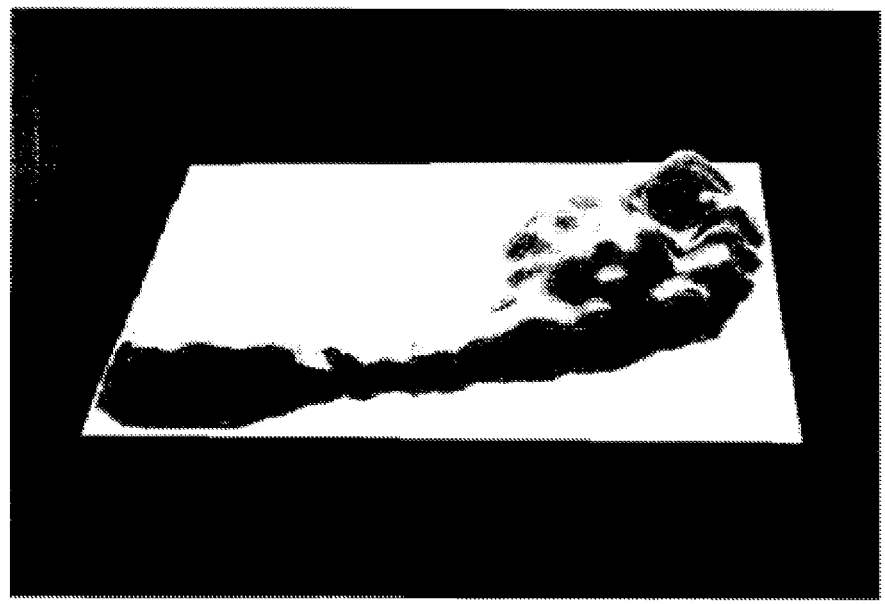
FIG. 16b shows the resulting pressure image displayed on a computer screen.

FIGS. 16a and 16b: FIG. 16a shows a foot pressing down on our IMPAD. FIG. 16b shows the resulting pressure image displayed on a computer screen.

Figure 17A:
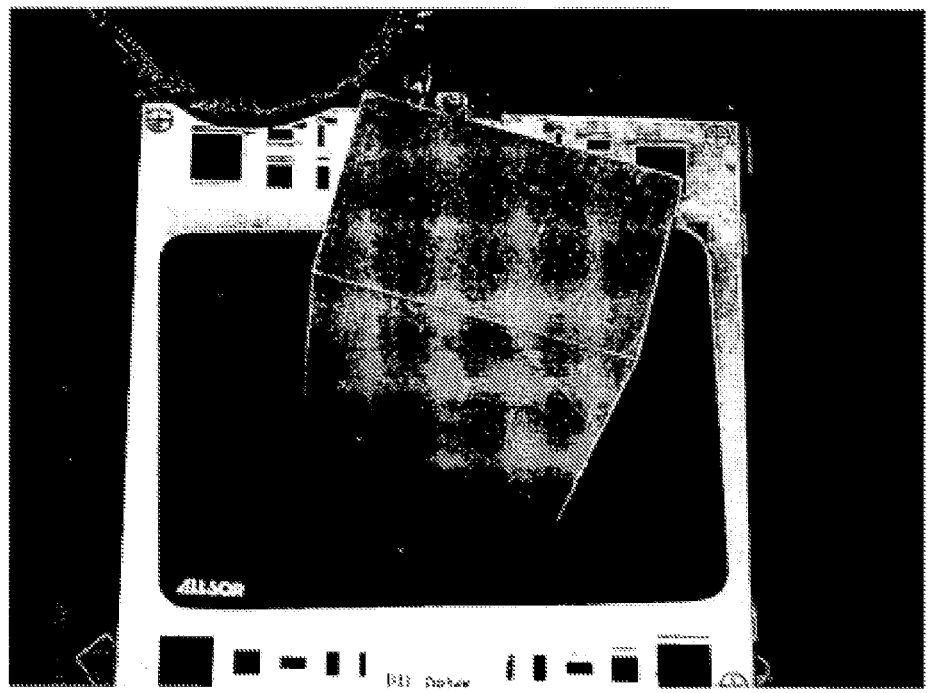
FIG. 17a shows a heavy block sitting on the IMPAD.
Figure 17B:
Figure 17C:
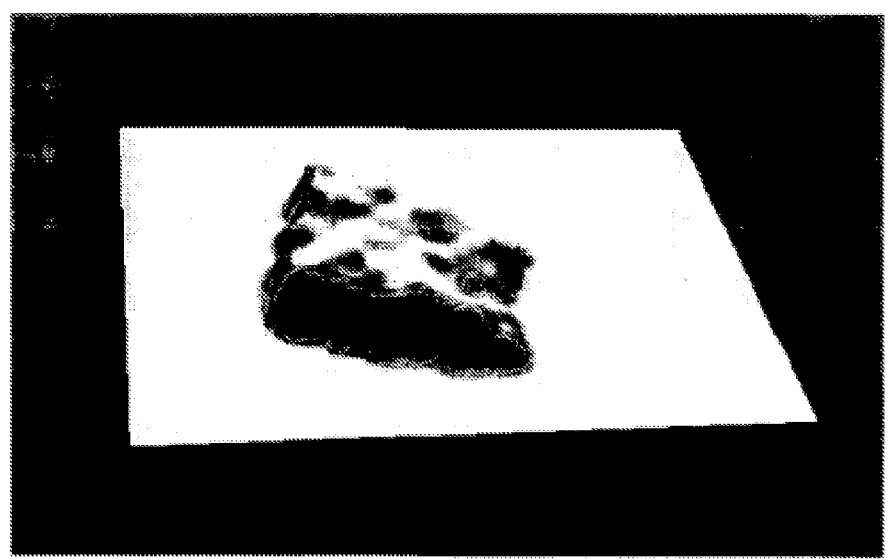

FIGS. 17a-17c: FIG. 17a shows a heavy block sitting on the IMPAD. FIG. 17b shows the resulting pressure image. FIG. 17c shows the pressure image when a user pushes down on the upper left side of the block.

Though grids of sensors and specifically grids of force sensitive resistors are not new, they have generally consisted of discrete sensors positioned at specific resolutions. The key difference between IMPAD and previous technologies is that IMPAD more closely mimics the multi-resolution properties of human skin.

Most touch sensors have a single resolution property expressed in sensors per unit of distance. In contrast, IMPAD behaves more like human skin which intrinsically has a fine resolution for purposes of detecting the location of a single touch and a coarse resolution for purposes of distinguishing 2 adjacent touches. This distinction permits a very inexpensive implementation of IMPAD devices, both in terms of spacing of sensors, and in terms of the expense and complexity of logic circuitry required.

Figure 18:
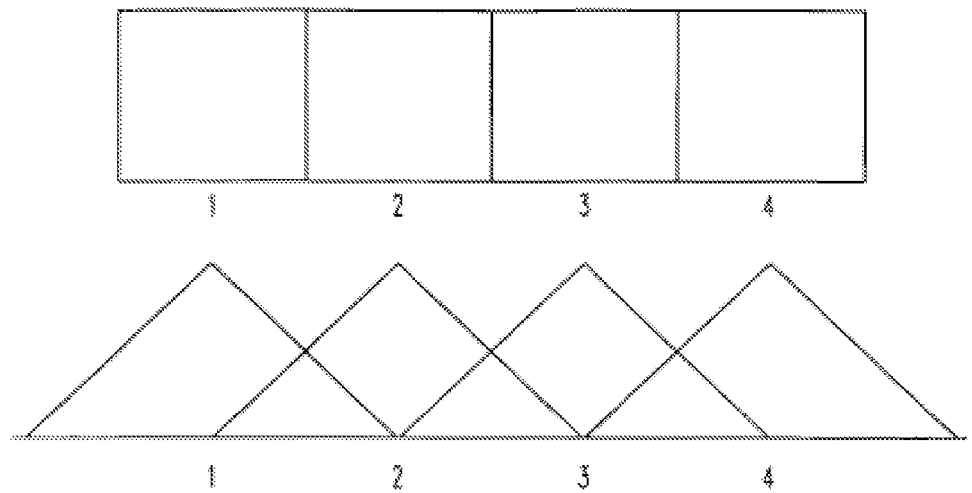
FIG. 18 illustrates the principle of operation of IMPAD.

FIG. 18: Top-discrete sensor's sensitivity with respect to position. Bottom—IMPAD bilinear sensing with respect to position. FIG. 18 illustrates the principle of operation of IMPAD. Note that even a very small change in position can be accurately tracked. Two adjacent touches can be reliably distinguished as distinct if they are spaced apart by twice the distance that separates adjacent wires in the surface 16—the Nyquist frequency of the device.

Figures 19A, 19B:
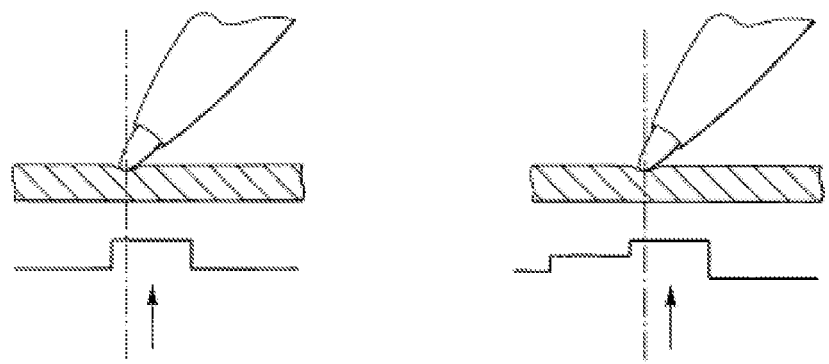
FIG. 19a shows an array of discrete sensors returns the wrong position for a pen touch.
FIG. 19b shows that IMPAD interpolates the signal between two successive sensors to compute the correct touch position.

FIG. 19a: An array of discrete sensors returns the wrong position for a pen touch.

FIG. 19b: IMPAD interpolates the signal between two successive sensors to compute the correct touch position.

Because spatially variant pressure is detected through a bilinear filter rather than through the box filter that results from the use of independent detectors, IMPAD can use a linear combination of values measured at adjoining sensors to reconstruct pressure signatures from the band limited detected signal with more fidelity (FIG. 19a) than is possible through the use of an array of independent discrete detectors. In particular, a point touch will cause a non-zero value at two adjoining sensor elements (FIG. 19b). If these two successive sensor locations are denoted as a and b, and their respective returned values as p and q, then the correct position of pen contact can be reconstructed as $(ap+bq)/(p+q)$.

Another advantage of IMPAD is that the resistive layers between the column 20 and row 22 electrodes 24 allow a tradeoff between the spatial resolution of a scan and increased read-out speed or reduced power consumption. This is done simply by disconnecting sets of column 20 or row 22 electrodes 24 from both power and ground as if they didn't exist (the disconnection can be done using any electronic logic that can has a high-impedance mode). For instance, if every other column 20 and row 22 electrode 24 is disconnected, the spacial resolution goes down by two, but the scan rate goes up by a factor of four. Taking this further, if every column 20 and row 22 electrode 24 is disconnected except the first and last ones on each side, the sensor acts as a single bilinear cell which can only measure the centroid and sum of pressure exerted over the entire sensor surface 16. Although this may seems useless, it can allow for the scanning of the sensor at many thousands of frames per second in order to detect very short lived impacts. This permits a "sleep mode", whereby battery powered devices that need to conserve power can idle without drawing significant power as they wait for a touch event to wake them up. Finally, it is possible to adaptively scan the sensor with finer detail only in areas where contact is made or where fine detail is required. This allows for the best of both worlds—providing high resolutions in areas where there is contact, while providing high speed and low power usage over areas with no contact.

IMPAD has been used to begin some of the experiments and investigations that we describe below, as well as smaller 54 mm×42 mm sensors and large form 12"×16" sensors.

Figure 20:
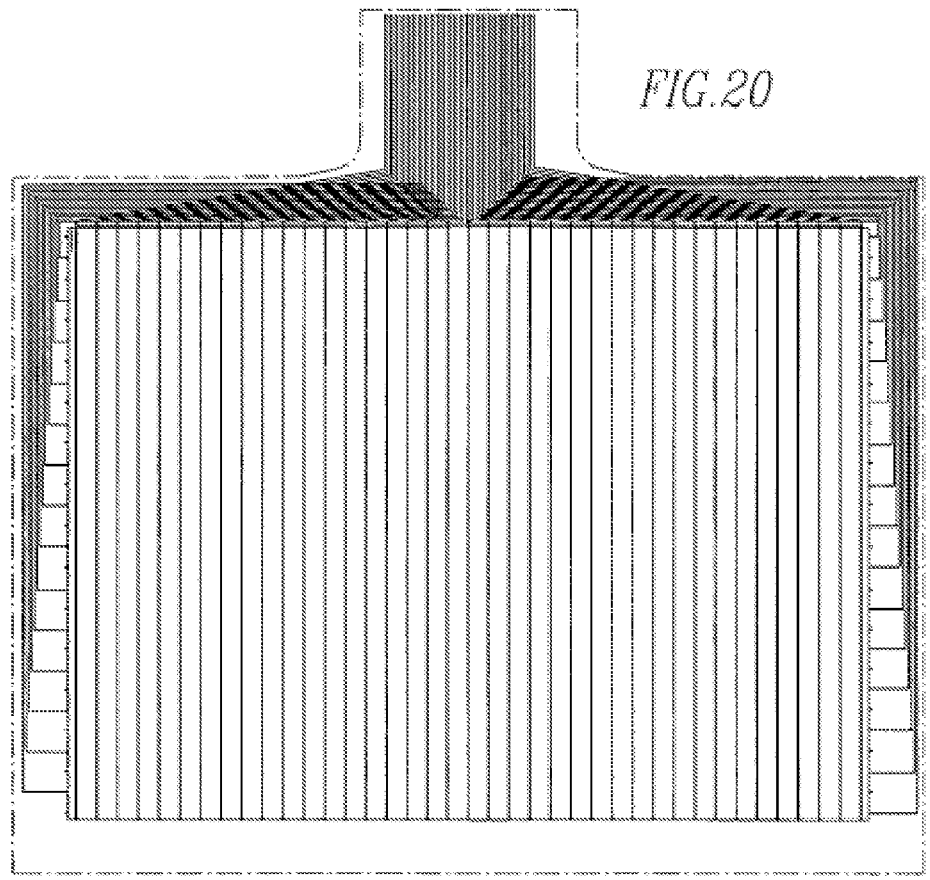
FIG. 20 is a schematic of one embodiment of the IMPAD.

FIG. 20: This is the schematic of the first IMPAD sensor. It has a 7.5"×10" sensing area (and an 8.5"×11" overall area) with 39 column and 29 row electrodes 24. The spacing between electrodes 24 is ¼".

Figure 21:
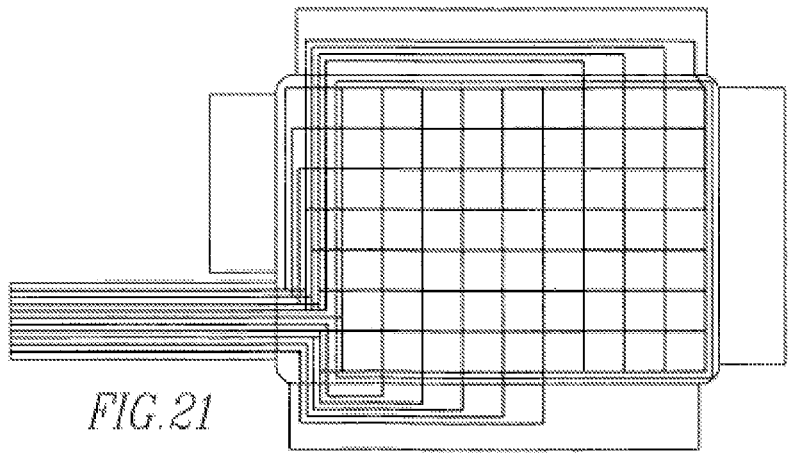
FIG. 21 is a schematic of a small format IMPAD.

FIG. 21: This is the schematic of the small format sensor. It has a 42 mm×54 mm sensing area with 10 column and 8 row electrodes 24. The spacing between electrodes 24 is 6 mm. Because of the small form factor, many of these can be printed at a time, which allows one to experiment with the placement of drone conductor wires and different inks much more rapidly than could be done with the larger form factor sensors.

Figure 22:
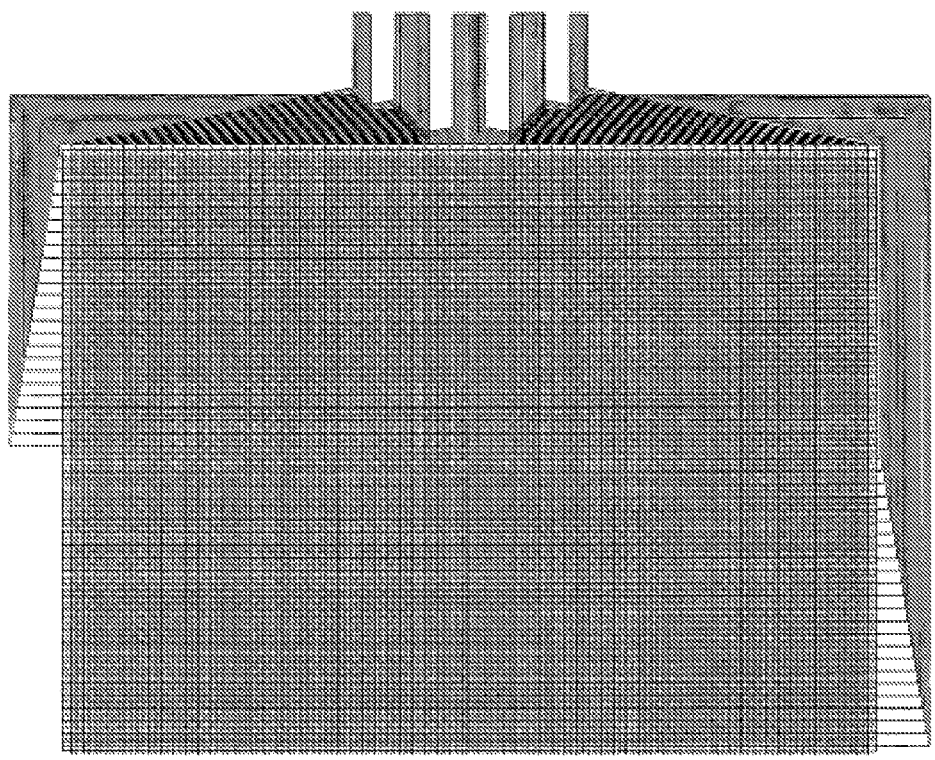
FIG. 22 is a schematic of a large IMPAD.

FIG. 22: This is a schematic of our large sensor. This sensor has a 12"×16" sensing area with drone wires between 64 column and 48 row electrodes 24. The spacing is 6 mm between electrodes 24 and 1 mm between drone wires. However, the spacing and arrangement of drone wires can be changed.

Tiling

IMPAD devices can also be made in such a way that they can be tiled together to form larger IMPAD surfaces, without any seam between adjacent tiles. To do this, the M+N control wires are run behind the device (so that there is no visible border around the actively sensing area of the IMPAD), and connect those wires to a small dedicated microcontroller, which is also placed behind the device. This microcontroller operates as in all other implementations of IMPAD, as described elsewhere in this document, with the addition of two steps:

(1) The sensed data is optionally compressed by retaining only non-zero values. In one embodiment the compression of the M×N pressure values for each scan is effected as follows: Each contiguous run of n non-zero values within the M×N array of data is collected into a data record. A header is prepended to this data record that indicates two values: (a) the starting index within the M×N length array of this contiguous run of non-zero data values and (b) the number of contiguous non-zero values in the record.

(2) The suitably compressed data of each scan is gathered up into one data record, which is prepended by a header that contains two values: (a) a unique numerical identifier for this tile, to distinguish it from all of the other IMPAD tiles, and (b) a count of the number of bytes of information in the compressed scan.

Each tile sends its data, using a standard network protocol such as UDP, to a computer, which converts each tile's id into a corresponding row 22 and column 20 offset, thereby assembling a high resolution image of pressures sensed from the entire collection of tiles. This high resolution image of pressure is thereby made available for use by any software application.

Experiments have been done with varying the number of layers of FSR ink, the resistance of the FSR ink and the roughness of the FSR ink used to compose the layers that cover the conductors. It was found that the output voltage versus applied force was inconsistent with one or two layers, but improved as more layers were printed. It is believed this happens for two reasons. First, as the thickness of deposited FSR ink increases, the chance that current finds a short path an electrode 24 on the top layer to an electrode 24 on the bottom layer decreases. Secondly as more layers are printed, variations in ink thickness between prints tend to get averaged away creating a more even coating. It was found that the improvement is greatest when going from one to two layers, is smaller when going from two to three layers, and is very small when going to four layers.

Inks were also printed with different resistances. It was found that inks with lower resistances tended to output a wider range of output voltages which would saturate the A2D converters on the microcontrollers. Also, when force was applied, it was found that the current flowing between adjacent column 20 electrodes 24 which were being powering would become very high (>40 mA), which is undesirable for battery powered devices and could potentially damage the electronics.

Inks were also printed that have increased surface 16 roughness. It was found that one had to press extremely hard on the sensor to get any kind of reading out of these devices. It is believed that the FSR ink in these sensors was much too rough for most practical uses, but that inks with less roughness could be useful in applications where high pressures are to be measured.

Figure 23A:
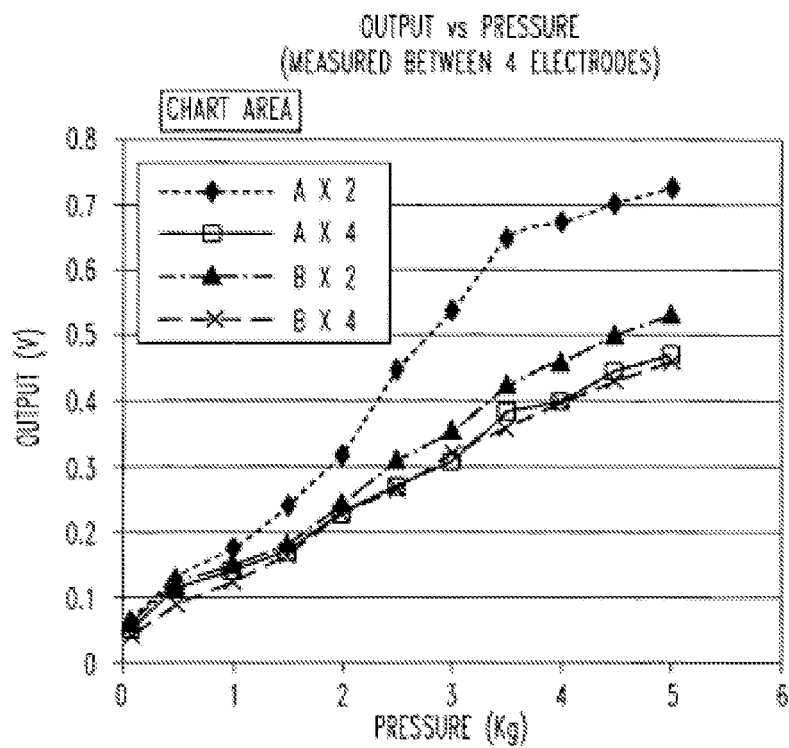
FIGS. 23A and 23B are plots that shows the output of four different sensors when pressure is applied at the point in between two column and two row electrodes and the point where a column and a row electrode overlap, respectively.

FIG. 23A: The above plot shows the output of four different sensors when pressure is applied at the point in between two column 20 and two row 22 electrodes 24. A×2 is from a sensor printed with two layers of less resistive ink A. A×4 is printed with four layers of ink A. B×2 is from a sensor printed with two layers of more resistive ink B (which has a resistance of 400 KOhms per Square). B×4 is printed with four layers of ink B.

Figure 23B:
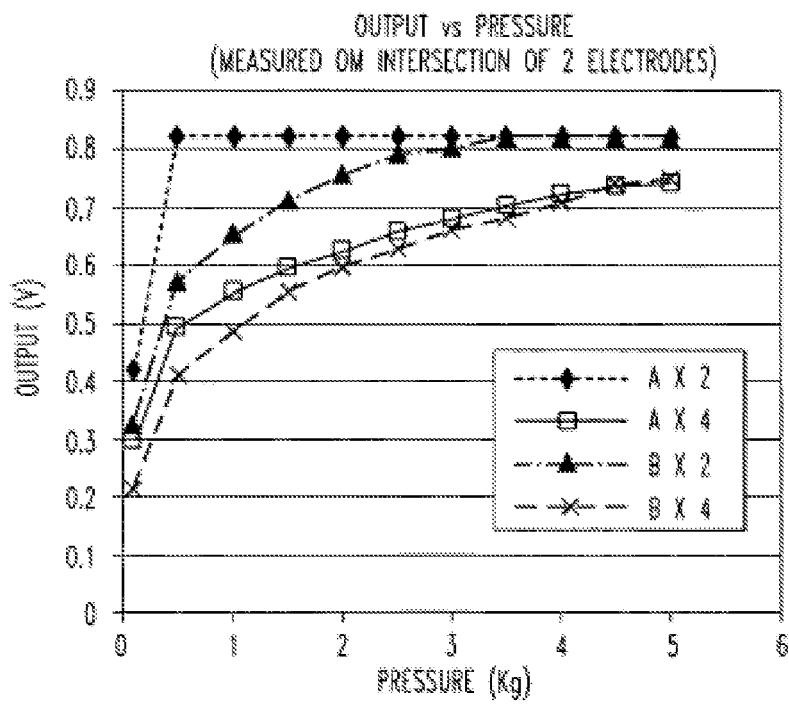

FIG. 23B: The above plot shows the output of four different sensors when pressure is applied at the point where a column 20 and a row 22 electrode 24 overlap. The inks are the same as described on the plot above. Here we can see the output from the sensors with two layers of ink A saturating at a very low force. We also see that the sensors with four layers of ink have more linear output than the sensors with two layers of ink. Finally, by comparing this figure with the previous figure, we note that this response is stronger and the curve is less linear than the one above. Improving the consistency of output across the surface 16 of the sensor is one of the goals of our research.

Improving Linearity of Sensor

Figure 24A:
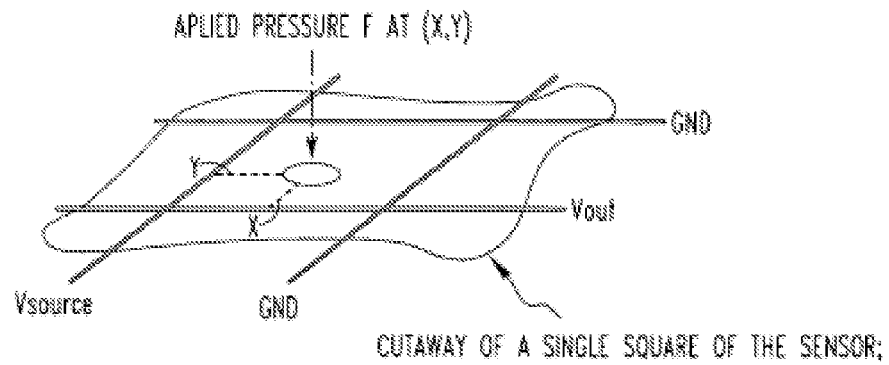
FIG. 24a shows pressure on a single point between two adjacent row electrodes and two adjacent column electrodes.
Figure 24B:
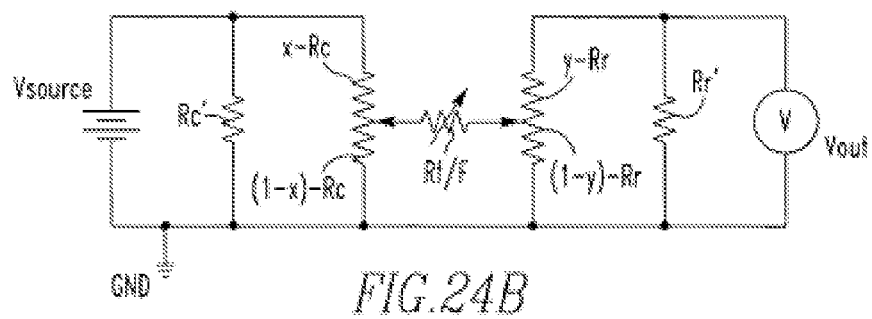

One of the goals with the IMPAD sensor has been to be able to accurately sense the position of forces applied between column 20 and row 22 electrodes 24. However, there was some non-linearity in the output of the first sensors made. As a point of pressure would move across the surface 16 of the sensor, the output would tend to jump as the pressure approached close to intersections between column 20 and row 22 electrodes 24. These jumps made both position and pressure difficult to calculate. To address this issue, a perspective was taken of what happens between two adjacent row 22 electrodes 24 and two adjacent column 20 electrodes 24 when one presses on a single point between them on the sensor (FIG. 24a). A representative circuit diagram which describes the current flows through two pairs of row 22 and column 20 electrodes 24 when a single touch occurs at a point (x,y) between them where both x and y go from 0 to 1 (FIG. 24b). Here, Vout is the output voltage measured at the active row 22 electrode, Vsource is the voltage applied to the active column 20 electrode, Rc is the resistance from a point on the upper FSR surface 16 to a column 20 electrode, Rr is the resistance from a point on the lower FSR surface 16 to a row 22 electrode, Rc' is the resistance between two adjacent column 20 electrodes 24, Rr' is the resistance between two adjacent row 22 electrodes 24, and Rf is how the resistance vertically between the two FSR layers varies inversely with respect to the force F. Notice in the diagram that we can model Rc as a potentiometer whose position is controlled by the x position of a touch and affects how much resistance there is to Vsource (x*Rc) and to ground (1−x)*Rc. Similarly, Rr is modeled as a potentiometer whose position is controlled by y with the upper portion going to Vout having a resistance of (y*Rr) and the lower portion going to ground with a resistance of (1−y)*Rr. Computing for Vout given the other variable, we developed a simplified mathematical model of the output voltage from a single column 20-row 22 intersection given a single point of pressure and the x and y position, where (x=0, y=0) is the position at the intersection and (x=1, y=1) is the position of the intersection across from the intersection being tested. The resulting formula is:

$$Vout = \frac{Vsource * Rr * Rr' * (1-x)(1-y)}{(1-y)(Rr' + Rr^2) - ((1-y)^2)(Rr^2) + (1-x)(Rc*Rr + Rc*Rr') - ((1-x)^2)(Rc*Rr + Rc*Rr') + (Rf/F)(Rr + Rr')}$$

One thing that is immediately obvious from this formula, is that Rc' doesn't affect anything. One of the benefits of this formula is that it suggests ways to improve the linearity of the sensor. It was noticed that all of the non-linearity of the sensor was coming from the first four terms in the denominator. The effect of these terms can be reduced by making Rc, Rr and Rr' smaller with respect to Rf. Our first attempt at doing this is to make Rc and Rr smaller by printing drone wires in between column 20 and row 22 electrodes 24 to reduce the resistance along the FSR surface between a pressure point and nearby electrodes 24. These wires are not connected to any circuitry. Their sole purpose is to reduce the resistance from a pressure point to nearby electrodes 24, thereby improving linearity. It is also possible to improve linearity by printing layers of different ink one on top of the other. For instance, printing an ink with very low resistance first followed by a higher resistive FSR ink over the electrodes 24 can lower Ra while keeping Rf high.

Figure 25:
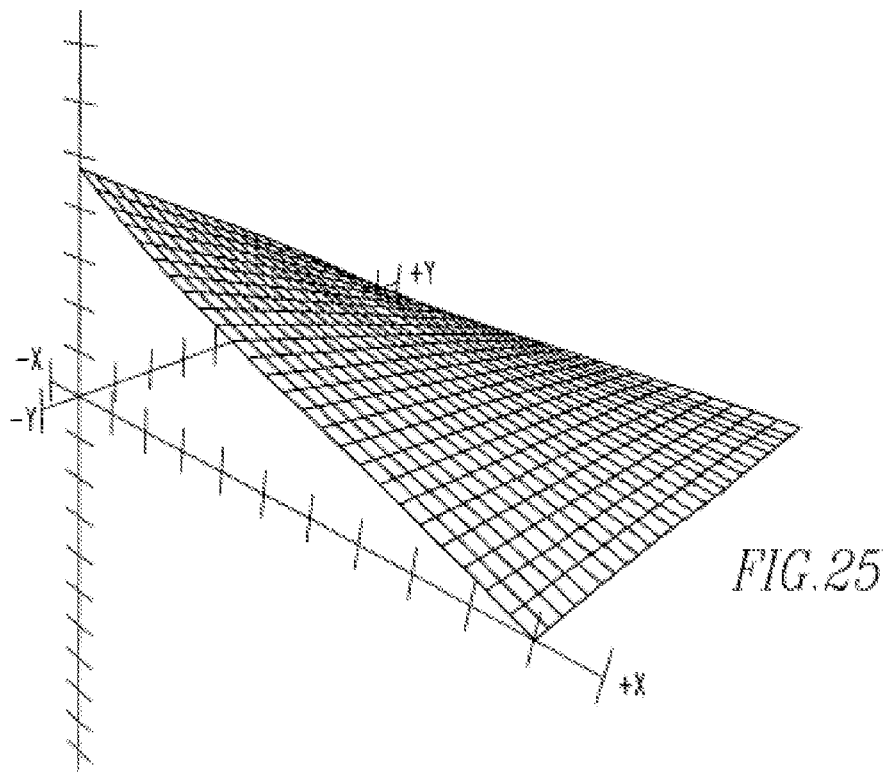
FIG. 25 shows a fairly linear output versus position curve that is obtained as a result of plugging in values for Rf that are significantly higher than Rc, Rr, and Rr'.

FIG. 25: This is a fairly linear output versus position curve that is obtained as a result of plugging in values for Rf that are significantly higher than Rc, Rr, and Rr'.

Figure 26:
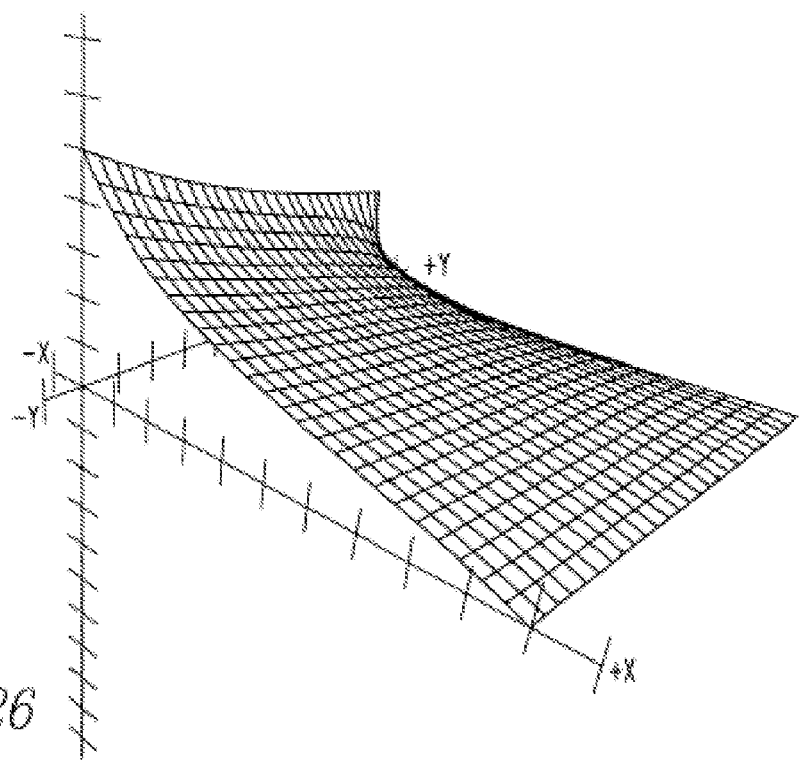
FIG. 26 shows much less linear output versus position curve that is obtained as a result of plugging in values for Rf which are similar in magnitude to Rc, Rr and Rr'.

FIG. 26: This is a much less linear output versus position curve that is obtained as a result of plugging in values for Rf which are similar in magnitude to Rc, Rr, and Rr'. This matches the non-linearity observed in the earliest sensors produced.

The first IMPAD made use of an off-the-shelf analog to digital converter board which cost over a thousand dollars, was very difficult to wire up to the sensor, and took up a lot of room. Since then, the electronics have been refined and used for scanning the sensors. For instance, it has been found that microcontrollers produced by Microchip that have as many as 32 analog input pins and many digital I/O pins. The advantage of these microcontrollers is that each pin can alternately be set to power an electrode 24, ground it or can be set into a high impedance state. Furthermore, the microcontrollers can scan the sensor at much higher rates than the analog to digital converter boards. On our 29×39 sensor, we have achieved scan rates of 500 frames per second, and it is believed that rates of 2000 frames per second and above are possible.

For a large form factor sensor with a 64×80 resolution, a single microcontroller is not sufficient. For this form factor, the design incorporates shift registers to power column 20 electrodes 24 and using analog multiplexors to increase the number of input channels.

The very small form factor devices, such as an 8×10 resolution sensor, use a widely available Arduino microcontroller board to read the sensor.

One of the concerns initially with the IMPAD device was that a large amount of current could be drawn by the active column 20 electrodes 24 through the fixed resistor in the top layer. There was a concern that this fixed resistance would consume a lot of power which could possibly damage the electronics. High power usage would also be undesirable for systems that are battery powered. Furthermore, we found that as pressure was applied, current flow from the powered column 20 to the nearby columns 20 could increase by as much as 10× the nominal value.

At first, it was attempted to prevent high current flows by increasing the resistance of the FSR ink. However, this didn't guarantee that when pressure was applied, the resistance would not drop to unsafe levels. Furthermore, this approach would mean that as IMPADs increased in size, we would have to keep increasing the resistance of the FSR ink.

After further testing, it was discovered that on average, the sensor drew less than 1 mA of current during operation. Even if pressure was applied to the sensor, this did not increase appreciably because the pressure would only be applied to a small fraction of the sensor area and thus current could only increase by that small fraction. We also found that even if the current at any point in the scan cycle exceeded the rated current limit of the electronics, the time slice that a given row 22 or column 20 electrode 24 had current flowing through it is very small. For instance, on a sensor with a 29×39 resolution scanning at 50 fps, a given column 20 electrode 24 is powered for only 0.7 milliseconds (less than 0.1% of the time). Thus, the power dissipated through any given electrode 24 is orders of magnitude lower than the amount that could damage the electronics. In fact, we found that even if a given electrode 24 was directly shorted to ground, the gate resistance of the driving electronics was enough to keep the average power dissipation down to a safe level as long as the sensor kept scanning through rows 22 and columns 20 at 50 fps. Thus, it was concluded that there is no need to worry about damaging the electronics no matter what happens to the sensor. Thus, the sensor could be flooded with water, pierced or cut, and the electronics would continue operating without any damage.

Large sensors which use wires and resistive material sometimes suffer from signal losses due to the resistance of the traces/electrodes 24 on the sensor. For instance, in some IMPADs that we printed, traces have a resistance of as much as 6 ohms per inch. When a sensor approaches a large size such as 12"×16", some traces may get as long 36" with a resistance along their length of 216 Ohms. At such sizes, this resistance becomes close to the order of magnitude of the resistances through layers 2 and 4 (FIG. 12) and resistance through the force sensitive layer 3 (FIG. 12). This resistance could potentially cause a variation in pressure sensitivity and accuracy across the sensor surface 16. IMPAD has two advantages over other array sensors that use force sensitive resistors when it comes to the resistance of the traces.

The first advantage is that when a voltage reading is taken from an electrode 24 on layer 5, current doesn't have to flow out through that electrode 24 and through a sense resistor or current sensing circuit as in other devices (such as the one made by Tekscan). That is because layer 4 essentially acts as a sense resistor. As a result, the electrode 24 on layer 5 from which voltage is measured carries no current in the steady state, only acting to transfer the same voltage it has to the analog to digital converter, and thus, because current through the electrode 24 is nearly 0, there is almost no voltage drop along that electrode 24.

The second advantage of IMPAD is that the electrodes 24 on layers 1 and 5 that are grounded by the electronics, if they have high resistance, will allow some of the current flowing through them to flow through layers 2 and 4 to their neighboring electrodes 24 that are grounded. This serves to reduce the current flowing through the grounded electrodes 24 and reduces the voltage drop on those grounded electrodes 24. The only area where a voltage drop can be problematic is on any electrode 24 on layer 1 that is powered to a positive voltage. Such an electrode 24 is not significantly helped by either of the IMPAD advantages described above. Thus, the length and resistances of electrodes 24 on layer 1 should be kept to a minimum in any IMPAD design.

Emulating Varieties of Physical Controllers

The sensor has been used as a way for a person to move their hand over a pressure imaging surface 16 to emulate various types of physical three-dimensional controllers. Consider for example the problem of holonomically manipulating a virtual object in a three-dimensional space. This requires control of six simultaneous degrees of freedom—three degrees of translation together with three degrees of rotation.

Two varieties of controller layouts allow moving one's hand over a desktop surface 16 to affect 6° of freedom control of a rigid 3-D object. Such controllers were built.

The first device consists of a controller with an embedded trackball. In this case XY movement of the controller results in XY movement of the object, rocking back and forth of the controller results in movement of the object along the Z. axis, and rotations of the embedded trackball with the fingers results in XYZ rotation of the object.

In the second device, XY movement as well as rotation of the controller results on XY movement of the object and rotation of the object about the z-axis, respectively. Rocking of the controller forward and backward resulted relative rotation of the object about the x-axis, whereas rocking of the controller will left and right results in relative rotation of the object about the y-axis. Using the scrollbar with the forefinger results in relative translation along the z-axis.

The initial implementation of IMPAD had an effective dynamic range of one part in 50. This dynamic range is sufficient for many multi-touch-based user interface 28 applications, but not for all uses. Below the smallest measurable level there is noise, which might be due to any of a variety of sources, including cross talk between the conductors on the surface 16, imperfections in manufacture, and stray induced signals in the control circuitry. Dynamic range can be increased in a way that is analogous to high dynamic range optical imaging. In this approach, the pressure image measurement is time multiplexed. In successive time slices, the sensitivity of the logic circuitry is varied. When the circuit is set for high sensitivity, the device is sensitive to very fine touches, saturating to the maximum of its attainable range at a relatively low pressure. When the circuit is set to low sensitivity, the device is less sensitive, but is able to detect higher pressures before becoming saturated. To achieve this, we vary the resistance of the read out circuit over time, driving the circuit with varying voltages and varying the sensitivity of the analog to digital converter.

The interpolating nature of IMPAD can also be used to increase scan speed by scanning with high resolution only in the areas where contact is made. This is done using a coarse-to-fine approach which first scans the sensor with low resolution and determines which areas to re-scan with higher resolution. This can be combined with high dynamic range sensing in such a way the sensor can adjust on the fly to the pressure levels that it senses in the lower resolution scans to improve the accuracy of the high resolution scans. This has the potential to reduce the number of measurements needed to get a high quality scan of the device leading to reductions in price, increases in scan speed and quality, and allows reductions in power consumption of IMPAD.

Opaque IMPAD devices can be used below. Flexible displays such as Plastic Logic's flexible display which uses eInk technology or the OLED displays being developed by companies like Samsung.

A range of applications benefits from transparent implementations of IMPAD technology. For such implementations two distinct components are used: transparent versions of the FSR material itself, and transparent conductors. Traditionally, transparent conductors have been printed with Indium Tin Oxide (ITO) which is toxic and has a very high resistance. However, recently, transparent conductors using carbon nano-tubes have become available.

Figure 27A:
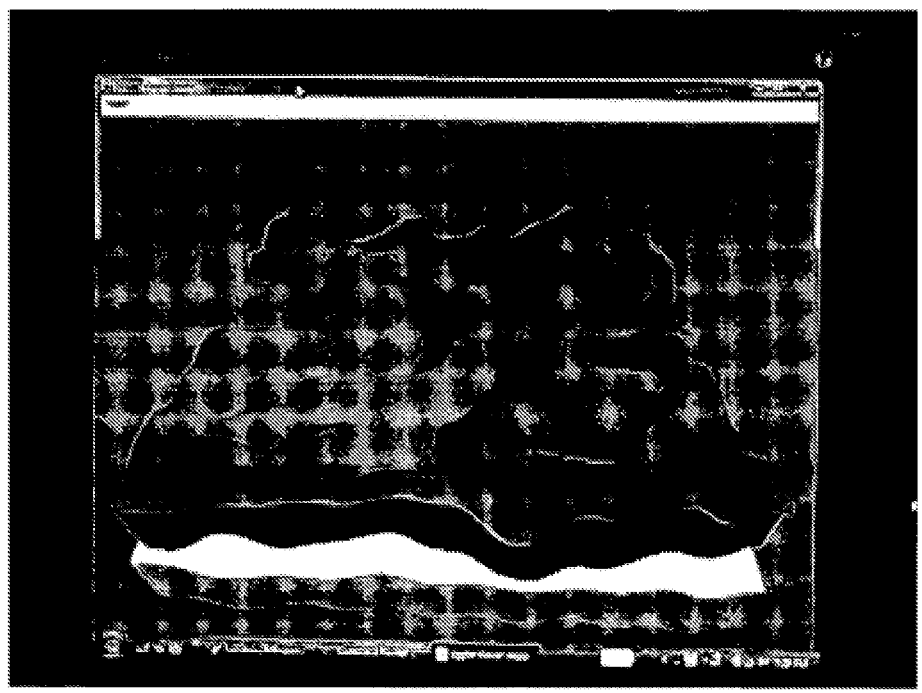
FIG. 27a shows two layers of uncompressed spongy conductive materials.
Figure 27B:
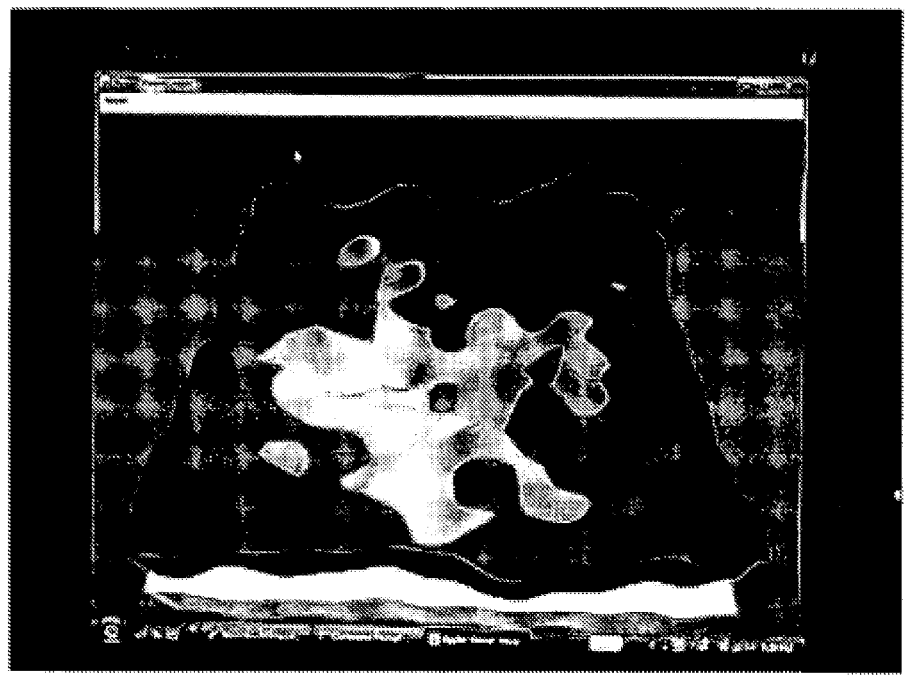
FIG. 27b shows two layers of compressed spongy material, with increased area of contact between them.

A wide variety of materials can be used as the force sensitive resistive element. The basic mechanism, which can be found at either the microscopic or macroscopic scale some conductive material within a spongy or compressible substrate of insulating material. Increased pressure applied to the mixture results in an increase in the average area of contact between adjoining conductive elements (FIG. 27), thereby reducing the resistance between the materials at that point.

Examples of force sensitive resistive materials include FSR inks, antistatic foams, and force transducting rubbers.

Antistatic foams generally consist of a polymer substrate, such as nylon, coated with a thin layer of a conductor such as copper. Electricity flows between the copper clad fibers, thereby allowing static charge to even out across the fibers. Because they are squishy and may take time to recover their original shape after being squeezed, the output from such foams might be less accurate and repeatable than from FSR inks. However, they can be used in situations where a soft, stretchable sensor is needed. For example, such sensors can be used in hospital beds or wheelchairs to prevent patients from developing bedsores, and in cribs to monitor the breathing of infants.

Force transducing rubbers are typically made of rubber or silicone that is infused with small sized particles of carbon which conduct more electricity as they are squeezed closer together. The use of these rubbers may allow for the construction of sensors that don't require an air gap and may perform better in harsh environments and in situations where stretching forces may be applied to the sensor.

For detection of very large forces, solid materials such as concrete can be infused with conductive particles that change their conductivity when very large forces are applied. Such sensors can be incorporated into building materials in order to pre-emptively detect the failure of bridges, buildings, roofs and walls, or to detect damage after it occurs.

More exotic materials that can be used to sense force, such as carbon nano-tubes. By orienting the nano-tubes in specific directions within the materials, materials with anisotropic conductive properties can be created, thereby improving characteristics of the sensors such as the linearity of interpolation. Conductive or ferromagnetic fluids or gels can also be used as the FSR medium, allowing the sensing of pressure distributions of fluids or magnetic fields.

Software Support for Data Acquisition, Object Recognition and Segmentation

References [Buxton, W., Hill, R., and Rowley, P., *Issues and Techniques in Touch-Sensitive Tablet Input*. In Proceedings of the 12th Annual Conference on Computer Graphics and Interactive Techniques. ACM Press, New York, N.Y., 215-224, 1985], [T. Moscovich, J. F. Hughes. *Indirect Mappings of Multi-touch Input Using One and Two Hands*, In Proceedings of CHI 2008, Florence, Italy, April, 2008], [Moskovich, T., and Hughes, J., *Multi-Finger Curser Techniques In Proceedings of Graphics Interface* 2006. Quebec City, Canada, June 2006], and [Westerman, W., *Hand Tracking, Finger Identification and Chordic Manipulation on a Multi-Touch Surface*. PhD thesis, University of Delaware, 1999] describe the current known art in software for segmentation and object recognition using any multitouch input device, and can be used with IMPAD for the purposes of implementing applications which require knowledge in regard to tracking, whether simultaneous or not, of pressure points, such as fingers or pens, on the IMPAD. Two major approaches are taken to do this analysis based the aforementioned references. One is explicit construction of model-based segmentation. For instance, if hands are being tracked, it is possible to build a system that looks for five fingertips in a particular arrangement and is then capable of locking on and tracking the fingertips. The other approach is machine-learning based recognition, developed in conjunction with the gathering of a corpus of usage statistics. The latter approach would have the advantage of being better able to recognize new forms of input as well as learning subtle differences between various pressure signatures. For instance, when used for human computer interaction such an algorithm might be able to deduce a person's posture from the pressure image of their feet, or to detect the position of a person's hand and arm from the pressure image of their palm.

An explanation follows as to why IMPAD can have high positional accuracy and high positional smoothness, even in implementations that have relatively coarse multitouch discrimination:

Three terms are defined:
Positional accuracy: For any single touch, the accuracy of our ability to measure the mean position of that touch;
Positional smoothness: For any single touch, the extent to which the sensed position of that touch varies smoothly as the position of the touch is varied, rather than jumping discontinuously from one quantized value to another;
Multitouch discrimination: Given two touches, how close to each other they can be placed and yet still be distinguished as two distinct touches.

Sensor arrays 18 which are built from discrete sensors necessarily have similar values for positional accuracy and multitouch discrimination, and also have poor position smoothness for touches that have a small diameter compared with the extent of the spacing between sensors.

IMPAD allows positional accuracy and multitouch discrimination to be decoupled, so that very fine positional accuracy can be combined with very coarse multitouch discrimination. Also, IMPAD has very good positional smoothness even for touches that have very small diameter.

Figure 28:
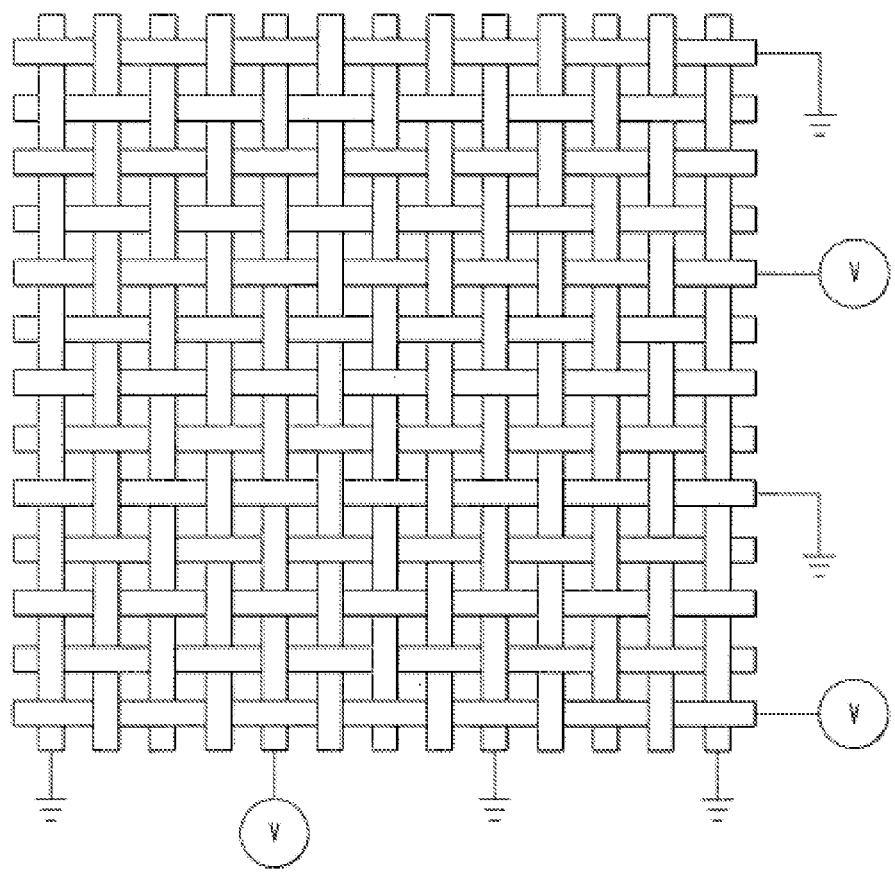
FIG. 28 shows a fibrous and cloth like woven structure embodiment of the sensor pad.

This is true because, as was shown above in FIG. 28, each of the widely spaced sensor lines of IMPAD is able to measure the distance of any touch between two sensor lines, even if the touch does not actually make contact with either of the two sensor lines. Not only can a touch that lies completely between two adjoining sensor lines be detected, but in fact the proportional distance of that touch between the two adjoining sensor lines can be accurately computed, using the proportionality formula $(ap+bq)/(p+q)$ that was previously described above. Therefore, even though multitouch discrimination is relatively coarse—due to the relatively wide spacing of adjoining sensor lines—positional accuracy and positional smoothness can nonetheless both be very high.

Further explanation follows how sleep mode is maintained, and how an adaptive scan is accomplished, with finer detail only in areas where contact is made or where fine detail is required.

An IMPAD connecting wire does not need to be active. This can be done by the electronics by setting the pin on the microcontroller or shift register connected to the wire into a high impedance state (which electrically disconnects the wire from the rest of the electronics). In this state, the wire acts in effect as if it were a drone conductor. If only every Nth connector line along its row 22 and column 20 connector lines, respectively, is actively used (where N is an integer greater than one), then if we keep the scan rate the same, the total power usage decreases by a factor of $N^2$, or the power usage can be kept the same while the scan rate is increased by a factor of $N^2$, in either case, the resolution of multitouch discrimination decreases by a factor of N. In essence we are trading off multitouch resolution for reduced power or increased scan rate. IMPAD can be placed into an IDLE mode by scanning only every Nth connector line. In this mode it can very rapidly detect the presence of a touch upon its surface 16. Once such a touch is detected, IMPAD can be switched to a higher resolution active mode, in which it scans every connector line rather than every Nth connector line. In the limit, one can deactivate every wire except for the first and last column 20 and row 22, essentially turning the entire sensor into a single bilinear sensor.

Figure 29C:
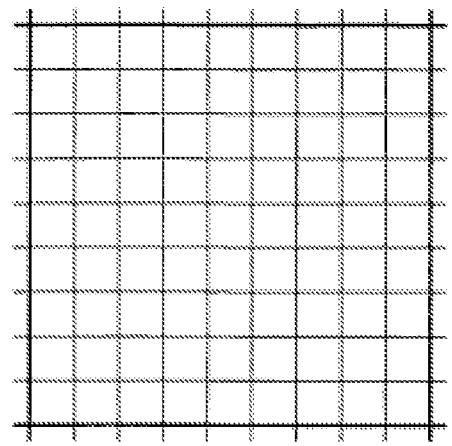
FIGS. 29a, 29b and 29c show a representation of the sensor pad with every row/column active, every nth row/column active, and only the first and last row/column active, respectively.
Figure 29B:
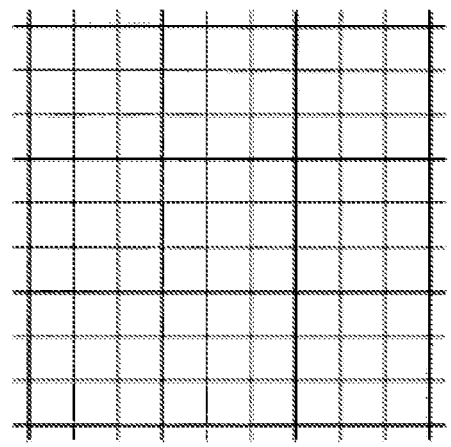
Figure 29A:
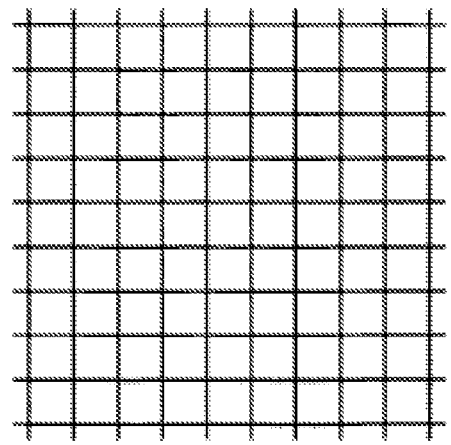

It is also possible to use a coarse resolution mode in which only every Nth connecting wire is actively switched in order to sense a low resolution image over the surface 16 (FIG. 29). Using the information returned by this mode, IMPAD can be switched to a higher resolution mode only for those rows 22 and columns 20 that encompass any detected touch. This strategy confers the advantage that the IMPAD can operate with a lower power requirement, and higher speed without sacrificing multitouch resolution since the higher power required for switching every row 22 and column 20 connector line need only be employed for those rows 22 and columns 20 where a touch has been detected.

One surface 16 can be referred to arbitrarily as the "top surface", and the other surface as the "bottom surface". This is an arbitrary designation, for clarity of exposition, since the entire device can be flipped over, thereby switching the top and bottom surfaces, without any effect on the operation of the device.

The connectors on the top surface are organized into rows 1 through N of parallel electrically conducting control lines, each of which is connected to the logic circuitry of the device.

The connectors on the bottom surface are organized into columns 1 through M of electrically conducting control lines, each of which is connected to the logic circuitry of the device.

On both the top and the bottom surface, successive control lines can be separated by zero or more parallel passive electrically conductive lines. All adjoining parallel electrically conductive lines in the device are connected to each other by an electrical resistive element.

One method for scanning an IMPAD device is through a simple M×N scan: Each of the N input rows is set to positive voltage in turn, with the other N−1 input rows all set to ground. Meanwhile, the voltage at each of the M output columns 20 is read out in turn, while the other M−1 output columns 20 are all set to ground. The time to perform such a scan is M×N clock-cycles. Our lowest resolution implementations of IMPAD employ this M×N method.

An M×N scan has the advantage of simplicity, but as N and M become large, scanning time becomes larger than is desirable for performance at interactive rates. For example, if the clock-cycle time is one microsecond, then a 300×300 scan will take 0.09 seconds, which is three times greater than the 30 millisecond time of a video screen refresh, and is therefore too long for acceptable interactive performance as a computer/human interface 28. For this reason, the current invention also implements another scanning method which is considerably faster, requiring only 2N time steps. Using the same example of a one microsecond clock-cycle time and a 300×300 IMPAD device, the 2N time step method is able to scan the entire device in only 600 clock-cycles, which results in a scan time of 0.0006 seconds—far faster than is needed for real-time performance. In practice, achieving this maximum rate requires employing multiple analog to digital converters, which adds expense to the device. For most applications, a 0.0006 second scan is not generally required, and therefore fewer analog to digital converters can be employed, while still maintaining a scan rate of several hundred scans per second, which is comfortably greater than is required for real time performance.

Figure 30:
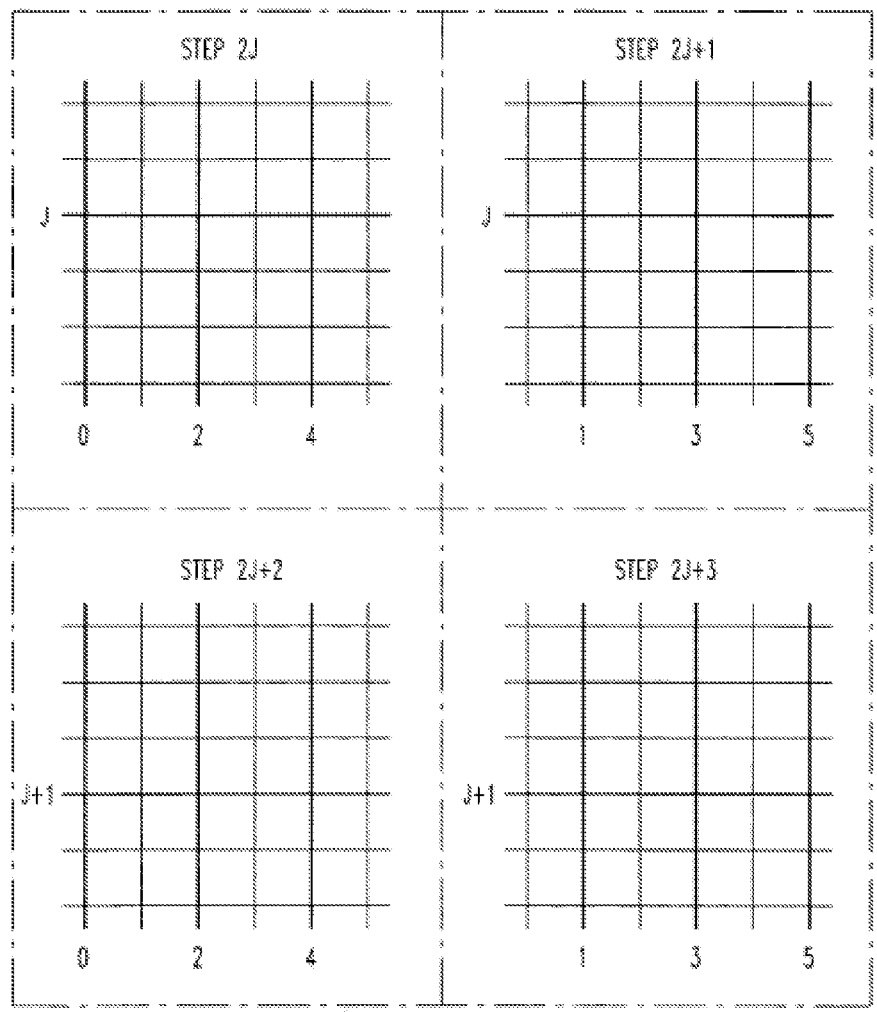
FIG. 30 shows a time varying sequence of operation of the sensor pad organized into 2N time steps.

In the 2N scanning method, the time-varying sequence of operation of the device is organized into 2N time-steps as follows (FIG. 30):

At any even time-step $2j$, the conductor on the top surface at row j is set to +5 volts, and the all of the other conductor on the top surface are set to ground.

Meanwhile, all of the control lines on the bottom surface in even numbered columns (0, 2, 4, . . . ) are metered, and all of the odd numbered columns (1, 3, 5, . . . ) are set to ground. The measured output voltage at each of these even lines is converted into a digital signal, and these digital signals are sent to a computer.

At any odd time-step $2j+1$, the electrical signals to the top surface remain the same as in time-step $2j$. Meanwhile, all of the control lines on the bottom surface in odd numbered columns (1, 3, 5, . . . ) are metered, and all of the even numbered columns (0, 2, 4, . . . ) are set to ground. The measured output voltage at each of these odd lines is converted into a digital signal, and these digital signals are sent to a computer.

The total scanning cycle therefore consists of 2N steps, where for each step M/2 output signals are sent to the computer.

Figure 31:
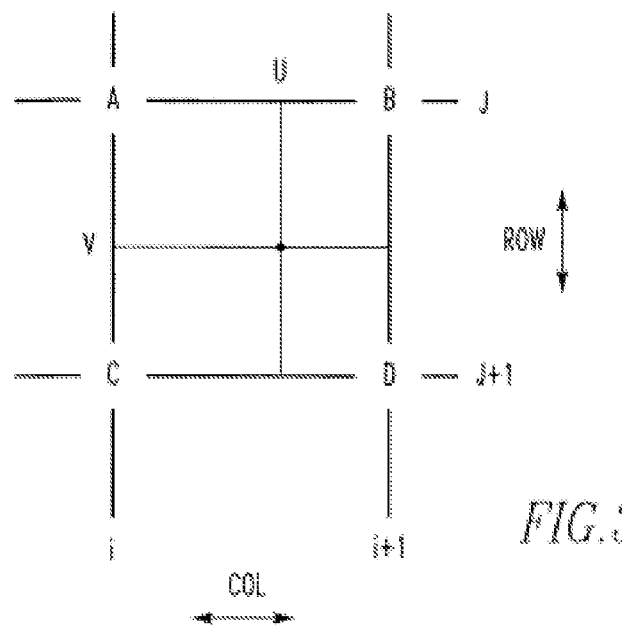
FIG. 31 shows a representation of the surface being touched at a single point in regard to row and column.

When the surface is touched at a single point, as in FIG. 31, there will be non-zero conductance between some two successive rows j and j+1, where $1 \leq j < N$, and between some two successive columns i and i+1, where $1 \leq i < M$.

The result will be four non-zero measured voltages:

A is the voltage measured at time-step $2j$ at row i,

B is the voltage measured at time-step $2j+1$ at row i+1,

C is the voltage measured at time-step $2j+2$ at row i,

D is the voltage measured at time-step $2j+3$ at row i+1.

These four non-zero measured voltages collectively convey information as to the total pressure at the touch point, as well as the fractional distance u of the touch between columns and i+1, and the fractional distance v of the touch between rows j and j+1.

The sensitivity to touch at each row and column drops off bilinearly to zero as the touch location moves away from control wires i,j to the adjoining control wires. Therefore, the sensitivity of row 22/column 20 junction (i,j) to a touch at location (i+u,j+v) will be $(1-u)*(1-v)$. Similarly, the sensitivity at (i+1,j) will be $u*(1-v)$, the sensitivity at (i,j+1) will be $(1-u)*v$, and the sensitivity at (i+1,j+1) will be $u*v$.

From this, we can use A, B, C and D to compute both total pressure and fractional position (u,v) of the touch. In particular:

pressure $P=A+B+C+D$ $u=(B+D)/P$ $v=(C+D)/P$

Computing the Size of a Touch

It would be possible to use previously existing technologies that are based on arrays of discrete sensors to continuously sense position. This could be done by placing a soft material on top of the sensing device, which would act as a low-pass filter on the touch signal, thereby spreading out even a single point touch to cover a non-zero area. If the soft material is carefully chosen so that a single touch is properly "blurred", then continuous position could be measured even with an array of discrete sensors.

But this approach would have two limitations, when compared with the described invention:

It would be necessary to place a relatively thick soft layer over the sensor array 18. Such a layer requires the device to be physically thicker, which reduces its utility for any application that requires a very thin form-factor, as well as increasing the expense and manufacturing complexity of the device.

Such an approach would make it impossible to detect the presence of touches with very small extent, since that fine-detail information would be destroyed by the "blurring" effect of the soft layer.

Using the present invention it is possible to determine how small a touch is in extent by observing the time-varying signal returned by that touch as it moves over the IMPAD surface. This is useful in distinguishing, for example, the touch of a human finger (large) from the touch of blunt eraser (somewhat small) from the touch of a sharp pen tip (extremely small).

IMPAD can recognize that a touch has very small extent when the center of the touch crosses an edge of the lattice of row 22/column 20 control lines (i.e.: when u==0 or v==0). When a touch having very small extent crosses a column 20 control line i, then the measured voltage at columns i−1 and i+1 will drop to essentially zero. Similarly, when a touch having very small extent crosses a row 22 control line j, then the measured voltage at rows j−1 and j+1 will drop to essentially zero.

Edge crossings for somewhat larger touches will produce small, but non-zero, values for these neighboring rows 22 and columns 20. To analyze the relationship between the size of a small touch and the variation in measured value between adjacent rows 22, consider a small touch of square extent 2r×2r, and with uniform pressure everywhere within its extent, where r is much smaller than the distance between adjacent control wires. Consider the case where this touch is centered on control line j, as in the figure.

Figure 32:
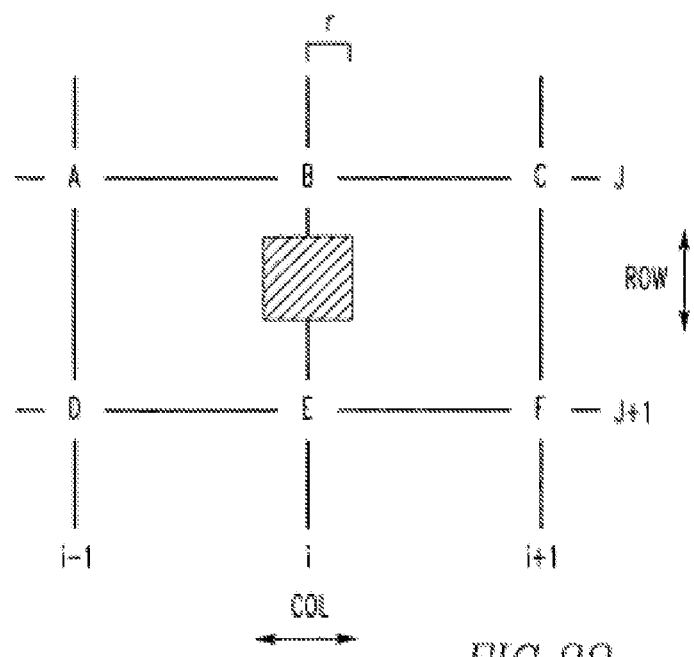
FIG. 32 shows a representation where half of a touch is on the left side of a connector and half of the touch is on the right side of the connector.

In FIG. 32 half of the small touch, shown in gray, is on the left side of connector i, and half is on the right side. The total measured value from the touch is obtained by summing: A+B+C+D+E+F.

Total response on the right side of the rightmost square (B,C,E,F) is given by summing C+F. Assuming a linear increase in responsiveness at junctions C and F to a single-point touch as position varies from edge i to edge i+1, we can compute the value of C+F by integrating the total touch over fractional position u across this square. This integral is proportional to $r^3$, whereas the total value of the touch is proportional to $r^2$.

Through symmetry, it can be established the same relationship between the measured response A+D at the left-most edge i−1 of the left-most square and the total value of the touch. Taken together, these results show that the radius of the touch is linearly proportional to (and therefore can be measured by) the ratio (A+C+D+F)/(A+B+C+D+E+F).

Alternate Embodiments

These are alternate ways to build an IMPAD device that still has all the properties of the devices described above, but have different construction.

1. No air gap—Most of the IMPADs use an air gap along with the roughness of FSR ink to create a middle layer 3 (from FIG. 1) that is force sensitive. Instead, special compressible materials can be used as the middle layer 3 which conduct more as pressure is applied. One example of such a material is Force Transducting Rubber, which is a rubber which has small particles of carbon embedded in it and conducts more as it is compressed. Such materials can eliminate the need for an air gap between top and bottom layers. Furthermore instead of using FSR ink for layers 2 and 4 (on FIG. 1), regular resistive ink can be used. Drone wires can be used in such a configuration to improve linearity of the sensor.

Figure 33:
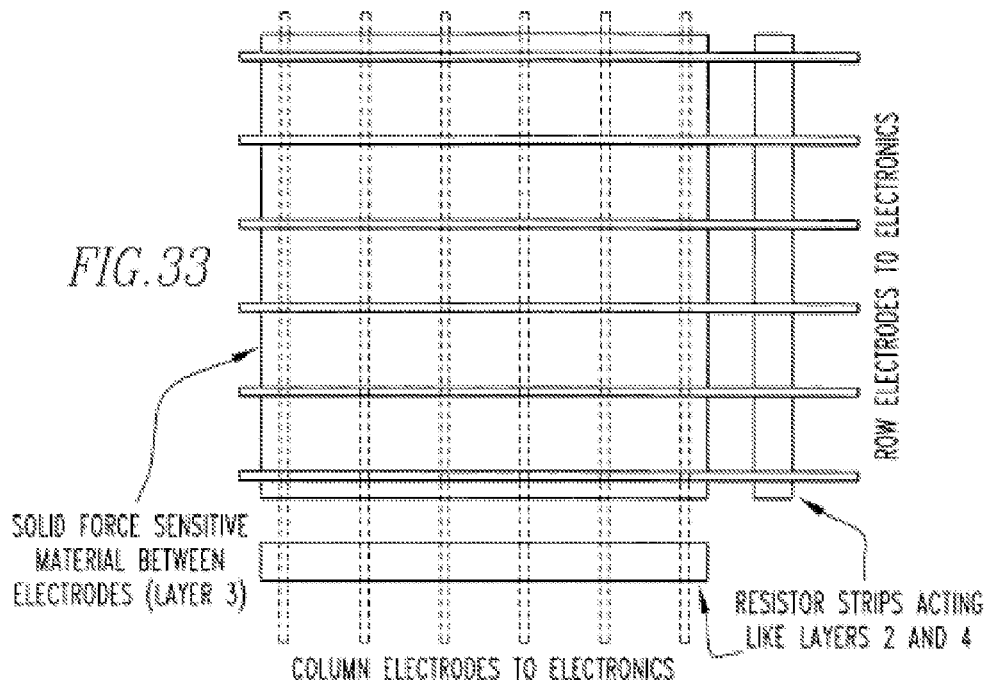
FIG. 33 shows a representation of transducting rubber material placed between the two layers 1 and 5 of the electrodes.
Figure 34:
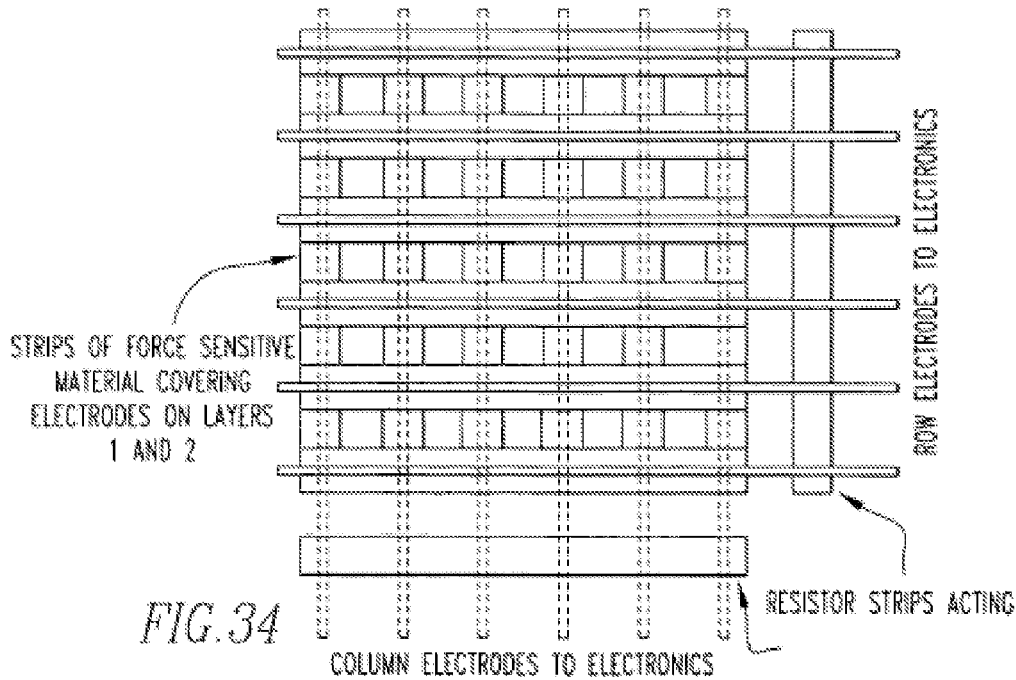
FIG. 34 shows strips of FSR material printed over the electrodes.

2. Side Resistors—The in-plane resistance created by layers 2 and 4 (on FIG. 1) can be moved out to the edges of the sensor (See FIG. 33), and even into external circuitry such that the electrodes 24 are not covered by layers 2 and 4 in the area where the force sensitive layer 3 is sandwiched in between. In such a configuration, there would still have to be a material that acts as the middle force sensitive layer 3 (from FIG. 1) especially since without it, a short could result between the electrodes 24 on layers 1 and 5 (FIG. 1). For this purpose, strips of FSR material can be printed over the electrodes 24 (FIG. 34). In another embodiment, a material which conducts more as it compresses such as a Force Transducting Rubber material can be placed between the two layers 1 and 5 of electrodes 24 (FIG. 33). Drone wires can be used in such a configuration to improve linearity of the sensor.

Figure 35:
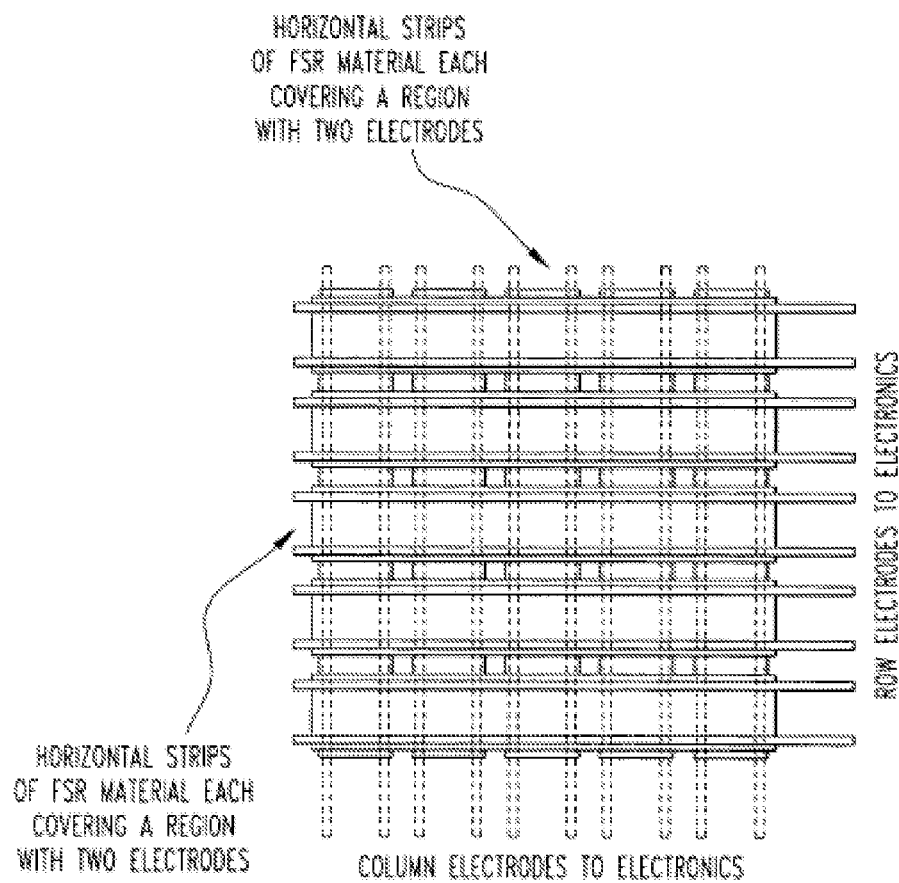
FIG. 35 shows a representation of the in plane resistance created by layers 2 and 4 can be broken between every other pair of electrodes.

3. Separated Regions—In an alternate layout, the in-plane resistance created by layers 2 and 4 can be broken between every other pair of electrodes 24 (FIG. 35). Although sensitivity would be lost between the pairs of electrodes 24 where layers 2 and 4 are broken, improved bilinear interpolation might be achieved in the regions where layers 2 and 4 are un-broken because of disconnection from adjacent circuits. Drone wires can be used in such a configuration to improve linearity of the sensor.

Drone Electrodes

Drone electrodes 24 are ones that are placed between the column 20 and row 22 electrodes 24 but are not directly connected to electronics (FIG. 36). It has been found that placing drone electrodes 24 between the other electrodes 24 greatly improves the linearity of the device (which affects its ability to accurately measure the position of a contact point between two electrode wires), and also the sensitivity of the device across the surface 16 (so pressure applied at the intersection of two electrodes 24 creates the same level of activation as pressure applied at in the middle between four electrodes 24). We found that in general, as the number of drone electrodes 24 is increased, accuracy improves, but only up to the point where electrical noise and irregularities due to sensor manufacture take over. Drone electrodes 24 are described in more technical detail in earlier sections.

In general, it is important to note that drone electrodes 24 essentially create a resistive surface 16 which conducts really well in one direction and poorly in another. There may be other technologies that can be used to create such a surface 16 such as depositing a layer of carbon nano-tubes on the surface 16 that are all aligned in the same direction.

To achieve economies of scale, it may be desirable to produce large sheets of sensor material with a regular pattern of finely spaced conductor lines. These sheets can be cut to the appropriate size for a given application and connected to electronics via a connector that has the same spacing of contacts as the spacing of the conductor lines. However, in some applications, where cost savings are important and high resolution is not required, electrodes 24 can be skipped and left disconnected. These skipped electrodes 24 in effect become drone conductors, contributing to the accuracy of the device even though they are not electrically hooked up or do not contribute in some way other than being physically present as opposed to the other electrodes 24, such as the row 22 and column 20 electrodes 24 which are hooked up and contribute to the sensing by doing more than simply being physically present. The drone electrodes 24 in one view can be considered not active, while electrodes 24 that are not drone electrodes 24 are active electrodes 24.

IMPAD is a revolutionary technology because it significantly reduces the cost and complexity of pressure imaging devices and because its construction may allow it to be incorporated into places where other approaches would fail. Thus, it enables many applications that would have previously been too expensive or impractical to realize. Here is a list of potential applications that IMPAD may enable:

IMPAD is a very general enabling technology, which can be incorporating into diverse applications, including writing implements, surgical implements, grip handles for operating machinery, as inserts into shoes or other clothing, inside of components of engines and other machinery, and molded into chairs and automobile seats in order to measure posture.

Writing Pads:

Using IMPAD as an inexpensive backing layer for writing pads allows writers to use their own pen and any paper they wish. Stroke information is gathered by IMPAD, which tracks the time-varying total pressure and centroid position of the impression that the pen makes through the intervening layers of paper of the pad. This information can be either stored for later retrieval or interactively sent to a computer for immediate use.

Floor Mats/Entry Sensors:

Inexpensive floor coverings of arbitrary size can deliver high quality real-time pressure images of feet or shoes. Each time the pressure image of a foot step is detected, that information can be combined with a data record indicating the current time. This time-stamped footstep can then be relayed to a networked digital computer, which stores this information. By accessing the stored foot/time information, it is possible to count the rate at which people travel through a particular location. IMPAD may also be used in security applications to detect traffic in restricted areas. It may be used to track people as they walk through an area by the pressure profile of their shoe and other stride characteristics. It can also be used to track wheeled devices such as shopping carts, fork-lifts or robots. This can, for instance, be used to recreate the path that particular people take through a store, to detect suspicious activity in an airport, or to detect a person who has collapsed in a hospital.

As a Coating on Airplane Fuselage and Wings, Ship Hull and Submarine Hull:

An IMPAD device can be incorporated into the manufacture of the outer surfaces of a moving vehicle. Because the material of the IMPAD device consists only of layers of paint and thin conductive material, the entire IMPAD device can be incorporated below the outer layer of paint on a vehicle body or wing surface, without compromising either structural integrity or weatherproofing.

By connecting the IMPAD to a computer in the vehicle, the resulting time-varying pressure upon the outer surface can be monitored to detect changes in pressure that can be used to make decisions to improve steering or other control. For example, if data from the IMPAD device is used to detect that the air flow over the upper surface of an airplane wing is transitioning from laminar flow to turbulent flow—which indicates the imminent onset of a stall condition—then the angle of attack of that wing can be immediately decreased under control of computer software, without the need for human intervention, or the risk of human error.

In addition, the pressure sensitive IMPAD layer allows a vehicle's onboard computer to detect contact and damage. Interpolating nature of the IMPAD sensor allows even coarse resolution sensors to pinpoint the location of any damage, thereby enabling quick repair.

Tire Pressure Sensing:

Continual monitoring of pressure patterns of an automobile tire against the road avoids dangerous tire blowout conditions, and allows the on-board computer on an automobile to alert the driver to the need to change or check tires. The more accurate time-varying information about the pressure of each tire against the road can also be used by electronic suspensions to adjust themselves to provide better traction or mileage. The IMPAD sensor can also instantaneously detect tears or punctures in the tire. Because the IMPAD technology is very thin and therefore does not appreciably change the physical profile of a surface 16, the IMPAD mechanism can be incorporated directly and unobtrusively as part of the manufacture of the tire, just inside the tread.

Computer Art:

Many interactive multimedia applications can benefit from a pressure-sensitive multi-touch input device, including digital painting, animation and shape modeling, the design of animated characters, 3D sculpting of virtual parts in Computer Aided Design applications, and rapid creation of artistic assets for computer games and film production.

For example, the same IMPAD device can independently detect both small pen touches and hand gestures—and can distinguish between the former and the latter because the pressure signal from a pen touch influences only a single square upon the IMPAD surface bounded by two adjoining rows 22 of conductor lines and two adjoining columns 20 of conductor lines, whereas the pressure from a finger or palm straddles many rows 22 and columns 20. Because of this difference, a single IMPAD device can be used to by a human operator wielding a pen or stylus in one hand to use painting or sculpting software, while gesturing with the other hand to holonomically translate, rotate and scale a virtual workspace, such as a virtual painting canvas which is implemented in software or a virtual 3D object that is being sculpted, which is implemented in software.

In another example, an artist can adjust the height features of a virtual terrain, implemented in software, to be used in a computer game or computer animated film, by simultaneously applying different amounts of pressure with the different parts (fingers and palms) of one or both hands, or by running a tool with a complex pressure signature, such as a paint brush, over the IMPAD surface.

In another example, multiple parts of an animated figure can be simultaneously moved in different amounts and in different directions, by using different fingers of one or both hands, each finger being used to move the apparent position of one part or joint of an animated figure that consists of many connected parts or joints.

Drafting Tables:

By incorporating an IMPAD device directly into the surface 16 of a drafting table or the top surface of a desk or table, the advantages of combining pressure-sensitive multi-touch manipulation with high precision drawing, painting and sculpting (as delineated in the previous section entitled "Computer art") can be integrated directly into the tabletop surface for use by artists, animators and designers. The very large working surface area afforded by such an interface 28 allows artists to work in a large format, while retaining the advantages of two-handed input, free-hand gestures, and precision pressure-sensitive pen or stylus placement. This is particularly important for those fields, such as architecture, that benefit from a combination of a large-format work space and high precision input.

Rapid Text Entry:

Because the IMPAD can simultaneously and accurately detect pressure changes of many touches over its surface 16, it enables a form of text entry that is potentially faster than the standard QWERTY or Dvorak methods of touch typing. Using IMPAD, the typist can merely place all ten fingers in fixed locations, and indicate a "key press" simply by flexing a finger without physically moving it. This flexion is detected by the computer as a momentary increase in pressure at the location of that finger on the surface 16. Because there is no requirement that the finger physically move, such a gesture is significantly faster than is the action of moving a finger to a key over a keyboard to the location of a key and then striking that key.

The use of ten fingers in this manner creates the equivalent effect of ten virtual keys on a virtual keyboard. This is a sufficient number of keys to implement a variant of any of a number of <i>dictionary based disambiguation methods for text entry (that is, methods in which several characters are mapped to a single key, and the ambiguous result is resolved via dictionary look-up) such as the T9 system [15]. For example, the typist's eight fingers and two thumbs can be mapped to, respectively, the following eight key groups and two special keys:

abc def ghi jkl mnop qrs tuv wxyz SPACE_KEY NEXT_KEY

In such methods, it is possible for the same key combination to be interpreted as several possible words. For example, the word "in" uses the same finger flex combination as the word "go". When such a situation arises, the computer software assumes that the user is intending to enter the word that has the highest usage frequency, as determined by a list of words stored in computer memory, where the words in this list are ordered from most frequently used to least frequently used. When more than one word is possible from a given keystroke combination, and the typist's intention is to enter a word that is not the most frequently used word which matches that keystroke combination, the typist can hit a special NEXT_KEY one or more times, which indicates that successive matching words further down in the word list be used rather than the most frequently used matching word.

Variants of this family of techniques can also be implemented, in which more characters are associated with each finger. This frees up particular fingers to be mapped to punctuation, numerical digits and so forth. Also, by depressing multiple fingers simultaneously, the typist can indicate various shift states, such as a shift to a capital letters character set, a numeric character set, or a punctuation character set. Additional information can also be obtained by analyzing the pressure exerted by the palms of the user. For instance applying pressure to one or the other palm can be used to switch to a capital letter or a numeric character set. Also, applying pressure to the left, right, top or bottom sides of the palm can be used to switch into different states or activate various shortcut commands. For instance tilting the palm to the right may activate a pen mode where a pen is being tracked. Placing the palm flat on the table can be used as a gesture to disable or enable the multi-touch device.

In practice this class of input methods is faster than either QWERTY or Dvorak, because the extra time that is occasionally necessary for the typist to hit the NEXT_KEY is more than compensated for by the fact that an isometric key stroke indicated by finger flexion is very much faster than is a keystroke on a traditional typewriter keyboard.

Wheelchairs:

IMPAD sensors can be incorporated into both the seat and the back of a wheelchair, and connected to an onboard computer, which can be made small and portable, in order to measure time-varying pressure of various parts of the user's body against the chair surface. When there has been insufficient change in the pressure pattern of a non-zero pressure of the patient's body against the chair surface over a substantial period of time (e.g.: an hour or more), this indicates that the patient is in danger of developing pressure sores, which can potentially be fatal. When this situation is detected, a health-care worker can be alerted, or else the patient, if mobile enough to respond by shifting his/her body position, can be alerted, or else a motorized device can be activated within the chair that causes the patient's body to shift sufficiently so as to remove the danger.

Hospital Beds:

IMPAD sensors can be incorporated into the mattress of a hospital bed, and connected to an onboard computer, in order to measure time-varying pressure of various parts of the user's body against the bed surface. When there has been insufficient change in the pressure pattern of a non-zero pressure of the patient's body against the bed surface over a substantial period of time (e.g.: an hour or more), this indicates that the patient is in danger of developing pressure sores, which can potentially be fatal. When this situation is detected, a health-care worker can be alerted, or else the patient, if mobile enough to respond by shifting his/her body position, can be alerted, or else a motorized device can be activated within the bed that causes the patient's body to shift sufficiently so as to remove the danger.

Baby Monitoring:

In a variant on the use of IMPAD for hospital beds, an IMPAD sensing surface can be embedded into the mattress of a baby's crib. The IMPAD is connected to a computer. Information from IMPAD to this computer is analyzed to determine whether the movement and breathing pattern of the infant is normal or abnormal. If an abnormal pattern is detected, the computer can immediately send a signal to alert a parent, guardian or health care worker.

Reconfigurable Control Panels:

In factories and other industrial settings that require a human operator to interact with a computerized control system, the expense of needing to install a new control panel every time there is a software or other operational change can be significant. Such control panels often require the operation of multiple simultaneous controls (e.g.: hold down a modal button with one hand while adjusting a slider value with the other). In such cases, a single-touch panel would be insufficient as a replacement for a physical control panel. IMPAD provides an inexpensive and flexible alternative. An IMPAD multi-touch industrial control panel can be reconfigured simply by placing a new printed template over the multi-touch sensitive surface, corresponding to the updated software in the underlying application.

Musical Instruments:

Not only can IMPAD be used to create inexpensive computer-interfaces for existing musical instruments, but it can also be used to rapidly build entirely new types of musical instrument.

As an example of the former, a single strip of IMPAD can be placed above the hammers in a piano (on the side of the hammers that is away from the strings) so that it touches all of the hammers while they are in their "up" states. Because IMPAD is capable of measuring extremely rapid changes in pressure to any part of its surface 16, it can be used to measure the velocity at which a hammer ceases touching the IMPAD surface, in response to a keypress by the player, as well as the time and velocity at which the hammer regains contact with the IMPAD surface, in response to a keylift by the player. This information is sufficient to completely capture all of the subtleties of the player's performance, at a far lower cost than can be achieved using existing methods for digital capture of a piano performance.

As an example of a new form of musical instrument, an IMPAD surface can be built into the top surface of the neck of a guitar. In such an instrument, when interfaced to a computer, there is no need for strings. The player can move his/her fingers about the fret board to play the instrument. Even the smallest movement of the player's fingers suffices to create a musical effect, such as pitch vibrato (small rapid changes in pitch that the player effects by wiggling a finger in the longitudinal direction of the fret board) or volume vibrato (small rapid changes in volume that the player effects by wiggling a finger so as to rapidly vary the pressure exerted by the finger against the fret board).

IMPAD surfaces can also be built into electronic drums allowing for the detection of the strength at which the drum is hit by multiple drum-sticks. The position at which the drumsticks strike can be used to modulate the sound in a way similar to the way a real-drum's sound changes form a higher pitched sharper sound when the side is struck to a deeper, richer sound when the center is struck.

Construction Materials:

Any load-bearing structure, such as a building or bridge, can fail when it is overstressed, and such failure can lead to both loss of lives and enormous expense. An inexpensive way to warn of such impending failure, before it reaches the critical stage, is to embed IMPAD devices into support structures. Because IMPAD has low power requirements and is inexpensive and because even a coarse resolution IMPAD device can measure the exact center of a stress point, IMPAD can be incorporated effectively for this purpose in situations for which previous technologies would be either inadequate or too expensive or both. The embedded IMPAD device can be connected to a small, inexpensive and low-power microprocessor, which is also embedded into the structural member. When the microprocessor, which periodically polls the IMPAD, detects an pressure pattern over the IMPAD surface which deviates from the expected pressure pattern, it can send an alarm to a computer, using some transmission method such as a signal across a wired or wireless network or a signal on a particular radio frequency, thereby identifying the at-risk structural member. This technique can be used for buildings, bridges, boat/submarine hulls, wind turbines, ship sails and any other structures for which it might be desired.

Inventory Control:

Shelves in warehouses, grocery stores and other places that have a need to monitor levels of inventory can be lined with IMPAD surfaces, which can be connected to a computer or a network of computers. By tracking the weight of a collection of known items that are known to be at a particular location in the facility (such as boxes or bottles or cans of a commercial product) the computer which is monitoring the IMPAD devices is able to track that changing quantities of inventory throughout the facility.

Portable Electronic Devices:

IMPAD provides an inexpensive way to enable true pressure sensitive multi-touch over the entire front or rear or side surfaces, or all surfaces, of a portable electronic information device. When used on the front surface, IMPAD is manufactured so as to be transparent, by using clear Force Sensitive Resistive materials and transparent conductors, as described elsewhere in this document. The use of IMPAD to send user information to the computer processor 120 within such a device enables much more subtle and expressive gestures by the user, and therefore a much richer gesture vocabulary for user interaction, than can be achieved through interfaces that do not provide spatially variant pressure information to the computer. For example, a gesture consisting of a stroke across the surface followed by a press (i.e.: momentary increase in finger pressure against the surface) can be distinguished from a simple stroke gesture. The ability to recognize and therefore respond to gestures that include variations in pressure distinguishes IMPAD base interfaces from interfaces based on input methods such as capacitive sensing, which do not have the ability to measure variations in pressure.

Grip Surfaces for Tools:

IMPAD can be incorporated into the handle of any instrument that is held in the human hand, such as a scalpel, hammer, tennis racket, golf club, and the space and time varying pressure of the user's grip can be sent to a small onboard microprocessor within the tool for analysis or for storage pending later analysis. If a tool is potentially dangerous, such as a power saw or electric drill, IMPAD can be used to rapidly sense and respond to any abnormality in the grip, which indicates that the tool is about to slip from the user's hand, and the power to the tool can be rapidly shut off in response. In the case of tools that require training and skill for proper use, such as a surgical scalpel or sports equipment such as a tennis or squash racket or golf club, the information from the IMPAD device within the grip can be processed by a computer, and this processed information can be used to give suggestions to the user about how to improve aspects of their grip to as to improve performance.

Other objects or equipment related to user performance can also be covered with an IMPAD device, so as to monitor how they interact with other objects. For example, balls and floors and walls of sports facilities can provide feedback to assist both scoring and performance evaluation. In the case of a ball with an IMPAD device either on or just below its outer surface, a microprocessor is placed inside the ball, and the information gathered from the IMPAD device by this microprocessor can either be immediately transmitted wirelessly to a computer, or else stored in the microprocessor's onboard memory for later retrieval, depending upon the needs of the application.

Sports Clothing, Shoes and Equipment:

By incorporating IMPAD into clothing (an IMPAD device can be formed in a cloth-like structure as described elsewhere in this document), and sending the information thus gathered to a small microprocessor which is worn on the body, pressure and flexing of the body during athletic performance can be monitored, to assist both in evaluative feedback and in avoidance of overexertion or unhealthy posture or other practice. An IMPAD surface placed in any part of a shoe or other footwear (not just underneath the foot, but also, for example, the toe, the heel and the sides of the foot), comprehensive information about the forces acting upon any or all parts of the foot can be gathered. IMPAD devices can also be incorporated into inexpensive and lightweight gloves, and this information sent to a computer that is worn on the body. This computer can either immediately process this information, store it for later retrieval, or transmit it to a remote computer, so that all touch and grip information can be continually monitored.

One application of monitoring of limb movement, of forces upon the foot, and of hand/finger grip information is in performance capture, which can be used for animation and puppetry control, for manipulation and navigation within virtual reality environments, for the control of robotic devices, and for therapeutic and other physiological monitoring. IMPAD could also be incorporated into sporting equipment such as bats, golf-clubs and tennis racquets to give players instant feedback about their strokes. It can also be detected into surfaces of playing fields to detect the impact of balls.

Measuring Spatially Variant Pressures Along Fluid/Solid Interfaces

One application area for IMPAD is for use in lining surfaces that adjoining gaseous or liquid volumes that have spatially varying pressure, such as lining the inside of water pipes with IMPAD based materials in order to monitor the flow and pressure buildup. Also, IMPAD layers can be incorporated into the outer hulls of ships or submarines and the wings and fuselages of airplanes.

Porous constructions of the IMPAD that allow fluids to flow through them can sense flows through valves and tubes and thereby detect impurities or objects in those flows.

Investigating Fibrous and Cloth-Like Woven Structures

Woven structures enable high material strength and flexibility and stretching capability. IMPAD is formed into woven structures by coating of thin wires with force sensitive resistive sheaths. These coated wires are woven into a warp and weft structure. Passive wires between the actively controlled wires along each of the two axes increase the bilinearity of the response, as with other implementations of IMPAD (FIG. 18).

The following further describes and adds to the above.

Mesh Technique that can be Used with Digital Display Devices

A transparent mesh embodiment of IFSR can be implemented as follows. Over a clear substrate—which can be plastic or glass—thin parallel lines of conducting material are laid. These lines may be printed or etched onto the substrate, or placed there by any other known method.

Figure 37:
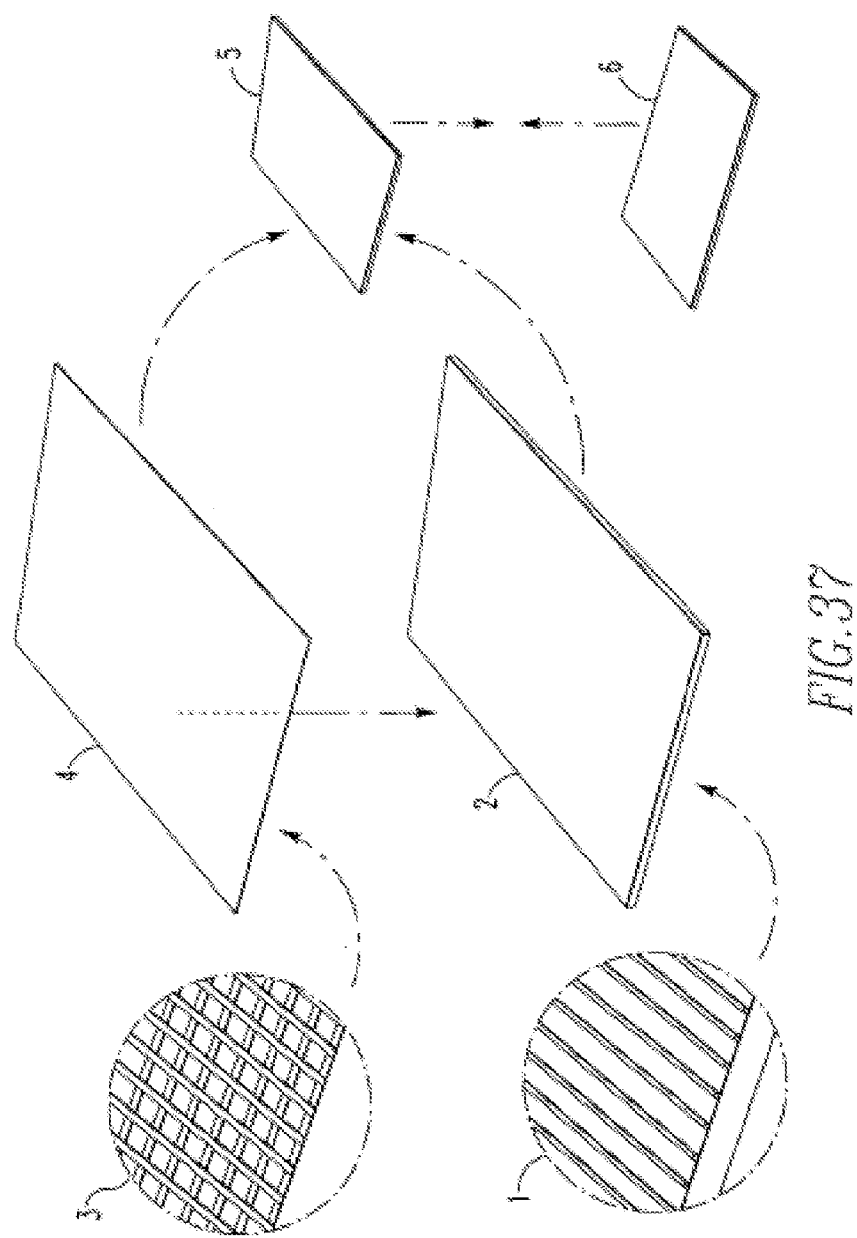
FIG. 37 shows a transparent mesh embodiment of the present invention.

In FIG. 37, this layer is shown both in close-up (1) and in wide view (2).

The spatial offset between successive parallel conducting lines (i.e.: the "pitch" of the lines) can be made to match the pixel pitch of a digital display device, such as an LCD display that contains a TFT electronic grid. In such devices, the TFT grid itself is not transparent. If the pitch of the pattern of parallel conducting lines matches the pixel pitch of the display, then when the final IFSR sensor device is laid atop the digital display the sensor will align with one of the two dimensions of the display's TFT grid. The overlaid conducting lines will thereby obstruct only the already opaque TFT grid, and therefore the presence of the sensor over the display surface will not appreciably diminish either the brightness or the clarity of the display device.

On top of the parallel conducting lines is overlaid a square grid of FSR material, shown in the figure in close-up (3) and in wide view (4). The pitch of this grid is matched to the pitch of the parallel conducting lines, so that each successive conducting line is covered by one successive row of the FSR grid pattern.

The FSR material can be placed by an ink-jet process, or by an etching process, or by any other known method for laying patterned ink upon a surface.

Once the grid of ink has been affixed atop the transparent sheet so that it covers the parallel conducting lines, the single unit thus formed becomes one side of a two-sided IFSR sensor (5).

To assemble an IFSR sensor, two such sides (5) and (6) are placed into contact with each other, such that their ink grids are in mutual contact and geometrically aligned, and such that their respective parallel conducting lines are mutually perpendicular.

This "mesh embodiment" of an IFSR sensor allows rays of light to pass, unimpeded, through the clear portions of the grid pattern. In particular, the grid pattern does not impede the viewing of a digital display upon which the sensor has been placed, assuming that the pitch of the sensor's grid pattern matches the pitch of the pixels of the digital display, and that the TFT array between the pixels of the digital display are aligned with the printed grid pattern of the sensor.

In all other ways, the sensor behaves the same as any other embodiment of an IFSR sensor. It possesses the same area-interpolating force-imaging capability, the same external wiring and electronics, and the same scanning algorithm for read-out of time-varying force images.

Diamond Pattern

There are two disadvantages to using horizontal conductive lines for one surface of this invention, and vertical conductive lines for the other surface, in order to form the grid that addresses various parts of the sensor surface. One disadvantage is that return lines need to be run from one of the surfaces back to the controlling electronic circuitry. These return lines must either (1) run around the outside of the active sensor area, thereby giving the sensor an inactive border area to contain these return lines, and therefore making it more difficult to tile a larger surface with sensors, or else (2) run back to the circuitry through a third stacked layer, thereby increasing the expense and number of manufacturing steps for building the sensor. In both of these alternative embodiments, the resulting sensor has different length conductive lines, due to the different added lengths of the return wires, which results in differences in electrical resistance between different conductive lines. This property can make it more difficult to accurately determine the pressure at all parts of the sensor.

In order to avoid any of these deficiencies, an embodiment is described whereby conductive lines are run diagonally across the sensor surface, at a 45 degree angle from the orientation of the sensor borders. Conductive lines along one surface are run from the bottom right to the top left, whereas conductive lines along the other surface are run from the bottom left to the top right. This arrangement forms a set of diamond shaped tiles, thereby maintaining the property that conductive lines and the top and bottom surfaces, respectively, cross at a right angle.

In this arrangement, all electrical connections to the controlling electronic circuitry can be made along the bottom edge. Each conductive line along the left edge of the first surface is shorted to the correspondingly positioned conductive line along the left edge of the second surface. In addition, each conductive line along the right edge of the first surface is shorted to the corresponding conductive line along the right edge of the second surface. In this arrangement, all conducting lines of the sensor are of the same length (thereby guaranteeing equal electrical resistance for all conducting lines), and there is no need for the addition of return lines.

FIG. 38 shows an N×N sensor with diagonal conducting lines. (1) represents one of the conducting lines of the first surface (in gray). (2) represents one of the conducting lines of the second surface (in black). (3) represents a shorting of a conducting lines of the first surface with the conducting line of the second surface that is coincident with it where both conducting lines cross the left edge of the sensor. (4) highlights the bottom edge of the sensor, where the ends of all 2N conducting lines are available for connection with the controlling electronic circuitry. (5) represents an edge view of the bottom edge of the sensor. In the lower half in this view are the N ends of conducting lines that lie along the first surface where they terminate at the bottom edge of the sensor (shown in gray). In the upper half in this view are the N ends of conducting lines that lie along the second surface where they terminate at the bottom edge of the sensor (shown in black).

In FIG. 39 only tile is active, and this tile has been marked with a large black dot. Along the bottom edge of the sensor two successive conducting lines are activated by the controlling electronic circuit to create an electrical potential difference across the marked tile along the first surface, along one of the tile's two diagonal dimensions. One of these conducting lines i contains the source voltage and the other i+1 is connected to ground.

Simultaneously, along the bottom edge of the sensor two other successive conducting lines are activated by the controlling electronic circuit to create an electrical measurement across the marked tile along the second surface, along the other of the tile's two diagonal dimensions. One of these conducting lines j is connected to voltage measurement circuitry and the other j+1 is connected to ground.

Over the course of one complete scan of the sensor, each of $2N^2$ unique diamond shaped tiles of the sensor are individually measured in sequence, by successively setting possible ordered pairs of such conducting wires to different values of (i,i+1) and (j,j+1), where i+1<j.

Equivalently, the entire sensor can be stretched along one dimension, so that each of the diamond shaped tiles are elongated in one dimension.

Because no return wires are requires, this diagonal arrangement for conducting wires is particularly suitable for woven cloth embodiments, using the under/over structure of woven conductors coated with FSR material as previously described, because all of the electrical connections to the controlling electronic circuitry can be localized along one edge of the cloth, which can function as a seam of the cloth fabric. This arrangement of conductors is shown in FIG. 40.

Other Alternate Embodiments

FSR can be placed on just one side of the sensor. The other side can be covered with a resistive material that is not an FSR. As long as one side has FSR the combination of the two materials pressing together will act as an FSR. Alternately, the other side can have exposed wires and/or drones with a resistive strip running along one edge to provide for the interpolative quality on the other side. Also, we have shown two alternate embodiments of the UnMousePad . . . where the FSR does not form a continuous surface, having breaks in it. In these embodiments, the FSR on one side can be replaced with resistive material. All of the embodiments can be mixed and matched, so that one embodiment is on the top surface and another embodiment is on the bottom surface.

It is also possible to have a sensor that has interpolative properties in one dimension, let's say vertically, and not to have them in the other, let's say horizontally, by mixing and matching an un-mousepad like surface on one side, with a simple array of electrodes (that may optionally be covered with non-continuous FSR strips or resistive strips) on the other side.

One or both sides of a sensor can be printed on a rigid material (for example PCB). A rigid material can act as a base for the sensor. If a rigid material is thin enough, or flexible enough, it can also be possible to sense force through it.

Really large UnMousePad surfaces (for applications such as ballrooms or dance floors) can be created by placing strips of material together on the top side and placing perpendicular strips of material on the other side together. The strips of material would have electrodes running along it covered with FSR. Really long UnMousePad surfaces (for covering hallways or walls) can be created by having such strips of material on one side, while having a strip of material which has perpendicular electrodes on the second side. The second side would need to have return wires running along it which can be printed on the opposite side of the material and connected with vias, or can be printed on the same side and separated with a layer of dielectric (this same principle can also be used on smaller/shorter sensors).

Incorporation with Other Sensing Technologies

Several other touch sensing/stylus tracking technologies use grids of electrodes. For example, grids of electrodes are sometimes used in capacitive devices such as the Apple iPhone, and are also used in magnetic devices such as Wacom's tablets. Because our sensors use low frequency analog voltages, it is possible to simultaneously use the grid of electrodes for magnetic or capacitive sensing. This could either be done simultaneously or in separate time-slices from the force sensing.

Electrically, to make a capacitive sensor, capacitive sensor electronics would simply need to be electrically connected to the electrodes and/or drone lines of the UnMousePad sensor. If multiple electrodes or drones need to be tied together in order to reduce the resolution of the capacitive sensing (thereby reducing cost), they can be tied together using small capacity capacitors between each other to avoid disrupting resistive force sensing. This is because the low frequency analog signals used for force sensing will not go through the capacitors, while the high frequency signals used for capacitive sensing will just go through the capacitors as if they weren't there.

To make a magnetic sensor, electrically inductive loops need to be created on the sensor surface. This can be done by having return wires that are on the other side of both sheets of plastic, or that run around the periphery of the sensor. The return wires can form loops with the electrodes, drone lines, or both. In order for the loops not to interfere electrically with resistive force sensing, small capacity capacitors can be placed to in the path of the current on these loops on each return wire. As with capacitive sensing, the capacitors will interrupt the flow of low frequency analog signals, allowing for force sensing, while allowing high frequency signals used for magnetic sensing to pass through.

Also, the UnMousePad principle can apply to sensing of other natural phenomena besides force. For example, they may be used to measure light waves, sound waves, or any other electromagnetic wave. For example, to detect light waves, a material such as that used in Hamamatsu sensors, which change their resistance in response to incoming light, can be disposed between the two layers of a transparent or partially transparent UnMousePad. To detect audio waves, a material which generates voltage (such as a piezo-electric transducer) or changes its electrical resistance (FSR) in response to vibration can be used between the layers of the UnMousePad. To detect electromagnetic waves, a material can be used which changes its electrical resistance in response to stimulation by electromagnetic waves, including electromagnetic waves that are outside of the visible spectrum, such as microwaves or infrared light.

Figure 41:
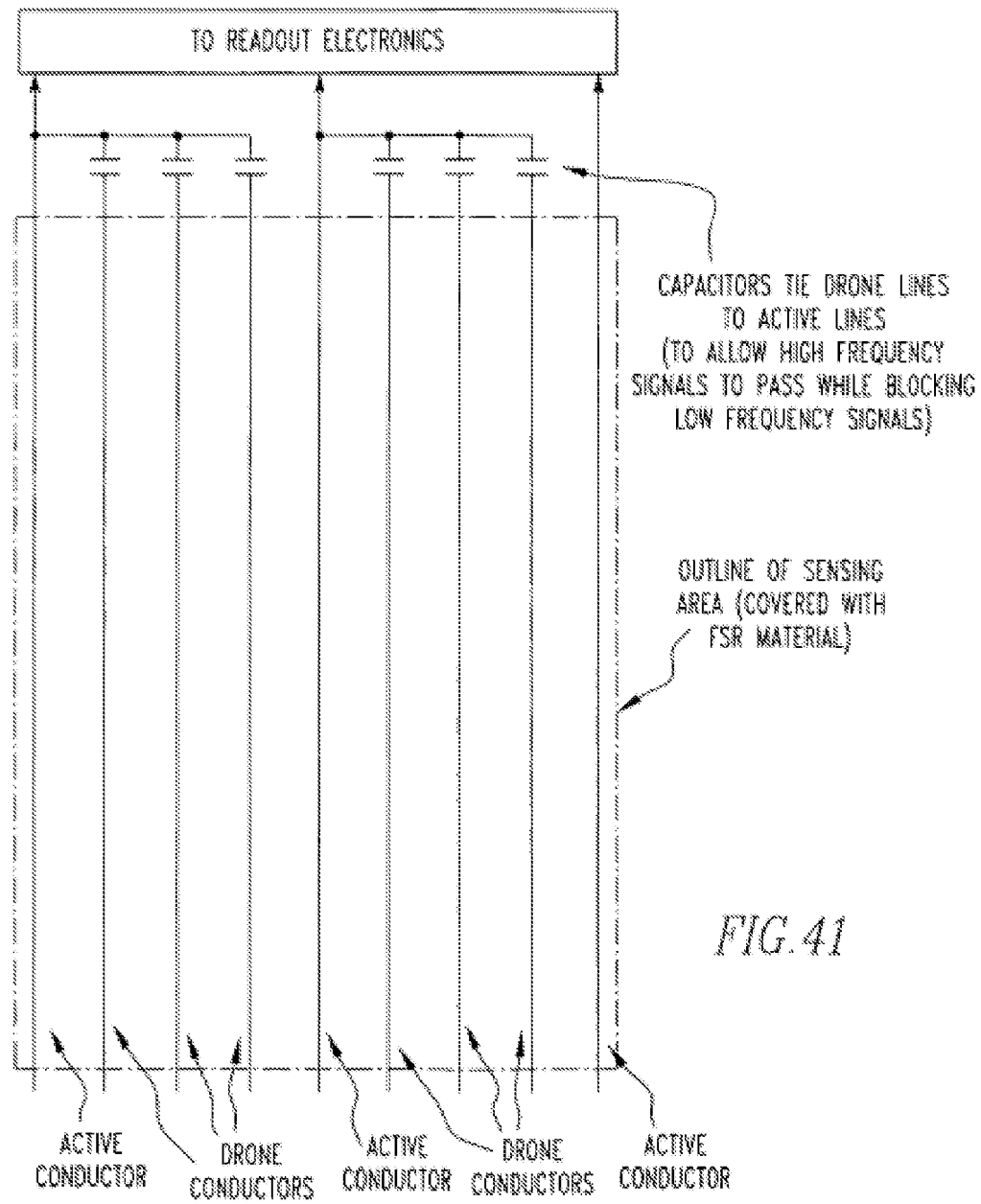
FIG. 41 is a diagram showing how drone conductors can be tied to active lines with capacitors to combine resistive and capacitive sensing.

FIG. 41 is a diagram showing how drone conductors can be tied to active lines with capacitors to combine resistive and capacitive sensing. Note that a similar pattern of conductive lines, rotated by 90 degrees is used on the second layer of the sensor in accordance with standard UnMousePad technology.

Figure 42:
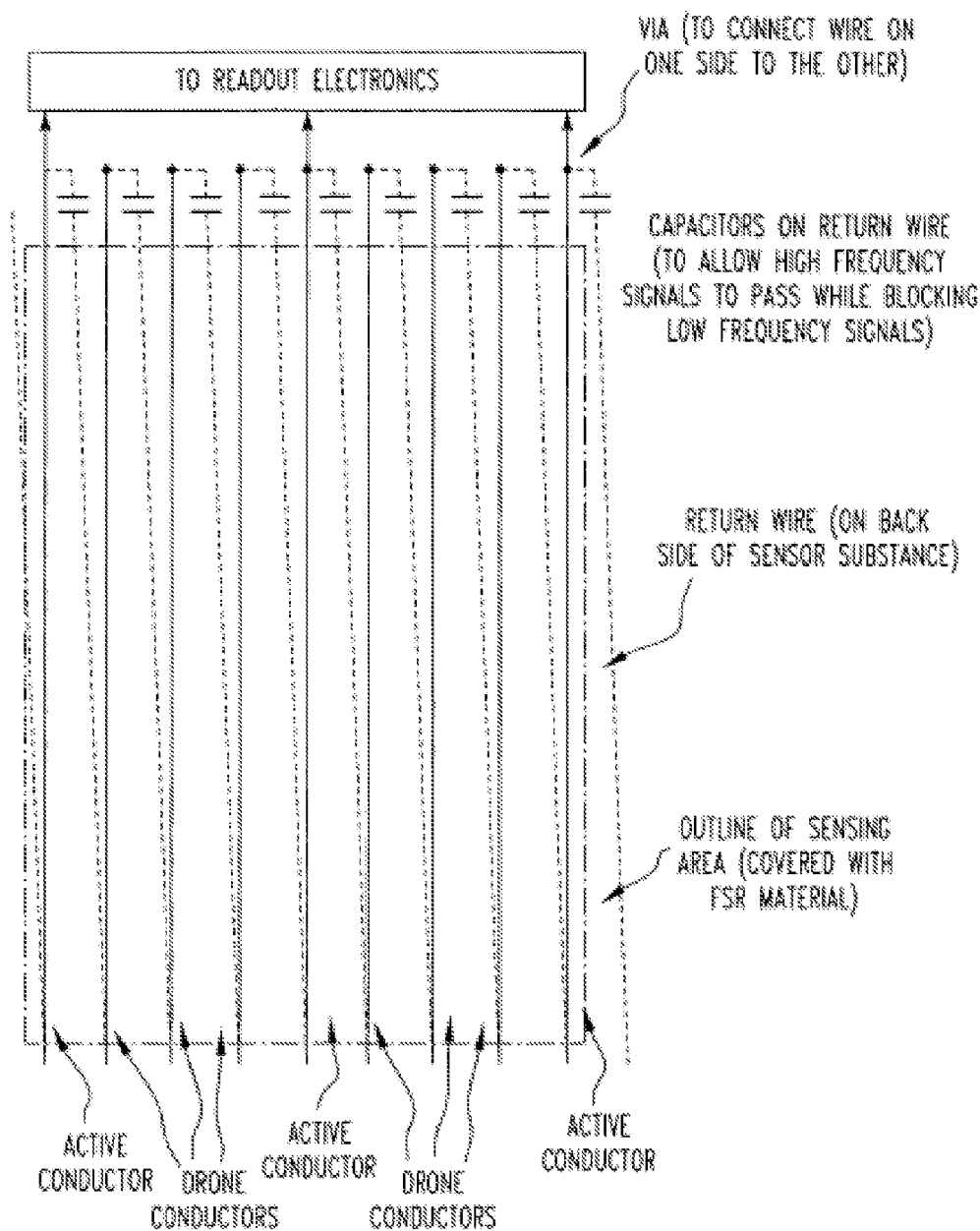
FIG. 42 is a diagram showing how drone electrically inductive loops can be formed using return wires on the back of the sensor.

FIG. 42 is a diagram showing how drone electrically inductive loops can be formed using return wires on the back of the sensor. Capacitors are put into the path of the current flowing on return lines to preserve resistive sensing ability. Note that a similar pattern of conductive lines, rotated by 90 degrees is used on the second layer of the sensor in accordance with standard UnMousePad technology.

Non-Conducting Liquids

Non conducting liquids such as mineral oil can be placed between the two layers of FSR material. In a transparent embodiment, this reduces optical scattering from the surface of the transparent ink. In any embodiment including opaque embodiments, this prevents other liquids such as water from entering the sensor, while also making the sensor react less to quickly applied forces, which is desirable when using the sensor to measure slowly varying forces. This also makes the sensor filter out forces due to bending and forces due to atmospheric pressure, or pressure of a fluid that presses on the outside of the sensor. One possible application of such a sensor is for coat the hulls of ships or submarines to detect collisions or potentially dangerous situations. The liquid within the sensor keeps the two sides of the sensor from touching despite pressure that is applied to it from the outside; the liquid also prevents the pickup of quickly changing variations in pressure such as those caused by waves. However, any forceful or long-lasting non-uniform pressure applied to the sensor, such as the pressure due to collision with sand, a rock, a dock or another vessel would be detected, and could be used to alert the captain or crew of a potentially dangerous situation.

Manufacturing Techniques

A force sensitive rubber (such as the one made by peratech) or similar flexible material which has a conductivity which increases with applied pressure (for example, rubber, gel or silicone rubber impregnated with conductive particles) can be disposed between the two layers without coats of resistor or FSR. If the rubber is of sufficient thickness, the sensor will have proper conducting/interpolating properties along the surface of the two sides as well as proper force sensing properties in the direction perpendicular to the sensor surface. In another embodiment the electrodes on the top and bottom layer of the sensor can be first coated with a resistive material. Then, the force sensitive rubbery material can be disposed in between the two layers. Such sensors sense force based on a volumetric variation in resistance due to applied pressure, unlike FSR sensors which sense pressure due to increased contact area between a top and bottom layer due to applied pressure. Force sensitive rubbery material can be molded into various shapes and can be made into sheets that could go between electrodes of an upper and lower layer. It can have varying thicknesses in various parts, which is useful in embodiments such as shoe insoles that sense pressure. The material can also be injected between two sensor layers in a liquid form and allowed to solidify, therefore eliminating any air gap between the layers. The solidifying can be performed by mixing a hardener into the material in liquid form, injecting it, and allowing the hardener to chemically react and solidify. In another embodiment, a material can be chosen that is solid at room temperature, but liquid at a higher temperature. The material can be heated to where it becomes a liquid, injected between the two layers, and allowed to harden.

In many of our prototypes, all coats of FSR were printed with a screen printing process. Typically the screen printing device swipes ink across the screen in one direction. This causes streaks in the material. In an alternate embodiment which produces a more even coating, the ink is swiped across the sensor in alternate non-parallel or anti-parallel directions on successive print layers to reduce streaking in the final printed FSR.

Another way to form electrodes, besides screen printing silver conductor, is by depositing a thin film of metal such as nickel or other conducting material (using sputtering) and then etching it with a mask and acid, laser etching, or mechanical etching (scratching away material) to form the desired electrode pattern. The electrodes can be then be made thicker using electro-plating. Typically, a voltage needs to be applied to the electrodes to be electroplated. This can be done efficiently by having a wire that connects all the electrodes together on one end, near the area where electronics are normally connected, and runs to an area where a connection can be made to a circuit used for electroplating. The wire connecting the electrodes can be cut of or broken after electroplating to electrically separate the electrodes, as the connection is only needed in the electroplating step. Electrodes which are metal have the advantage of lower electrical resistance, and thus more accurate sensing. They can also be made thinner than printed silver electrodes, while still maintaining good electrical conductivity and resiliency. Thinner electrodes further improve the accuracy of sensing.

Another way to form electrodes is to etch grooves into glass, plastic or other substrate. The etching can be affected by chemical etching with a mask, with lasers, or via mechanical means such as scratching away material. Alternately, a material with grooves can be created by molding, where the mold is machined in such a way as to create sheets of material with grooves. Then, the substrate with grooves on it can be coated with a layer of conducting material such as a thin coat of copper or other metal. Then, the top layer can be removed, leaving only the material in the grooves. The advantage of this approach is that the upper surface will be smooth, with conductors that actually have some thickness to them, reducing their resistance.

Another way to form electrodes is to sandwich alternate thin layers of conductive and nonconductive materials, thereby forming a block of material consisting of a "zebra" pattern. After the material is fully cured into a solid, it can be sliced into thin layers in a direction at a non-zero angle to the orientation of the original planar layers. This process results in thin solid sheets that contain alternating stripes of conducting and non-conducting material.

Another way to form electrodes is to laminate thin conductors, for example, made of strips of thin copper foil onto a substrate such as plastic. This is a technique that is used in industry to create some varieties flat flex cables (FFC). This technique has the advantage of not creating any waste material, thus it can be less expensive than methods requiring etching. It is also a very good technique for creating large scale sensors such as those used to cover floors and walls, because high precision alignment of electrodes is not as important. Connection can be made to sensors manufactured in this way using zero insertion force (ZIF) sockets, with crimp-on connectors, zebra connectors or other z-axis conductors pushed up against a circuit board, or by printing a wiring pattern in a subsequent printing step to connect the electrodes to external electronics.

Yet another way to form both electrodes and FSR layers is ink-jet printing. Ink-jet printing has the advantage of being able to form very fine patterns in any desired configuration. It can also form a very smooth layer of FSR ink. A further advantage of ink-jet printing is that there is no waste material, thus it can be less expensive than methods requiring etching, there is also virtually no added production cost incurred from modifying sensor patterns or designs.

Another way to form a very smooth layer of FSR ink is to vibrate the substrate at a high frequency in random directions after applying FSR ink via a method such as ink-jet printing or screen printing, but before the ink is dried. The vibration acts to evenly distribute the FSR ink, forming a smooth upper surface, which in turn improves the accuracy of sensing in the final product.

Quality Control

The UnMousePad can be tested electrically by connecting wires to each side of each electrode and measuring resistance between electrodes as well as conductivity of electrodes. The pressure sensitivity of the UnMousePad can be tested by fully assembling a sensor, and then either applying known pressures at known points (and measuring for the correct output from the electronics), or by applying an even pressure over the entire sensor and checking for a signal that is the same over the whole sensor. This can be done either by pushing a solid plate covered with a thin sheet of soft force-spreading material, such as rubber, onto the sensor, or by placing an air-tight box-shaped vessel with the lower face missing onto the UnMousePad and then pumping it with various pressures of gas (a rubber gasket can be provided on the edges to prevent leakage of gas).

To check the evenness of the sensor FSR layer, or verify that the FSR layer contains no holes, the UnMousePad can be scanned with an optical scanner, such as the scanners commonly used for scanning sheets of paper and photographic slides. In paper-scanning mode, the scanner will see all the details of the sensor surface, but will not see where there are holes. In the slide-scanning mode, we shine light through the sensor while it is being scanned. All holes thereby show up as bright spots. Both of these scan modes can be combined and performed simultaneously if different colors of light are used for scanning the surface and for scanning for holes.

Once a scan is performed, a large high resolution image of the sensor can be obtained. This image can be analyzed by known software means to look for defects. The image can also be stored in an archive in order to track the effect of defects over time, and to be able to see whether a sensor had originally contained manufacturing damage, should the sensor fail at some point during its operational lifetime.

UnMousePad Mounting, Surface Coating

In many situations it may be desirable to mount the UnMousePad sensor so that one side is attached to a rigid surface. This protects the sensor from being creased. The second advantage is that if the sensor is placed on an uneven surface, then the sensor can incorrectly register bumps on the surface as touches. Placing the sensor on top of a rigid surface avoids this.

Secondly, the enclosure of the UnMousePad can be made to cover the edges. In this configuration, the enclosure can physically hold the top and bottom of the UnMousePad together without requiring double sided adhesive such as VHB, thereby reducing assembly costs. However, in this arrangement the traces of the UnMousePad running to the electronics on the top and bottom layer need to be insulated from each other. Furthermore, in this configuration, the top and bottom surface of the UnMousePad need to be kept in alignment with respect to each other by some mechanical means, such as pins or screws that go through registration holes that are cut into both layers.

For some applications, such as for typing or for use as a musical instrument, it may be desirable for the UnMousePad to have a soft surface. For this purpose, the UnMousePad can be covered with a soft material such as a rubber or silicone. The material can be optionally covered with a smooth, thin coat of a material such as synthetic cloth or Teflon to provide a smooth upper surface for easy gliding of fingers. The sensor can also be covered with a rougher surface such as paper, or a plastic with paper texture for more comfortable writing. Alternately, the UnMousePad can be placed on top of a rubbery surface. If the sensor is thin enough, the surface below the UnMousePad will cushion the user's fingers as they strike the UnMousePad. In this configuration, the surface can also be coated with a smooth surface, or by a surface with paper texture.

For some applications, it may be desirable to have two or more different textures or softnesses available. Two textures can be provided by coating the outsides of the two sides of the UnMousePad with different materials. For instance, one side can be coated with a rubbery material which is coated with a smooth cloth suitable for touch interaction, while the other side can be coated with a more rigid material that has a paper texture suitable for writing. Another example is a material which is rubbery on one side for use as a drum instrument, and smooth on the other for use as a guitar-like instrument that allows the player to easily slide fingers between notes. Alternately, materials which can be removed and replaced on the surface of the UnMousePad can be provided. These surfaces can be tacky, magnetic, or have other mounting means so that they do not slide laterally across the surface of the UnMousePad in an undesirable way.

Alternate Readout Electronics

To sense light touches, it is desirable to be able to detect very low voltage on the sensor outputs. Furthermore, for more accurate tracking and sensing, it is desirable to detect small variations in voltage. This can be achieved with several approaches which can be used one at a time or in combination. One approach is to use an A2D converter with more output bits. More bits generally imply that smaller variations in voltages can be measured. A second approach is to lower the analog voltage reference of the A2D converter. This lowers the upper limit of the range of the voltages that are read (such that voltages above a analog voltage reference cannot be read at all). However, at the same time, this also allows for more precise reading of voltages below the analog voltage reference value. Another way of improving the sensor's sensitivity is to use a voltage gain amplifier that can amplify small voltages before those voltages have been sent to the A2D converter. With all of these approaches, the sensitivity can be varied in real-time to allow for high-dynamic-range scanning. With approach 1, the number of bits scanned can be varied, with approach 2, the analog voltage reference can be switched dynamically, and with approach 3, the amount of gain can be varied during scans as required.

A bank of sense resistors (resistors with a known fixed resistance) can be connected to each of the output lines of the sensor on one side, and to ground on the other side. This arrangement allows the sensing of all outputs simultaneously or of several outputs at a time, without requiring the use of digital electronics to ground the pins. The sense resistors need to have a very small resistance, and the outputs generally need to be amplified with an analog gain amplifier. The use of low resistance in the sense resistors avoids blurring of the force image. The configuration thus described has the advantage of improving the linearity of position readout of the sensor device.

Alternately, each of the outputs of the sensor can be connected to a current-to-voltage amplifier. The current-to-voltage amplifiers force all the outputs of the sensor to ground, while simultaneously allowing voltages to be read out that correspond to the amount of current flowing through each sensor output pin that is requires to force the pin voltage to ground. The configuration thus described has the advantage of improving the linearity of position readout of the device. Furthermore, the current-to-voltage amplifier can serve the purpose of amplifying the signal, which can improve sensing of small forces and small variations in forces applied to the sensor.

Shift registers can be used to drive the pins of the sensor inputs to a small positive voltage, such as +5V or +3.3V, or to ground. Any number of shift registers can be chained together to expand the size of the sensed surface. By shifting several bits into a shift register that have several 1 values in a row, either followed or preceded, or both, by 0 values, we can power multiple inputs simultaneously. The configuration thus described effectively scans the sensor at a lower resolution, but with a faster scan rate.

On the output, analog multiplexors to select channels for A2D conversion can be used in combination with logic that can drive the lines either to ground, or into a high impedance state. Logic that enables this ability includes: shift registers which have an output enable input (which can force all outputs of the shift register into a high-impedance state), port expanders that can switch between output or input states, shift registers that have open-drain or open-collector outputs, general purpose microcontroller I/O pins, some types of programmable logic arrays (PLAs), or shift registers used in combination with inverting/non-inverting buffers that contain open-drain or open-collector outputs. In order to scan the outputs of the sensors at a lower resolution, but with a faster scan rate, several adjacent drive pins need to be put into a high-impedance state. Additionally, for the purpose of being able to scan the sensor at variable resolutions, it is desirable for several adjacent outputs from the sensor to be connected via analog multiplexers to the same analog line for scanning. This can be achieved by using SPST (single pole single throw) analog switches connected between sensor outputs and a common analog line. This can also be achieved by interleaving the inputs of analog multiplexors such as 8:1 analog multiplexers. For example, if two analog multiplexers are used, pin 1 of mux 1 can connect to pin 1 of the sensor, pin 1 of mux 2 can connect to pin 2 of the sensors, pin 2 of mux 1 can connect to pin 3 of the sensor, pin 2 of mux 2 can connect to pin 4 of the sensor, and so on. The common outputs of the multiplexers can be connected together electrically and then go to whatever A2D converter is used. With this configuration, we can simultaneously read out from any 2 adjacent pins of the sensor by connecting both to the A2D converter input simultaneously. One skilled in the art can see that by chaining more multiplexers in this way, an arbitrarily large number of adjacent pins can be simultaneously connected to a single input of an A2D converter.

It is possible to make custom chips that can drive any single pin or combination of pins (for example, 8 pins together) to ground or to power, can put pins into a high impedance state, or can connect pins to a common analog bus, or can sense the digital value of an input pin by connecting pins to a digital output, using open-drain or open-collector outputs with a pull-up resistor. This kind of chip would essentially act like a port expander, with the added capability of enabling analog sensing on any of the input pins or on multiple input pins. To select the mode of various pins, a shift-register, or multiple shift-registers, can be used to shift in the modes for the pins, and then to latch the result onto the output, all in one step. Alternately, an I2C bus or a serial UART bus can be used to communicate with the chip.

It is possible to use programmable logic such as an FPGA, PLA, CPLD or SPLD coupled with one or more A2D converters in place of a microcontroller to read out values from the sensors. It is also possible to use such programmable logic in combination with a microcontroller to read out values from the sensors. The use of a microcontroller in previous examples is illustrative, and ones skilled in the art will appreciate that other types of logic such as the programmable logic mentioned in this paragraph may take the place of a microcontroller to perform readout and processing of forces from our sensors.

In many of the embodiments and diagrams of the sensor that are shown herein, column and row electrode connections to electronics are made in generally the same area of the sensor, with wires from the row electrodes running around the sensor to wind up in the same area as the wires from the column electrodes. This configuration is just one possible configuration for these connecting wires. One alternate configuration is to run wires from column electrodes vertically to a circuit board that is either above or below the sensor, while running wires from row electrodes horizontally to a separate circuit board that is either to the left or to the right of the sensor. This configuration shortens the paths along which the wires connecting to electronics must run, and reduces the amount of border area needed for the wires. It also separates the electronics used for driving the columns from the electronics used for reading the rows into two circuit boards. The circuit boards may be connected to each other electrically with a separate electrical connection, consisting of one or more wires, to allow them to talk to each other.

In some instances, we describe that column electrodes are powered while row electrodes are read out, or we describe that column electrodes are read out while row electrodes are powered. This is done for illustrative purposes. Because the top and bottom sides of our sensor have the same configuration in most embodiments, they are interchangeable. Thus, where row electrodes are read out and column electrodes are powered, it is possible to reverse the roles, powering row electrodes and reading out from column electrodes, and vice versa. Furthermore, because rows and columns are interchangeable, it is straightforward to make circuitry that can operate in both modes. For instance, in one pass, the circuitry can power rows while reading out from columns, in a second alternate pass, it can power columns while reading out rows. The combination of the pressure images recorded from the two scans may be combined by averaging or other means to produce a more accurate final pressure image. All that is necessary to create such circuitry is to connect both row and column electrodes to circuitry that can individually power them, ground them, put them into a high impedance mode, or read their voltage with an analog-to-digital converter.

Touch Tracking

All of the algorithms used for analysis of pressure images can be implemented either on the host CPU or on the microcontroller that drives the sensor, or in any combination between the CPU and the microcontroller.

1. Before finding local minima and finding connected components using a flood fill algorithm, it is advantageous to upscale the resolution of the image through the use of linear interpolation. Preferably, the image is upscaled to at least 4 times the original resolution. This upscaling has the effect of allowing the subsequent flood-fill algorithm to better separate connected components when those components are close together, which greatly improves the reliability of tracking of connected components.

2. The upscaled image resulting from #1 can be smoothed by convolving the upscaled image with a Gaussian or other blur kernel. This blurring operation improves the detection of peaks in the peak detection stage, which allows for more reliable detection of fingers that are near to each other. This blurring operation also reduces the probability of detecting multiple peaks when there should really be just one peak. This misreading can happen as a result of upscaling of a pressure image that contains a saddle-point. In cases where the primary goal is to detect human finger touches, the blur kernel is made to have a radius similar to the radius of a typical human finger, in order to optimize for finger detection. The blurred pressure image should only be used for detection of peaks and those areas that surround them. This blurred pressure image should not be used for calculation of forces and positions, because the blurring can introduce errors into such calculations.

3. The detection and flood filling of areas around peaks can be improved by doing the fill in a breadth-first iterative way, expanding all areas in-radius by one pixel at a time, and then expanding all areas again by one pixel, iteratively, until no areas can expand any further.

4. When touches are very light, with pressure that is near in value to the detection threshold, it is possible for such touches to alternate between being detected (referred to as the "1 state") and not detected (referred to as the "0 state"). This is undesirable because it creates a large stream of touch-up and touch-down events in the downstream processing of the touches. Also, users may find it undesirable to see a flickering between touches being visually displayed and not being visually displayed. Also, such alternation makes it more difficult for application software to establish a consistent identity over time for a finger touch. This sort of problem is often addressed by making the threshold for detection (i.e.: transition from a 0 to a 1 state) higher than the threshold for the end of detection (i.e.: transition from 1 to 0 state). In a similar way, once a touch has been detected, it is desirable to lower the threshold for detection of that touch in the next frame, so that the touch can be more effectively tracked. This is implemented via a feedback loop, as follows Whenever a touch is detected, a biasing image of that touch is added to the force image, which has approximately one-half the strength of the detection threshold, at the location where the touch is expected to be seen in the next frame. This expected location can be estimated by linearly extrapolating the motion of the touch, for example, by assuming that the touch will continue to move at the same velocity with which it has moved over the last two frames or data, or by assuming that it will move along the same curve along which it has moved during the last three frames of data with corresponding velocity and acceleration. Because the added biasing image has one half the strength of the detection threshold, for the touch to be forgotten the force exerted by the touch would need to drop to half the detection threshold. This algorithm removes the problem that was earlier described of unwanted momentary transitions between the 0 and 1 states. The image which has the biasing images added in should be used only for peak detection of touches, and for finding touch areas. This image should not be used for calculating the force or position of touches, since the biasing can create errors in these operations. Instead, the actual raw pressure images should be used for calculating the forces and/or positions of touches.

5. In the previous provisional patent application, we described a technique for tracking connected segments across different frames, and assigning unique IDs to tracked finger/stylus positions. However, our previous description did not describe what happens when two touches come so close that they become indistinguishable (what we call a touch merge event), and similarly, what happens when two touches that are very close together, and interpreted by the sensor as a single touch point move apart enough that they are detected as two separate touch points (which we call a touch split event). Without proper handling of these events, they would appear as if a touch went away, or as if a touch became visible, respectively. However, properly detecting touch merge and touch split events is useful in downstream software which uses these events. The detection of these events can be performed in the following way: We can detect touch merges when a touch that is nearby another touch disappears, and the resulting touch, detected in the next frame, has a force that is approximately equal the sum of the forces of the two touches from the previous frame. On a touch merge, an event should be sent to the downstream software indicating that a touch with ID A, and a touch with ID B have merged into a touch with a new ID C (where A, B, and C are different unique identifiers). We can detect touch splits when in the area near a single touch, two touches are detected in a following frame that have forces which sum to the force of the single touch from the previous frame. On a touch split, an event should be sent to the downstream software indicating that a touch with ID D has split into two touches with IDs E and ID F (where D, E and F are different unique identifiers).

6. Smoothing. It may be desirable to smooth the pressure images from the sensor in the time domain to eliminate slight variations due to electrical noise. This can be done by averaging each succeeding pressure image frame with the values from the previous frame. The average may be weighted to give more importance to the current frame or to the previous frame. A running average may be kept to smooth more frames than just the previous frame (resulting in an exponential decay of contribution from previous frames). Furthermore, smoothing can be performed downstream of the touch and/or stylus detection/tracking algorithm. This can be performed by smoothing the coordinates, forces, and shapes of the tracked touches in the time domain using smoothing techniques that are generally known in the art.

7. In sensors with drone conductors, a pen can be detected because the movement of the pen across successive drone wires causes small fluctuations in amplitude, thereby creating a corresponding oscillation in measured force as the pen moves over the sensor surface. This is due to the fact that there is slightly more conductivity at those locations where the pen tip is nearest to the intersection between two conductors than when the pen tip is furthest away from such intersections. This phenomenon does not occur in response to a finger touch because a finger has a contact area that is very large compared with the spacing between drone wires. The touch of a finger effectively creates an area integral that causes any potential fluctuation to be cancelled out by the contributions from different locations within the area of the finger touch.

Non-Parallel Grids

The principle of the UnMousePad sensor is applicable to applications in which the rows and columns to not run in straight lines, are not strictly parallel and/or do not cross each other at a 90 degree angle. For example, an UnMousePad sensor grid can be continually distorted so that it fills a circle (see FIGS. 43-49). Alternately, a circular sensor can be created by providing one side of the sensors with wires that go out from the center to the outside in a radial fashion, while the other side of the sensor is provided with lines that form concentric rings (see FIG. 43). An UnMousePad sensor can also be a distorted grid. For instance, when used in shoes the grid can be squished in the center (directly below the arch of the foot), while being distorted at the top to match the slant of the toes. Drone conductors can be disposed between electrodes in just the same way as with an UnMousePad sensor that has a regular grid.

Connections to the sensor can be made in such a way that parts can be trimmed without damaging the sensor.

Figure 43:
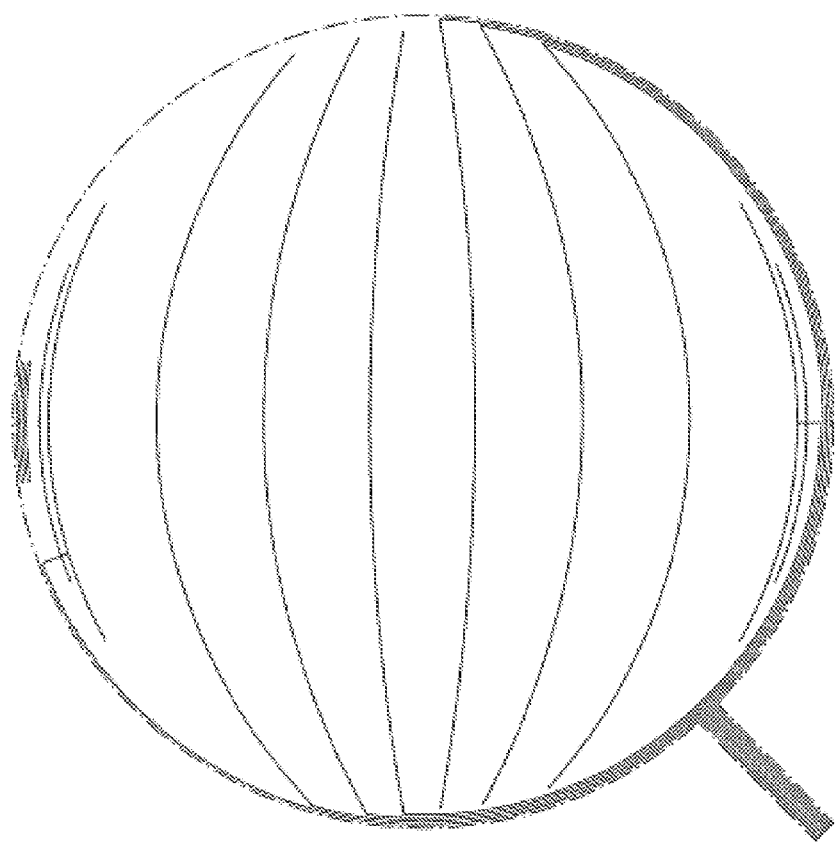
FIG. 43 shows a layout of vertical electrodes for a circular UnMousePad that is made by distorting a grid.

FIG. 43 shows a layout of vertical electrodes for a circular UnMousePad that is made by distorting a grid. Wires run around the periphery to connect the electrodes to a bus (visible on the lower right), where an electrical connection to circuitry can be made.

Figure 44:
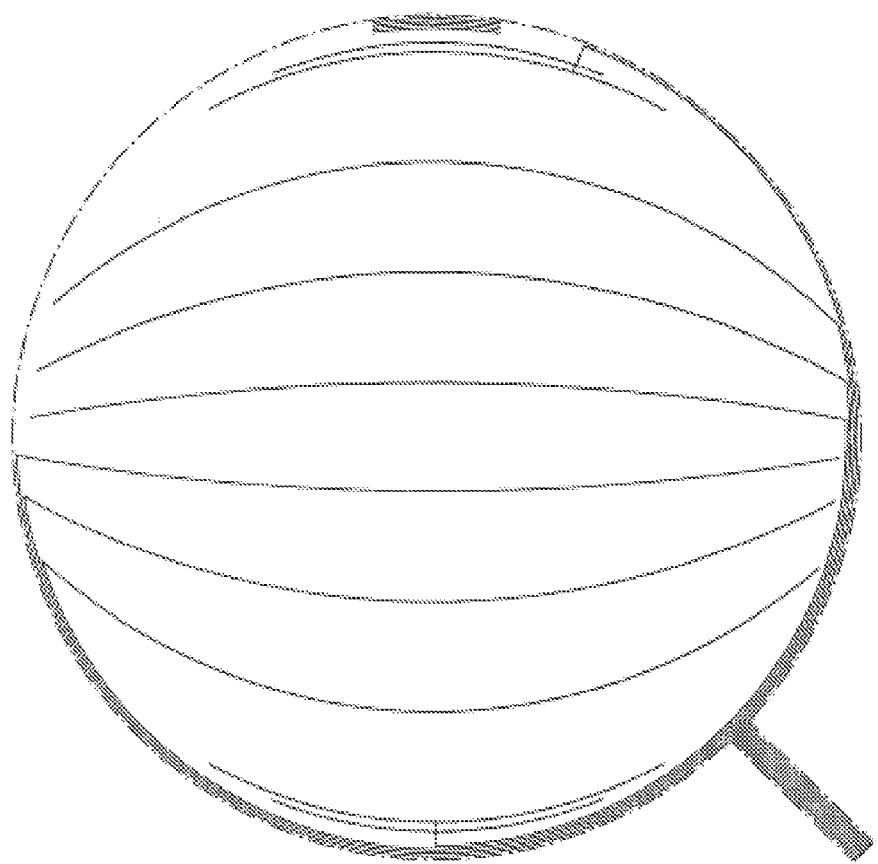
FIG. 44 shows a layout of horizontal electrodes for a circular UnMousePad that is made by distorting a grid.

FIG. 44 shows a layout of horizontal electrodes for a circular UnMousePad that is made by distorting a grid. Wires run around the periphery to connect the electrodes to a bus (visible on the lower right), where an electrical connection to circuitry can be made.

Figure 45:
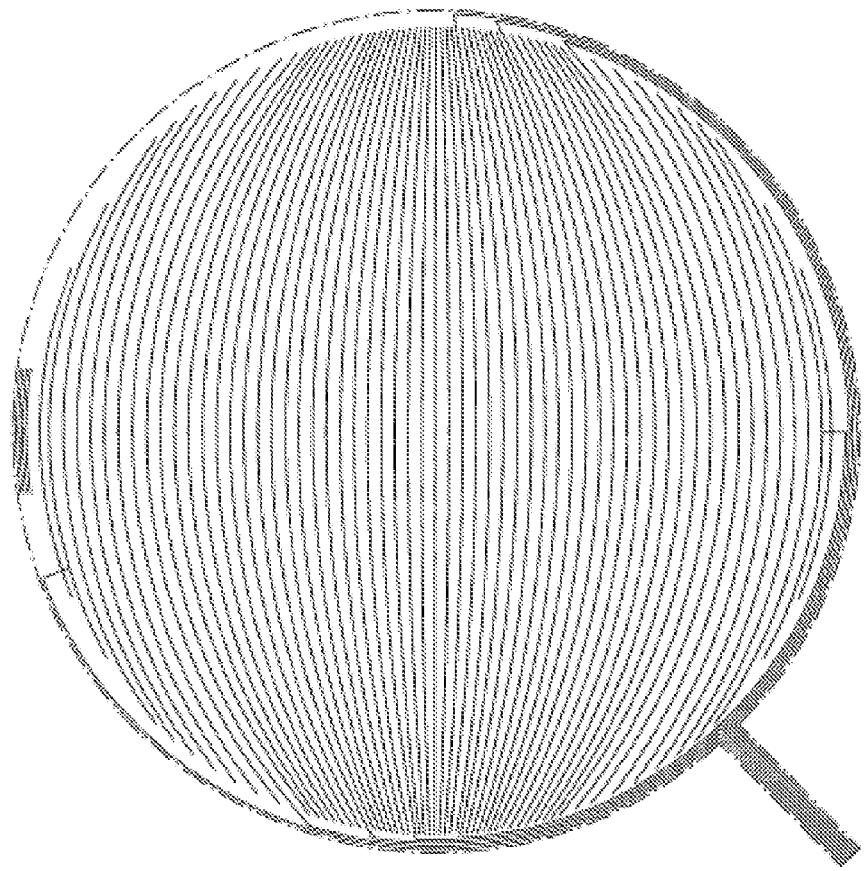
FIG. 45 shows a layout of vertical electrodes and drone lines for a circular UnMousePad that is made by distorting a grid.

FIG. 45 shows a layout of vertical electrodes and drone lines for a circular UnMousePad that is made by distorting a grid. Wires run around the periphery to connect the electrodes to a bus (visible on the lower right), where an electrical connection to circuitry can be made.

Figure 46:
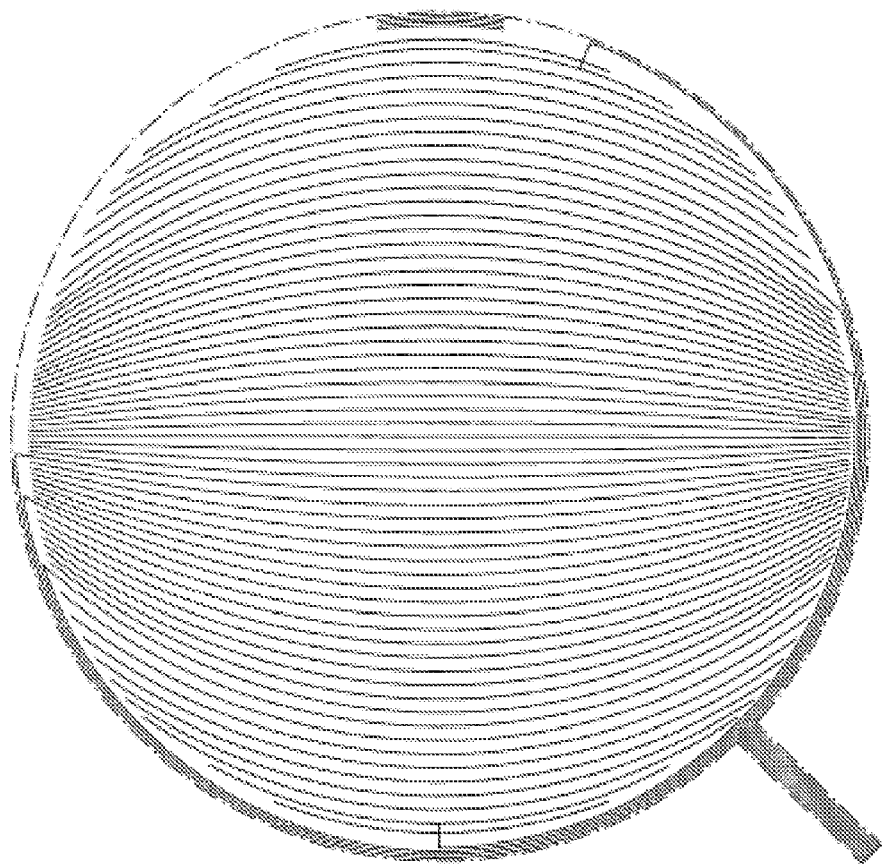
FIG. 46 shows a layout of horizontal electrodes and drone lines for a circular UnMousePad that is made by distorting a grid.

FIG. 46 shows a layout of horizontal electrodes and drone lines for a circular UnMousePad that is made by distorting a grid. Wires run around the periphery to connect the electrodes to a bus (visible on the lower right), where an electrical connection to circuitry can be made.

Figure 47:
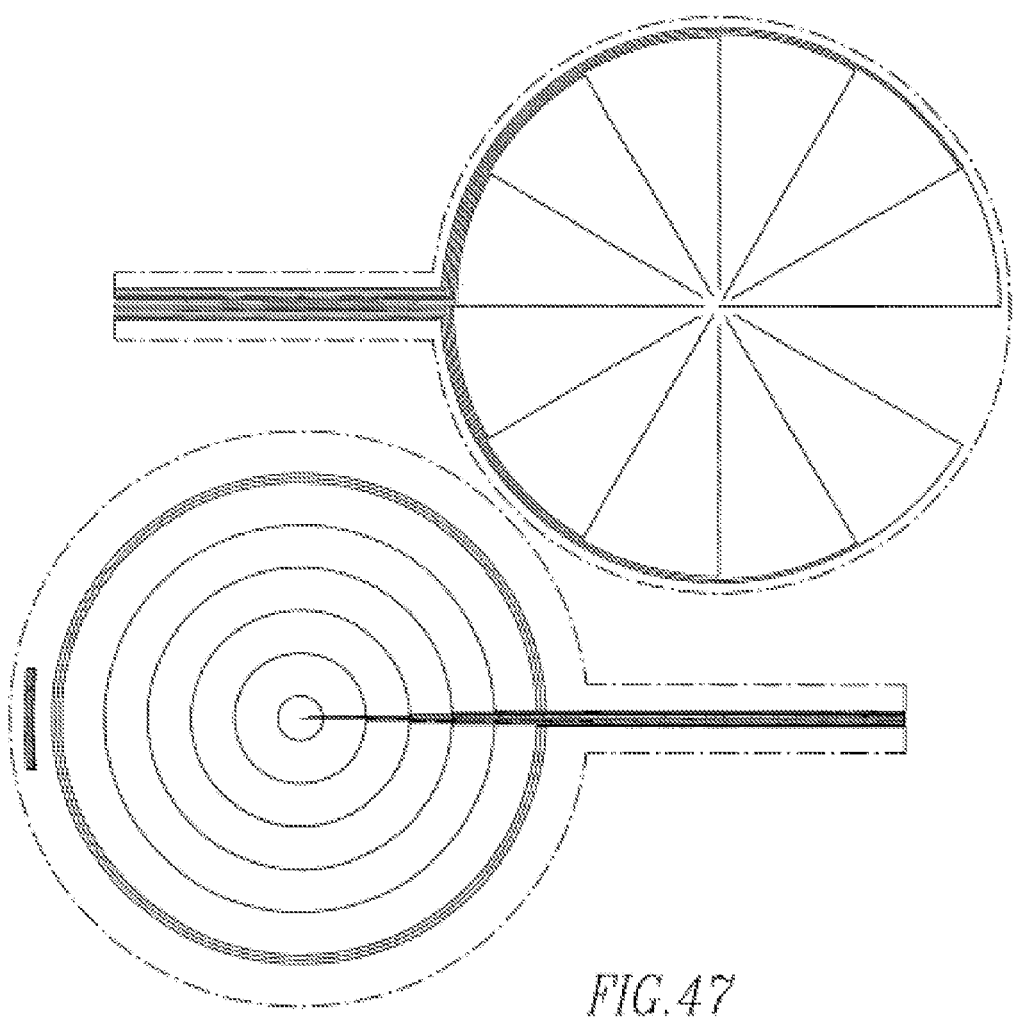
FIG. 47 shows a layout of circular UnMousePad showing both radial and concentric circle electrodes on top and bottom sensor layers.

FIG. 47 shows a layout of circular UnMousePad showing both radial and concentric circle electrodes on top and bottom sensor layers.

Figure 48:
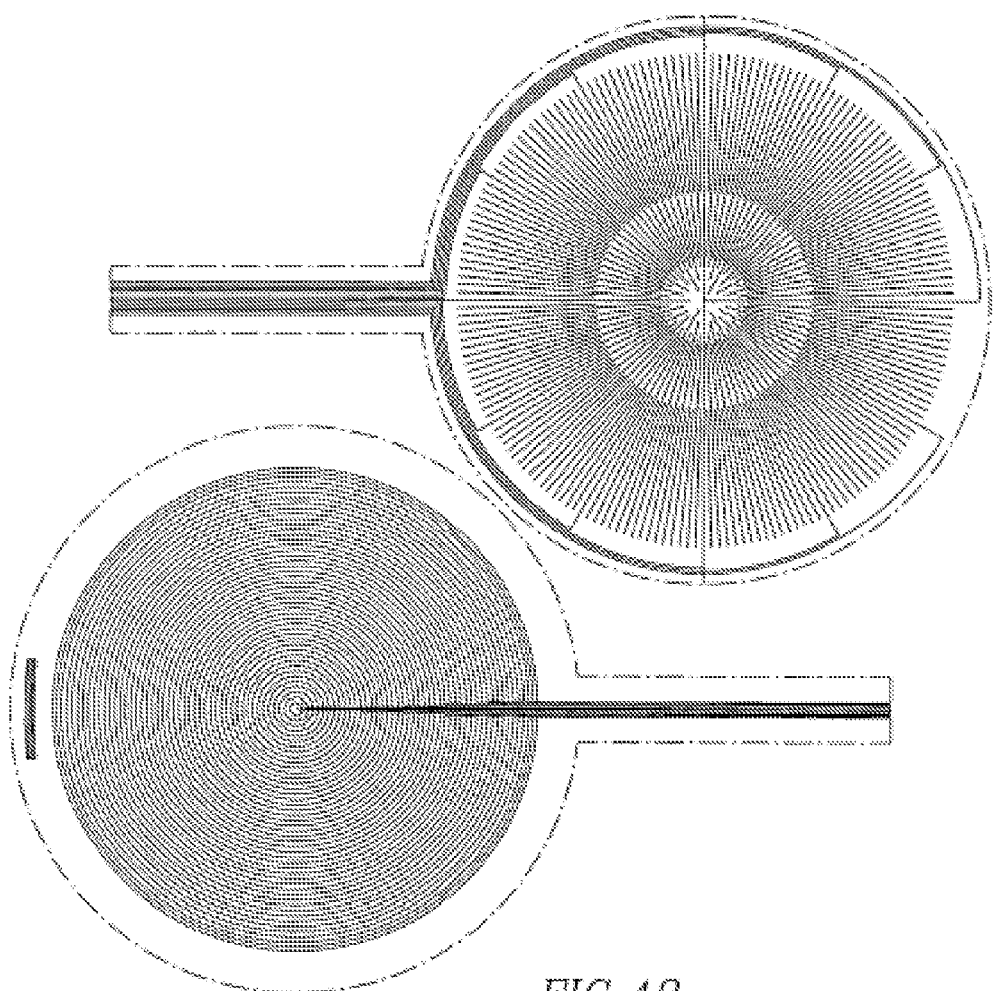
FIG. 48 shows a layout of circular UnMousePad showing both radial and concentric circle electrodes as well as drone lines on top and bottom sensor layers.

FIG. 48 shows a layout of circular UnMousePad showing both radial and concentric circle electrodes as well as drone lines on top and bottom sensor layers.

Figure 49:
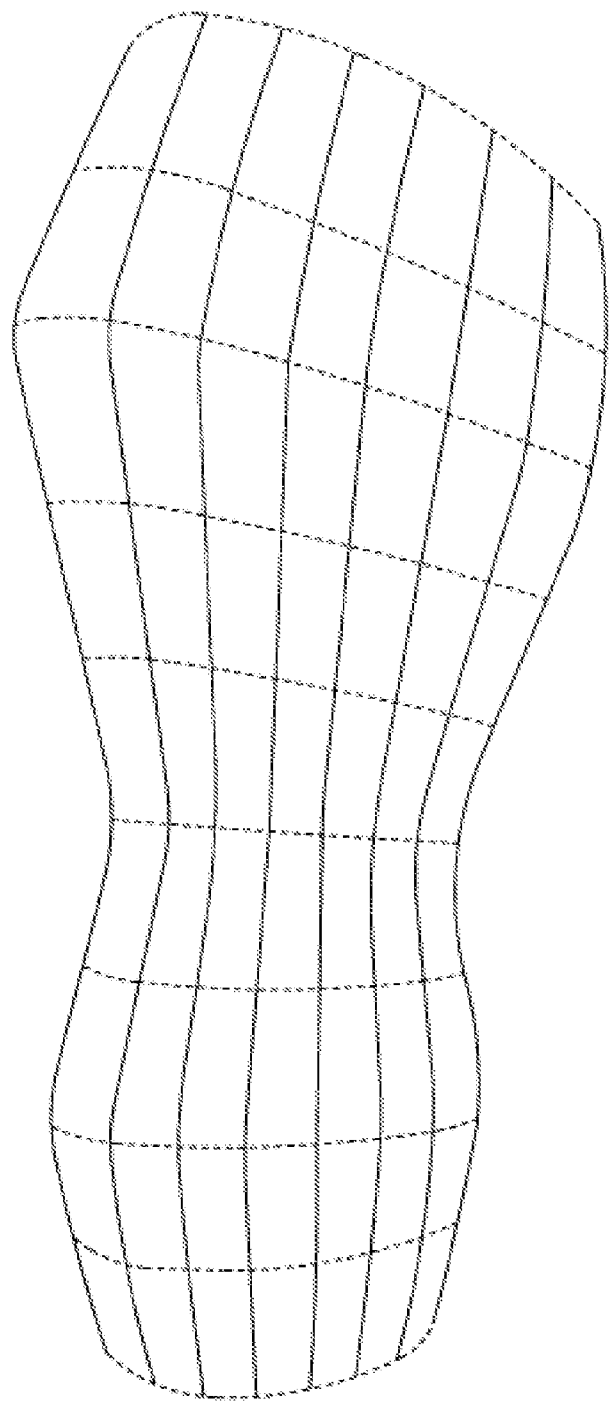
FIG. 49 is an image of a foot sensor grid (without drone electrodes) with column and row electrodes overlaid on top of each other.

FIG. 49 is an image of a foot sensor grid (without drone electrodes) with column and row electrodes overlaid on top of each other. The column electrodes are drawn with solid lines, and the row electrodes are drawn with dotted lines. The grid has an 8×10 resolution. It is distorted in such a way as to match the natural shape of a foot, so that it can be used as an insole. Wires connecting to electronics are not shown. In a physical embodiment, the wires from the rows and columns could run to the area under the arch, where a microcontroller could be embedded.

More UnMousePad Uses

The UnMousePad can be placed onto skateboards or in balance boards in order to detect the position and balance of a person. These devices can be used for stationary purposes such as for athletic training or to provide input for video games. These devices can also be used for moving powered vehicles, which would, under computer control, move in response to subtle changes in pressure by the user's feet, and could also actively help to balance the user like a segway.

The UnMousePad can be used as part of the inside lining of a robotic suit (such as the suit in IronMan). This will allow the suit to sense forces applied to it by the wearer of the suit, thereby causing actuators/servos in the suit to move so as to match the desired position of the wearer, with the velocity and force desired by the wearer.

The UnMousePad can be used to create robot skin. The robot can be coated with UnMousePads of varying resolutions in varying places. For instance, fingertips can be coated with very high resolution UnMousePads, while arms can be coated with lower resolution UnMousePads, thereby mimicking the variable resolution characteristics of human skin at different parts of the human body.

It is described above that an UnMousePad can be used over golf clubs and tennis racquets. More generally, it may be placed over the surfaces of sporting equipment where players, balls, or other objects make contact with the sporting equipment. For instance, UnMousePad sensors may be placed on the face of a golf club and around the handle. Sensors in this configuration can then be used to improve the player's performance by giving them feedback. This feedback may include such information as which part of the club face is striking the ball, with what velocity the club face is striking the ball, whether the player is slicing the ball and the direction and amount of the slice. The sensors around the club handle can tell the player where and how well they are holding the club, whether the club is sliding or loosening during any part of the stroke, and the amount of force that is transmitted to the player's hands during impact. Similar information can be recorded for other sporting equipment coated with UnMousePad sensors. This information, besides just being used for improving the athlete's performance, can also be used to record and to broadcast statistics and interesting information to viewers of a sporting event, or fans of a particular athlete.

Keyboards: The UnMousePad can act as a regular QWERTY or DVORAK keyboard. The home-row position of a software keyboard can be indicated to computer software based on the position of the user's palm (assuming that the user is resting their palm on the sensor). Thus, a virtual keyboard can be made to move together with the location of the user's hand, thereby allowing the user to assume a comfortable typing position whereby the hands are placed a comfortable distance apart. Because the user's two hands are independent, the keyboard can also be split into two halves that each can individually be positioned with respect to the two hands. The virtual keyboard's two halves can be displayed on-screen or directly onto the surface of the UnMousePad, in the case where there is a display device incorporated into the UnMousePad. The user can be given visual feedback on where the user is typing by displaying the location of the user's palms and the position of finger touches on a display screen that shows an image of the two virtual keyboard halves. Because the keyboard is virtual, its layout can be modified to suit individual user preferences/needs. A user can initiate typing mode by a gesture, such as placing palms and fingertips down on the UnMousePad with a drumming motion (letting each fingertip fall on the UnMousePad in succession). Keyboard typing mode can be deactivated with another gesture, such as a flicking gesture of the entire left or right hand, to indicate that the user wants to flick the keyboard away.

Alternately, a tactile overlay (made of silicone rubber, etched glass, molded plastic, or some other shaped material), can be placed over the UnMousePad to provide a physical keyboard layout.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

REFERENCES, all of which are incorporated by reference.
1. Jobs, S., et al, Touch Screen Device, Method, and Graphical User Interface for Determining Commands by Applying Heuristics, U.S. Patent Application No.: 20080122796, May 29, 2008.
2. Buxton, W., Hill, R., and Rowley, P., *Issues and Techniques in Touch-Sensitive Tablet Input*. In Proceedings of the 12th Annual Conference on Computer Graphics and Interactive Techniques. ACM Press, New York, N.Y., 215-224, 1985.
3. Echtler, F., Huber, M., Klinker, G., *Shadow tracking on multi-touch tables*, AVI '08: Proceedings of the working conference on Advanced visual interfaces, May 2008.
4. Han, J. Y., *Low-Cost Multi-Touch Sensing through Frustrated Total Internal Reflection*. In Proceedings of the 18th Annual ACM Symposium on User Interface Software and Technology. ACM Press, New York, N.Y., 115-118, 2005.
5. Joguet, P., and Largilliar, G., Devices and Methods of Controlling Manipulation of Virtual Objects on a Multi-Contact Tactile Screen, U.S. Patent Applications Publication No.: US 2007/0198926 A1, Aug. 23, 2007.
6. Greene, R., Graphic input device with uniform sensitivity and no keystone distortion, U.S. Pat. No. 5,181,108, Jan. 19, 1993.
7. de los Reyes, I., et al., Function Oriented User Interface, U.S. Patent Application 20070124677, May 31, 2007.
8. T. Moscovich, J. F. Hughes. *Indirect Mappings of Multi-touch Input Using One and Two Hands*, In *Proceedings of CHI* 2008, Florence, Italy, April, 2008.
9. Moskovich, T., and Hughes, J., *Multi-Finger Curser Techniques In Proceedings of Graphics Interface* 2006. Quebec City, Canada, June 2006.
10. Peine, W., Pratico, R., Son, J. S., Array Sensor Electronics, U.S. Pat. No. 7,301,349, 2007
11. Rosenberg, I. and Perlin, K., *The UnMousePad: An Inexpensive Multi-Touch Input Pad*, UIST 2008 Conference, October 19-21, Monterey, 2008.
12. Prashant Srinivasan, David Birchfield, Gang Qian, Assegid Kidan, *Design of a Pressure Sensitive Floor for Multimodal Sensing*, iv, pp. 41-46, Ninth International Conference on Information Visualisation (IV '05), 2005
13. Wessel, D., Avizienis, R., Freed, A., and Wright, M., *A force sensitive multi-touch array supporting multiple 2-D musical control structures*, New Interfaces for Musical Expression, pgs 41-45, New York, Jul. 6, 2007.
14. Westerman, W., *Hand Tracking, Finger Identification and Chordic Manipulation on a Multi-Touch Surface*. PhD thesis, University of Delaware, 1999.
15. Davis, J. R. *Let your fingers do the spelling: Disambiguating words spelled with the telephone keypad*, Avios Journal 9 (1991), 57-66.

The invention claimed is:

1. An apparatus for providing input to a processor comprising:
   a sensor pad having a surface and a sensor array for sensing pressure at the surface and producing signals corresponding to the pressure at the surface, the sensor array having a first sensor layer comprising of a plurality of column electrodes and a second sensor layer comprising of a plurality of row electrodes, wherein spaces between each of the column electrodes and each of the row electrodes are filled with a flood coat of resistive material, the flood coat of resistive material acting as a linear resistor between each of the electrodes and for measuring pressure on the surface between at the electrodes;
   an interface in contact with the sensor pad and in communication with the sensor array which couples to the processor to communicate the signals to the processor; and
   wherein the sensor pad has a spacer to create a gap between the first sensor layer and the second sensor layer.

2. The apparatus as described in claim 1 wherein the sensor pad is portable.

3. The apparatus as described in claim 2 wherein the interface is configured to couple with a USB cable.

4. The apparatus as described in claim 3 wherein the sensor array detects multiple simultaneous contact points on the surface.

5. The apparatus as described in claim 4 including a display in communication with the processor that displays the signals corresponding to the pressure at the surface.

6. The apparatus as described in claim 5 wherein each of the electrodes are spaced at least ⅛ inches apart.

7. The apparatus as described in claim 6 wherein the resistive material has a conductivity which varies with pressure.

8. The apparatus ad described in claim 7 wherein the sensor pad senses pressure at the surface by detecting voltages at row and column intersections that are near areas where the first and second layers are touching.

9. The apparatus as described in claim 8 wherein each time a scan of the sensor pad occurs by the processor, pressure at all points on the surface is measured by applying a positive voltage on each row one at a time, and then reading out voltage values on each column one at a time.

10. The apparatus as described in claim 9 wherein the sensor pad operates like a track pad.

11. The apparatus as described in claim 9 wherein the sensor pad operates as a tablet.

12. The apparatus as described in claim 9 wherein the sensor pad detects a corresponding shape to the pressure applied to the surface.

13. The apparatus as described in claim 1 wherein the sensor pad measures a proportional location of any touched point upon the surface between two column electrodes that adjoin the touch point and two row electrodes that adjoin the touch point with use of the flood coat of resistive material which fills in the spaces between the two column electrodes and the two row electrodes.

14. The apparatus as described in claim 1 wherein the sensor pad includes at least one drone electrode disposed between at least two column electrodes and two row electrodes, the at least one drone electrode being free from a direct electrical connection to circuitry while the column electrodes and row electrodes remain electrically connected to circuitry for sensing pressure at the surface and producing signals corresponding to the pressure at the surface.

15. The apparatus as described in claim 14 wherein the at least one drone electrode increases linearity of resistivity between the at least two column electrodes and two row electrodes.

16. The apparatus as described in claim 1 wherein each of the plurality of column electrodes and each of the plurality of row electrodes are spaced apart a distance greater than a width of a single electrode.

17. The apparatus as described in claim 1 wherein the flood coat of resistive material covers at least one of a top surface of the column electrodes and row electrodes or a bottom surface of the column electrodes and row electrodes.

18. A sensor pad comprising:
   a surface; and
   a sensor array for sensing pressure at the surface and producing signals corresponding to the pressure at the surface, the sensor array having a first sensor layer comprising of a plurality of column electrodes and a second sensor layer comprising of a plurality of row electrodes, wherein spaces between each of the column electrodes and row electrodes are filled with a flood coat of resistive material that acts as a linear resistor between each of the electrodes for measuring pressure on the surface between at the electrodes; and a spacer to create a gap between the first sensor layer and the second sensor layer.

19. An apparatus for providing input to a processor comprising:

a sensor pad having a surface and means for sensing pressure at the surface and producing signals corresponding to the pressure at the surface, the sensing means having:
(i) a first sensor layer comprising of a plurality of column electrodes and a second sensor layer comprising of a plurality of row electrodes, wherein spaces between each the column electrodes and each of the row electrodes are filled with a flood coat of resistive material that acts as a linear resistor between each of the electrodes for measuring pressure on the surface between at the electrodes; and
(ii) drone electrodes interspersed between at least some of the plurality of column electrodes and some of the plurality of row electrodes, the drone electrodes being free from a direct electrical connection to circuitry while the plurality of column electrodes and the plurality of row electrodes remain electrically connected to circuitry for sensing pressure at the surface and producing signals corresponding to the pressure at the surface;

an interface in contact with the sensor pad and in communication with the sensor array which couples to the processor to communicate the signals to the processor; and wherein the sensor pad further includes a spacer to create a gap between the first sensor layer and the second sensor layer.

20. The apparatus as described in claim 19 wherein the sensor pad detects multiple simultaneous contacts to the surface.

21. The apparatus as described in claim 20 wherein the sensor pad has no circuitry other than the sensing menus and a microcontroller.

22. The apparatus as described in claim 19 wherein each of the drone electrodes interspersed between the plurality of column electrodes and the plurality of row electrodes reduces resistance between: (i) a touch point, and (ii) the corresponding column or row electrodes between which the respective drone electrode is disposed.

23. The apparatus as described in claim 19 wherein the sensing means further include one or more strips of resistive material along one or more edges of the surface.

24. A method for providing input to a processor comprising the steps of:

sensing pressure with a sensor pad having a surface and a sensor array for sensing the pressure at the surface;

producing signals corresponding to the pressure at the surface with the sensor array, the sensor array having a first sensor layer comprising of a plurality of column electrodes and a second sensor layer comprising of a plurality of row electrodes, spaces between each of the column electrodes and each of the row electrodes being filled with a flood coat of resistive material that acts as a linear resistor between the each of the electrodes for measuring pressure on the surface between at the electrodes; and communicating the signals to the processor with an interface in contact with the sensor pad and in communication with the sensor array which couples to the processor;

wherein the sensor pad includes a spacer to create a gap between the first sensor layer and the second sensor layer.

25. The method as described in claim 24 wherein the producing step includes the step of measuring each time a scan of the sensor pad occurs by the processor, pressure at all points at the surface by applying a positive voltage on each row one at a time, and then reading out voltage values on each column one at a time.

26. The method as described in claim 25 wherein the measuring step includes the step of measuring a plurality of simultaneous contacts to the surface.

* * * * *